United States Patent
Era

(10) Patent No.: US 6,512,521 B1
(45) Date of Patent: Jan. 28, 2003

(54) METHOD OF DISPLAYING TWO DIMENSIONAL PICTURE IMAGE DATA, AND CONSTRUCTING ANIMATION PICTURE THEREFROM

(76) Inventor: Kazunari Era, 4-1-11-201 Matsuba-cho, Kashiwa, Chiba-ken (JP)

(*) Notice: Subject to any disclaimer, the term of this patent is extended or adjusted under 35 U.S.C. 154(b) by 0 days.

(21) Appl. No.: 09/572,253

(22) Filed: May 17, 2000

Related U.S. Application Data

(62) Division of application No. 09/109,102, filed on Jul. 2, 1998.

(30) Foreign Application Priority Data

Jul. 2, 1997 (JP) .............................. 9-190792
Jun. 12, 1998 (JP) ............................ 10-164754

(51) Int. Cl.⁷ ...................... G07G 13/00; G06T 15/40; G09G 5/397
(52) U.S. Cl. ...................... 345/473; 345/422; 345/546
(58) Field of Search ................ 345/439, 126, 345/127, 129, 437, 440, 438, 659, 660, 667, 668, 670, 672, 422, 545, 546, 568, 572

(56) References Cited

U.S. PATENT DOCUMENTS

| | | | |
|---|---|---|---|
| 3,747,087 A | * 7/1973 | Harrison, III et al. | 345/22 |
| 4,790,028 A | * 12/1988 | Ramage | 382/298 |
| 5,568,600 A | 10/1996 | Kaba | 345/437 |
| 5,625,765 A | 4/1997 | Ellenby et al. | 345/439 |
| 5,771,342 A | 6/1998 | Todd | 345/439 |
| 5,825,367 A | 10/1998 | Shyu et al. | 345/439 |
| 5,850,352 A | * 12/1998 | Moezzi et al. | 345/419 |
| 5,870,105 A | 2/1999 | Jensen | 345/428 |
| 5,963,203 A | * 10/1999 | Goldberg et al. | 345/723 |
| 5,966,141 A | * 10/1999 | Ito et al. | 345/473 |
| 6,256,061 B1 | * 7/2001 | Martin et al. | 348/22 |
| 6,348,919 B1 | * 2/2002 | Murphy | 345/421 |

* cited by examiner

Primary Examiner—Jeffery Brier
Assistant Examiner—Anthony J. Blackman
(74) Attorney, Agent, or Firm—Armstrong, Westerman & Hattori, LLP

(57) ABSTRACT

A method of constructing, from given photography of a scene a two-dimensional virtual snap shot of the sceney that could be obtained for the viewer of the picture by moving the camera looking at the scenery. To do this, given an original snap shot photograph of a scenery imported on a display, the invention magnifies the picture at different proportions in accordance with the virtual displacement of the view point or the virtual line of sight of the viewer. An animated picture having a very small data size yet having a substantially the same picture quality as a standard AVI file may also be printed, so that the picture data can be stored in a small memory device and transferred through the Internet in a short period of time, which is advantageous in providing animation pictures from WEB pages.

4 Claims, 47 Drawing Sheets

F I G. 24
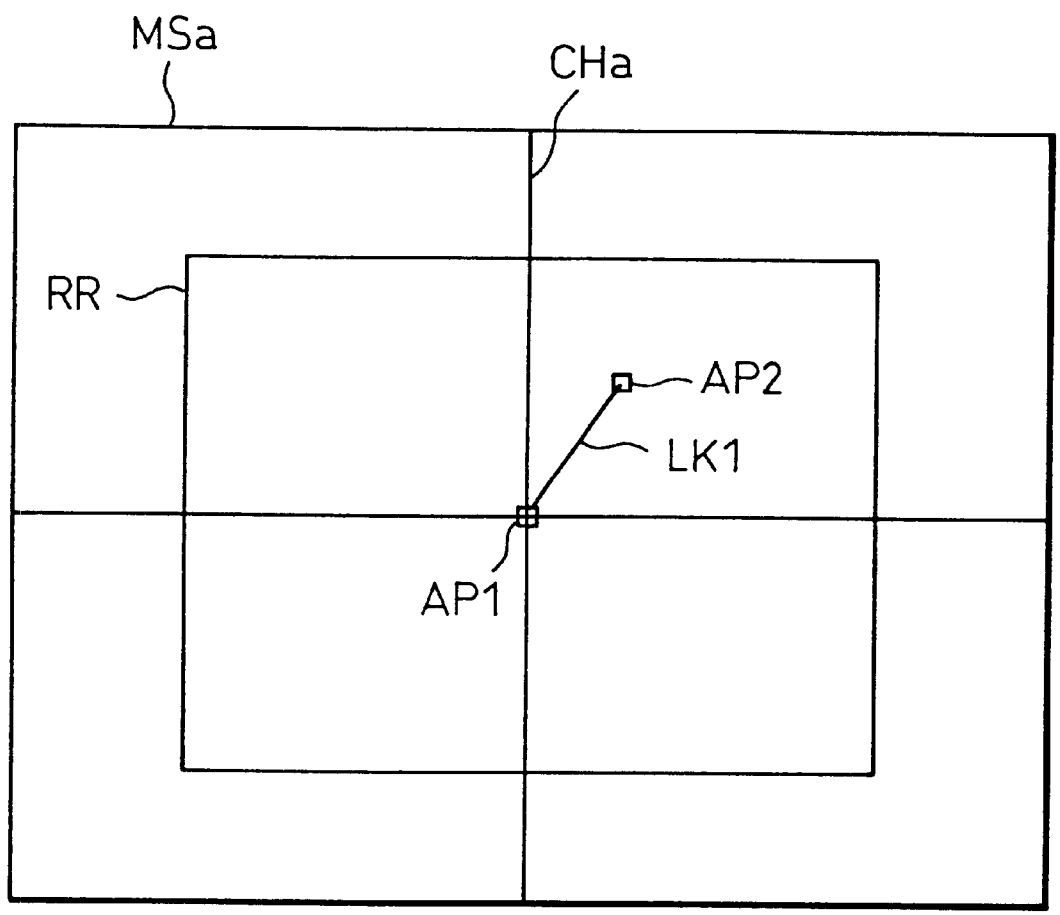

(WITH file)

(moving point info)

(set point info)

(CHS file)

(tracing info)

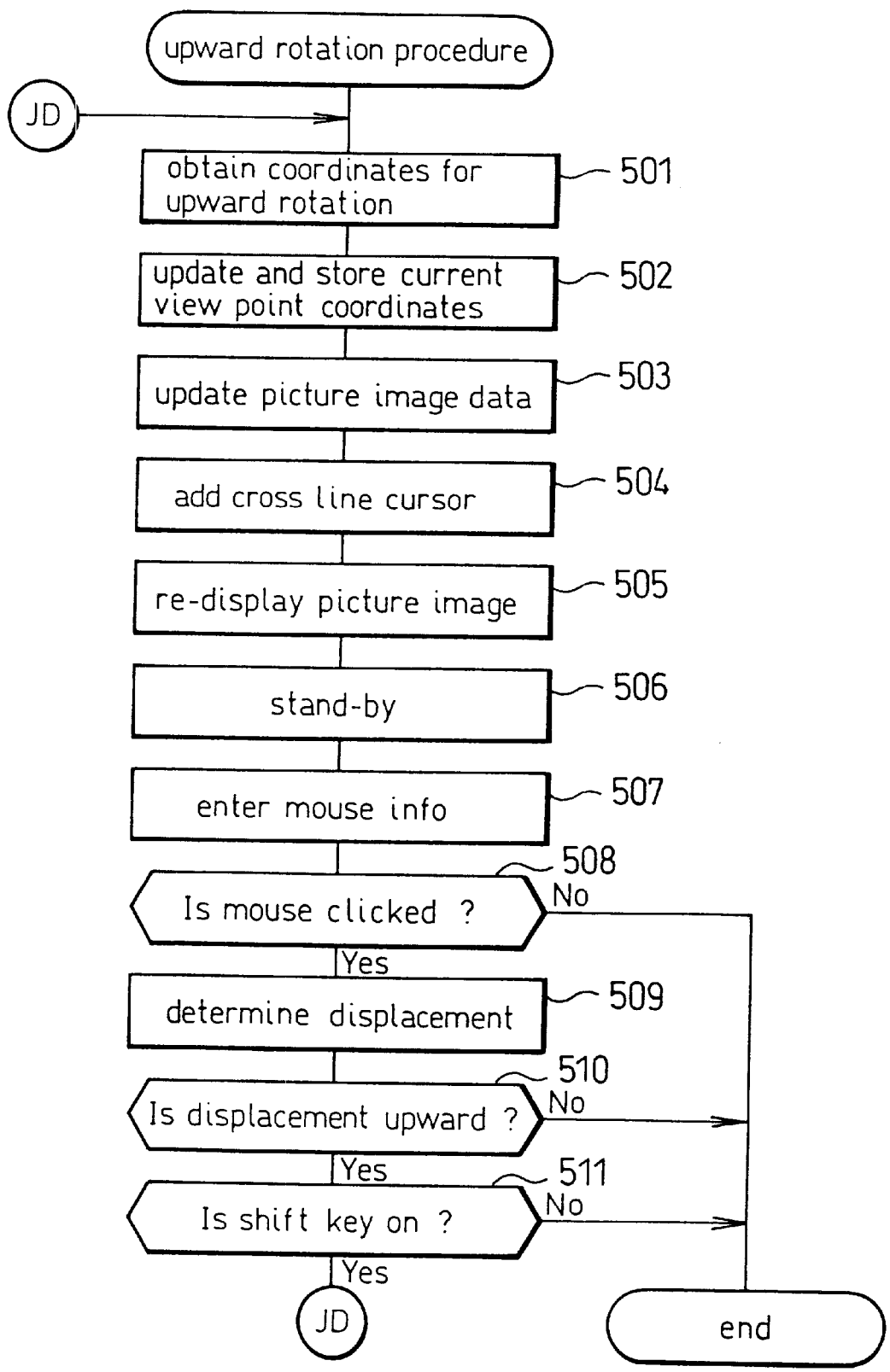

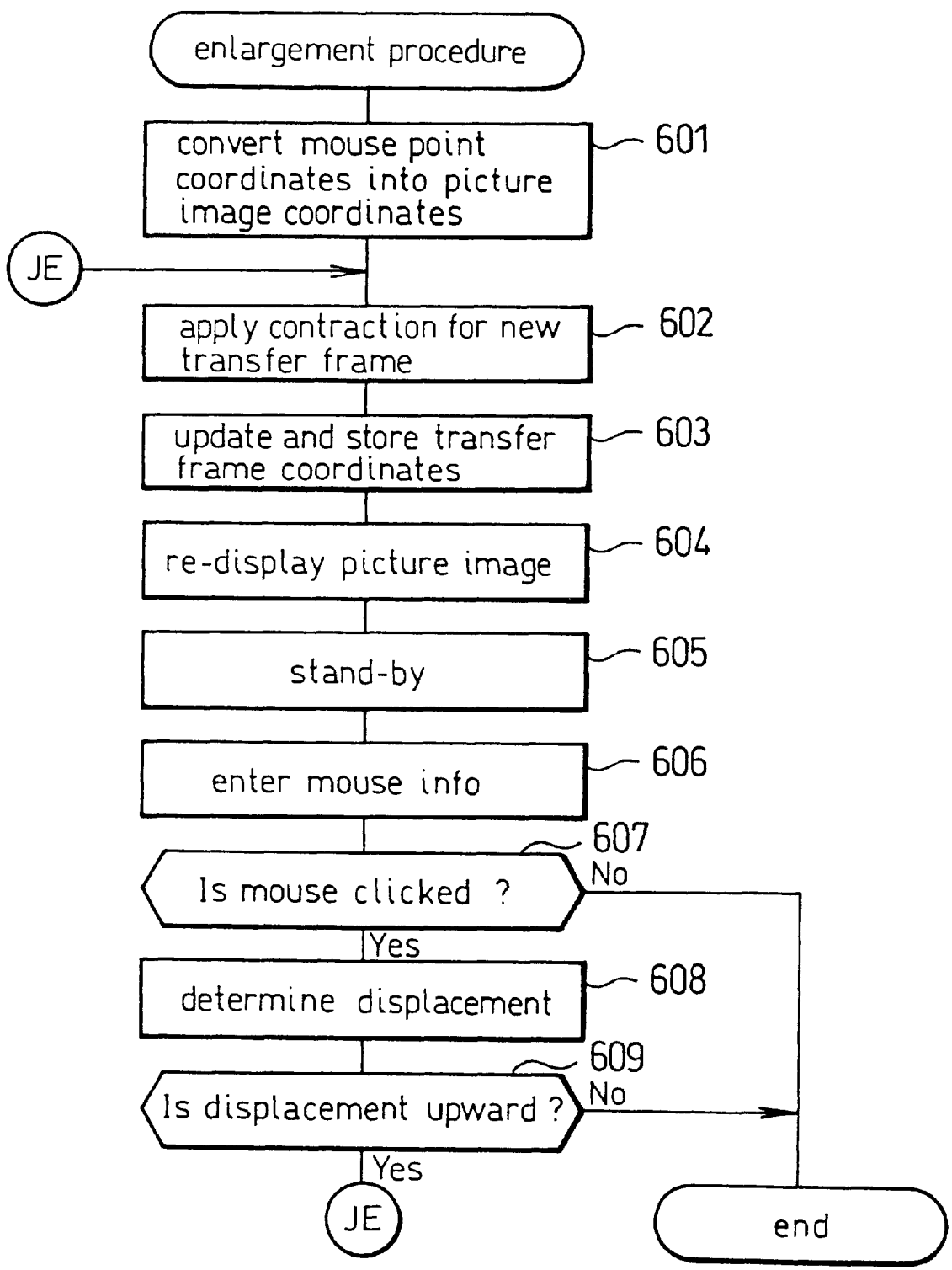

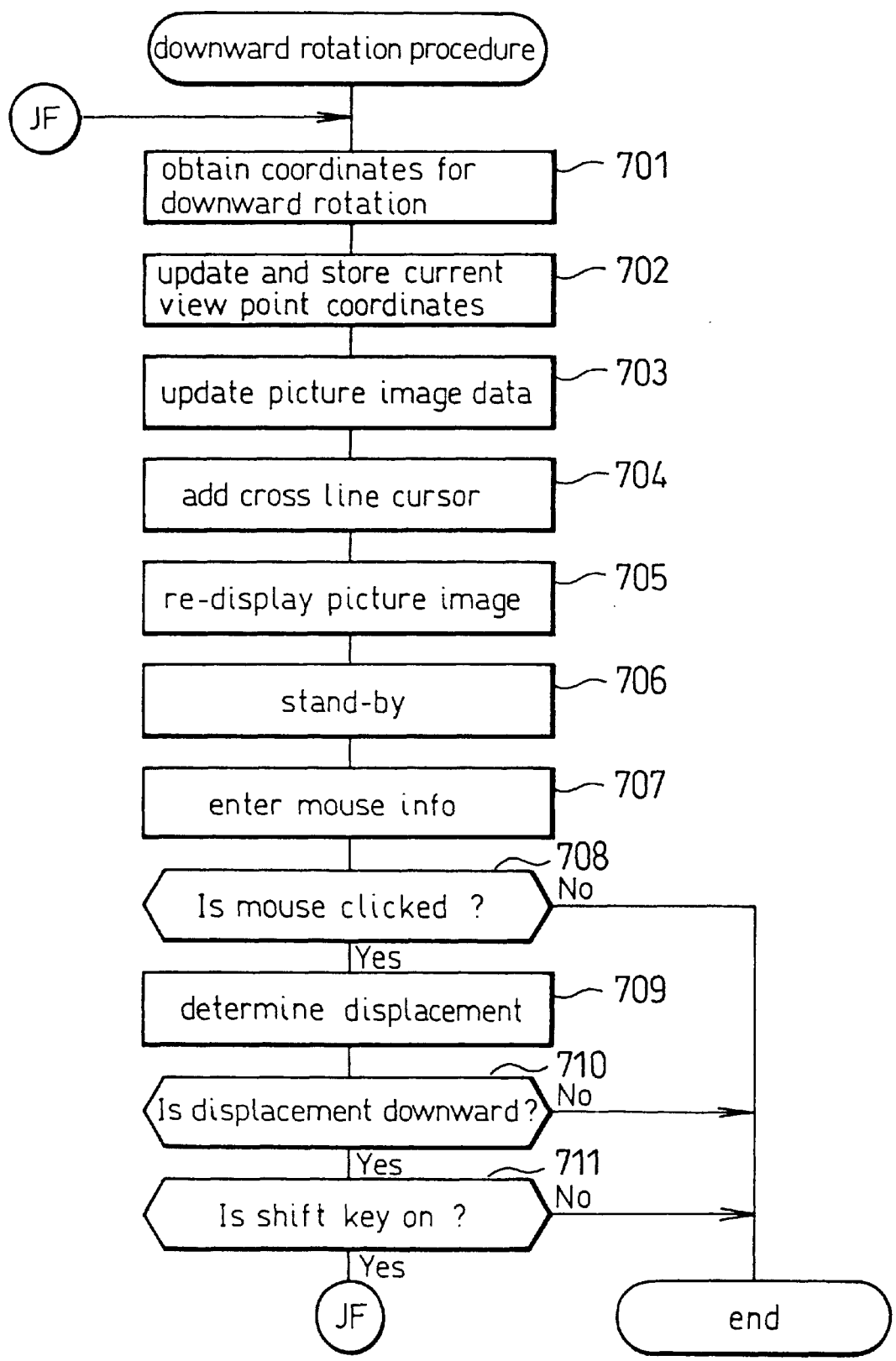

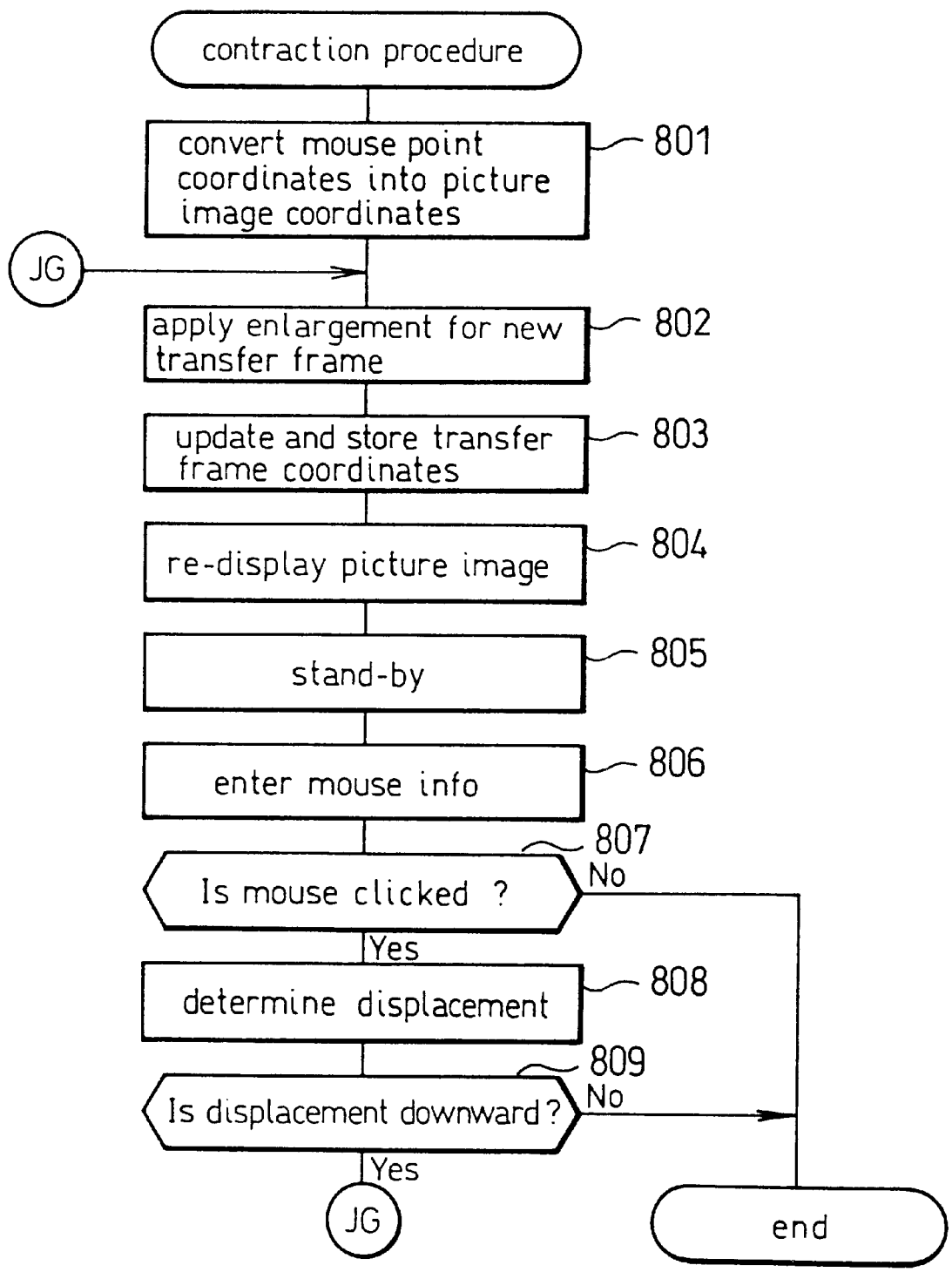

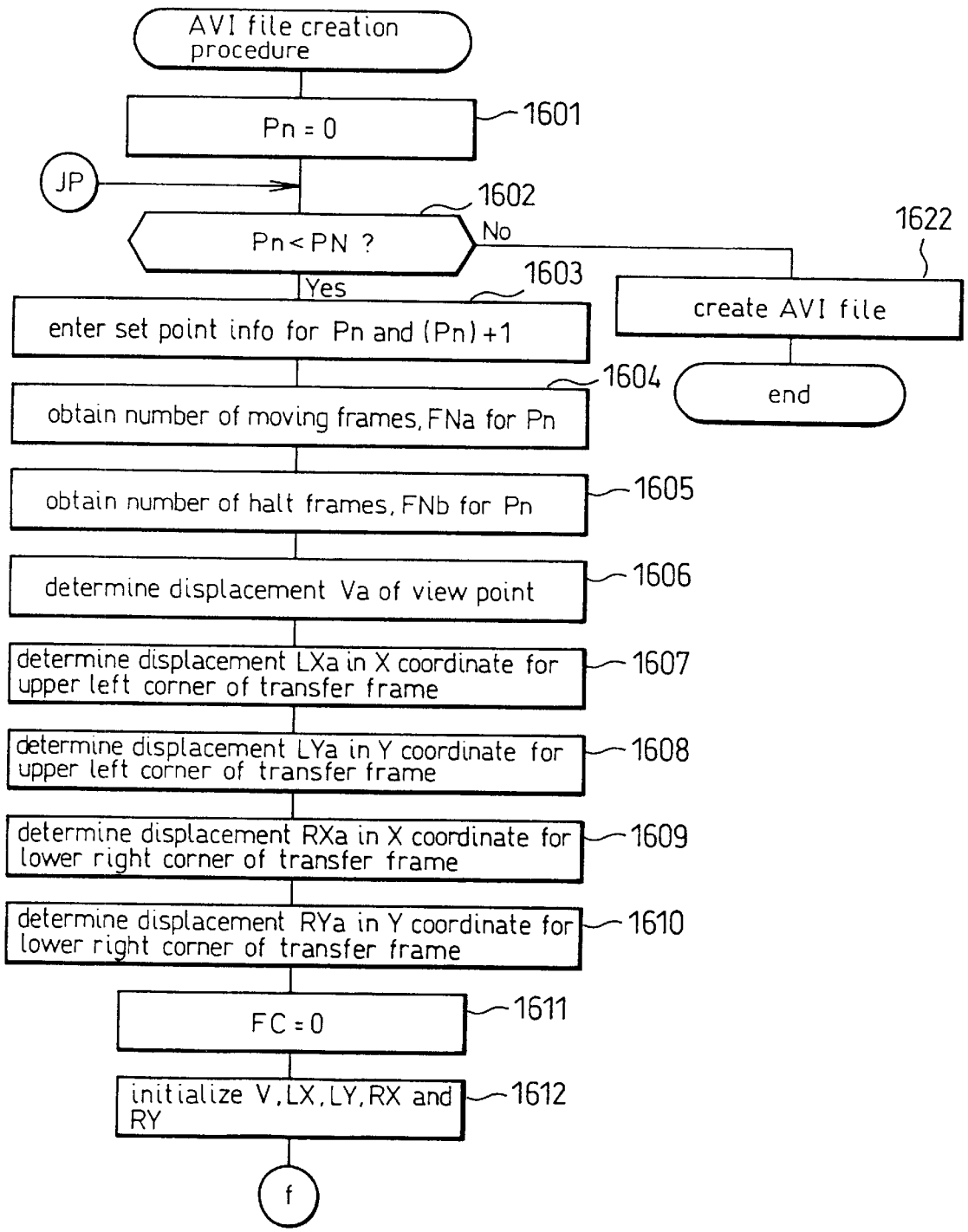

METHOD OF DISPLAYING TWO DIMENSIONAL PICTURE IMAGE DATA, AND CONSTRUCTING ANIMATION PICTURE THEREFROM

This is a division of application Ser. No. 09/109,102, filed Jul. 2, 1998.

BACKGROUND OF THE INVENTION

1. Field of the Invention

The present invention relates to a method of displaying a two-dimensional color image data having a predetermined bit depth and forming and displaying animation data.

2. Description of the Related Art

There has been developed a graphic computer application that enables displaying, for example, a two-dimensional color image data formed from photographic data, and enlarging or contracting all or part of the image data as a part of desired image processing of the picture image data.

Such graphic application when used allows the user to enlarge or contract a specified domain of the given image as desired in the course of editing the image. Such graphic application, however, cannot provide an arbitrary new view point, away from the original view point, for observing the displayed scenery or photo-image. In order to provide an application that enables changing view points, it is necessary to prepare a multiplicity of pictures taken at the different view points, so that one of them may be chosen by the application, This is not applicable, therefore, to a case where such multiplicity of pictures at different view points are not obtainable.

The present invention is directed to solve such a problem as discussed above. It is, therefore, an object of the present invention to provide a method of displaying different two-dimensional image data such as a photograph which represent different views as viewed by a virtual observer standing at a given observation at different view points.

An example of data formats capable of processing animation pictures is AVI distributed by Microsoft Corporation. In AVI format, the size of a file often disadvantageously becomes 100 MB, for example, so that a large memory is required to preserve such animated data file. AVI is also disadvantageously requires a very long transmission time, and hence a high communication cost, when the file is transferred by the Internet.

It is also an object of the present invention to overcome such problem by providing a method of forming an animation picture having a small data size.

It is, moreover, a further object of the invention to provide a method of displaying such animated pictures.

SUMMARY OF THE INVENTION

There is provided in accordance with one aspect of the invention a method of displaying two-dimensional color picture data having a predetermined bit depth, comprising the steps of:

initially displaying the two-dimensional color picture data on a display window;

modifying the picture into a new picture by magnifying/contracting the picture by a factor in accordance with the forward/backward displacement of the virtual view point of a viewer looking at the picture; and updating the two-dimensional picture data by the data of the new picture.

In another aspect of the invention, there is provided a method of displaying on a display two-dimensional color picture data having a predetermined bit depth, comprising the steps of:

initially displaying the two-dimensional color picture on a display window;

magnifying portions of the picture closer to the center of the picture by a smaller magnification factor than portions farther from the center as the virtual view point of the viewer looking at the picture undergoes a displacement; and updating the two-dimensional color picture data of the magnified picture. The picture data, and hence, the picture may be updated for the displacement in units of a given amount of displacement.

In still another aspect of the invention, there is provided a method of displaying on a display two-dimensional color picture data having a predetermined bit depth, comprising the steps of:

initially displaying the two-dimensional color picture data on a display window;

magnifying portions of the picture closer to the center of the picture by a smaller magnification factor than portions farther from the center as the virtual view point of the viewer looking at the picture undergoes a displacement; and updating the two-dimensional picture data by the data of the magnified picture.

In this mode of the invention, the two-dimensional color image data can be a photograph, in which the center of the picture corresponds to the position of the camera that took the picture. Alternatively, the two-dimensional color image data can be an illustration constructed by a perspective drawing technique, with the center of the picture corresponding to the point of convergence in the perspective drawing (which point is defined to be the infinitely remote point on which any two horizontally parallel lines converge, and will be hereinafter referred to as the perspective point).

In a further aspect of the invention, there is provided a method of displaying two-dimensional color picture data having a predetermined bit depth, comprising the steps of:

setting up a multiplicity of ordered and arbitrarily separated virtual view points looking at the picture displayed on a display window;

entering a number of ordered moving frames and a number of ordered halt frames in association with each view point;

dividing each of the paths connecting two ordered view points by the number of the moving frames;

setting a multiplicity of temporary view points, one for each divisional point, along the path;

constructing a picture from the two-dimensional picture by magnifying portions of the picture closer to the center of the picture by a smaller magnification factor than portions farther from the center, the magnified picture forming as a frame picture for the temporary view point; and displaying the frame pictures in the order of the associated view points and in the order of the associated temporary view points, wherein each of the pictures associated with the view points are repeatedly displayed at the associated view point as many times as the number of halt frames.

In this case, each magnification factor at each of the view points may be arbitrarily set at the time the temporary view points are set, and may be stored in a view point information data file.

In a still further aspect of the present invention, there is provided a method of constructing an animation picture for given two-dimensional color picture data having a predetermined bit depth, comprising the septs of creating a tracing information file which includes:

setting up a multiplicity of ordered and arbitrarily separated virtual view points looking at the picture displayed on a display window;

setting a magnification mode of magnifying the picture for each of the view points;

constructing a transfer frame for cutting out a portion of the picture displayed on the display window in accordance with the magnification mode, the transfer frame defined by the coordinates of a rectangular frame formed on the display window;

entering a number of ordered moving frames and a number of ordered halt frames in association with each view point;

dividing each of the paths connecting two ordered view points by the number of the moving frames;

setting a multiplicity of temporary view points, one for each of the divisional points along the path divided;

arranging the number of halt frames and the coordinates of the view points and the temporary view points, and the coordinates of the transfer frames in the order of the view points and temporary view points, thereby forming a time series of the pictures forming, when displayed, animation of the two-dimensional picture; and constructing an animation picture from the two-dimensional picture data and the tracing information file.

In this method, a picture may be constructed from the two-dimensional picture displayed on the picture window for each temporary view point and the view points by cutting out a section of the picture on the display window by means of the transfer frame associated with the temporary view point/view point;

the cut picture may be magnified such that portions of the cut picture closer to the center thereof is magnified by a smaller magnification factor than portions farther from the center thereof, the magnified picture forming a frame picture for that temporary view point; and the picture data may be displayed on a display in accordance with the tracing information at a predetermined time interval.

BRIEF DESCRIPTION OF THE DRAWINGS

Preferred embodiments of the invention will now be described in detail in conjunction with the accompanying drawings, in which:

FIG. 24 is a figure displayed while setting a view point;

FIG. 34 is a flow-chart of upper rotation procedure (Step 408);

FIG. 35 is a flow-chart of enlarging procedure (Step 409);

FIG. 36 is a flow-chart of lower rotation procedure (Step 412);

FIG. 37 is a flow-chart of contraction procedure (Step 413);

DETAILED DESCRIPTION OF THE PREFERRED EMBODIMENT

Figure 1:
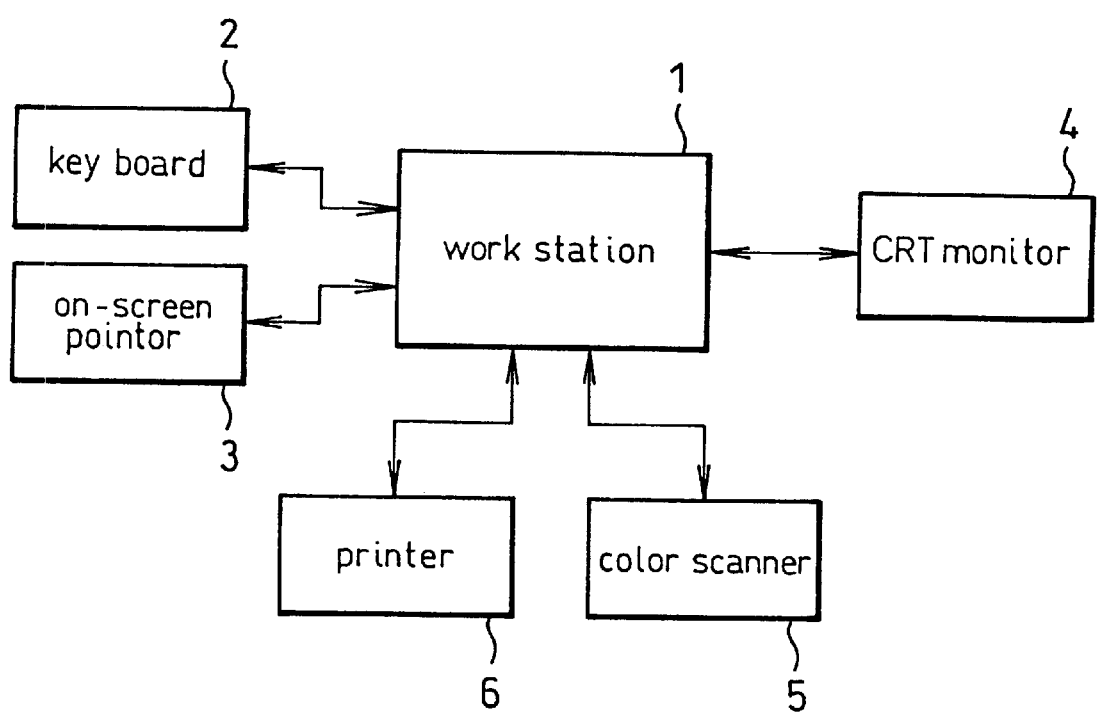
FIG. 1 is a block diagram representation of a two-dimensional picture image display apparatus according to the invention.

In FIG. 1, workstation 1 performs processing of two-dimensional color picture data which has been stored in the workstation 1.

A key board 2 is coupled to workstation 1 for entering various instructions for workstation 1. A point on a CRT monitor 4 may be selected by pointing at the point with a on-screen pointer 3.

A CRT monitor 4 is adapted to display two-dimensional picture data for processing the picture data on a working window shown on the monitor. Color scanner 5 imports an image data such as a photograph with a predetermined resolution and a predetermined bit depth. A printer 6 outputs image data with a predetermined resolution. Printer 6 can be a color printer for printing a color picture image.

Figure 2:
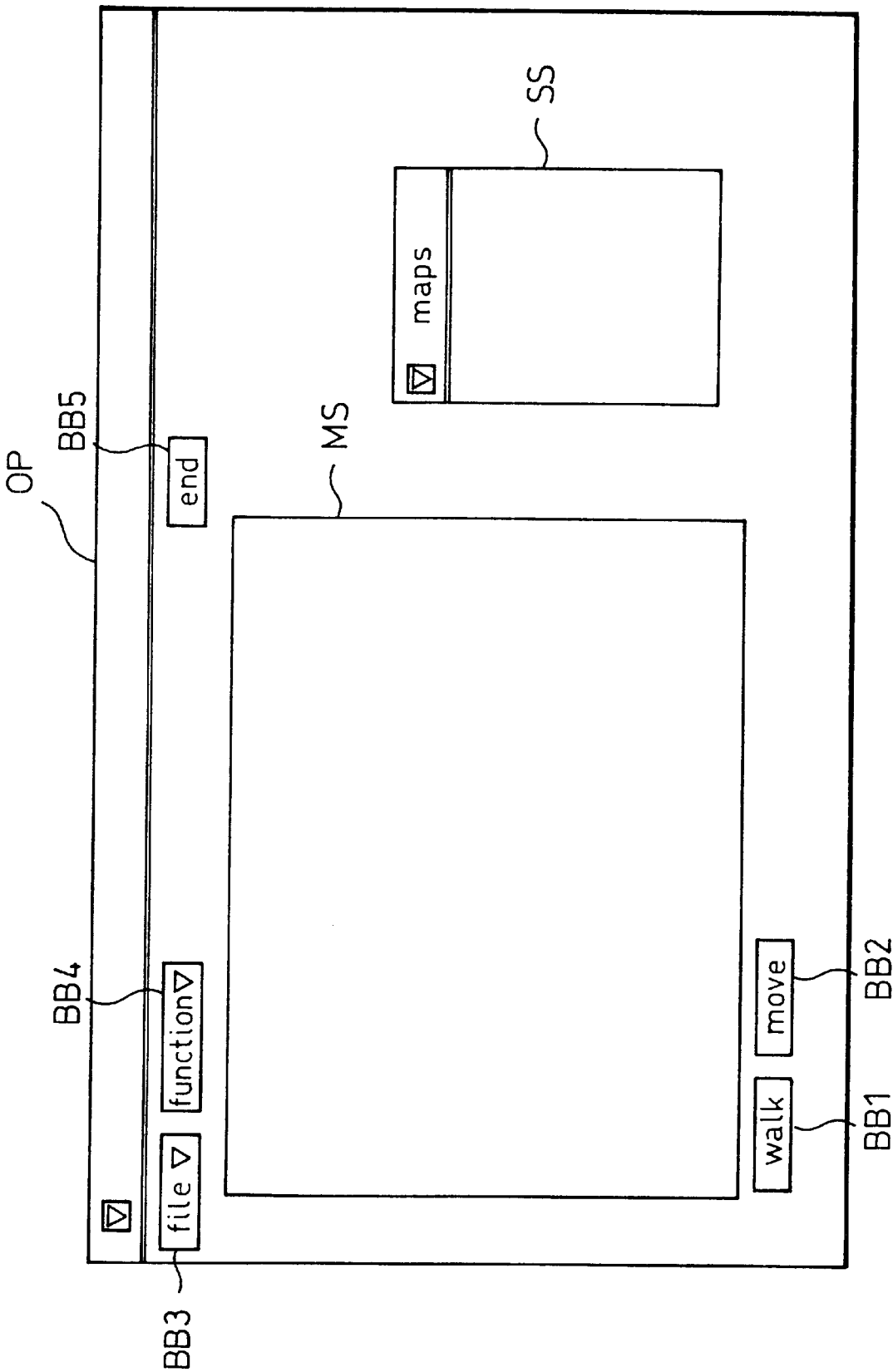
FIG. 2 is an exemplary picture image control panel OP of a two-dimensional color picture image display application of the invention.

FIG. 2 illustrates a picture image control window OP of the second color picture image display application. Typical two-dimensional color picture image data that can be displayed on the window is a photograph of an object and the like that provides the viewer of the picture with a perspective image of the object.

The picture control window OP has a main window MS for displaying picture data in the form of a picture, a sub-window SS for showing a set of control parameters, a walk button BB1 for modifying the picture displayed on the main window in accordance with a virtual forward, backward or rotation motion of the view point of the viewer; a move button BB2 for the representing movement of the view point to the left and right; and a button BB3 for showing a menu, and a button BB4 for various other functions, and a button BB5 for instructing the program to end its processing.

As the user selects two-dimensional-picture data, the data is displayed on the main window 95, showing a path in a park, for example, taken by a camera.

If the user wishes to change or move his view point, he presses walk button BB1 or move button BB2 to select a walk operation or move operation. He then operates on-screen pointing device 3 to point at a specific point on the main window MS. By "view point" we mean a position of a virtual eye perceiving the same perspective view of the picture that is obtained by a camera taking the picture. Hence, if the picture is a photograph, the view point corresponds to the position of the camera taking the picture.

Figure 3:
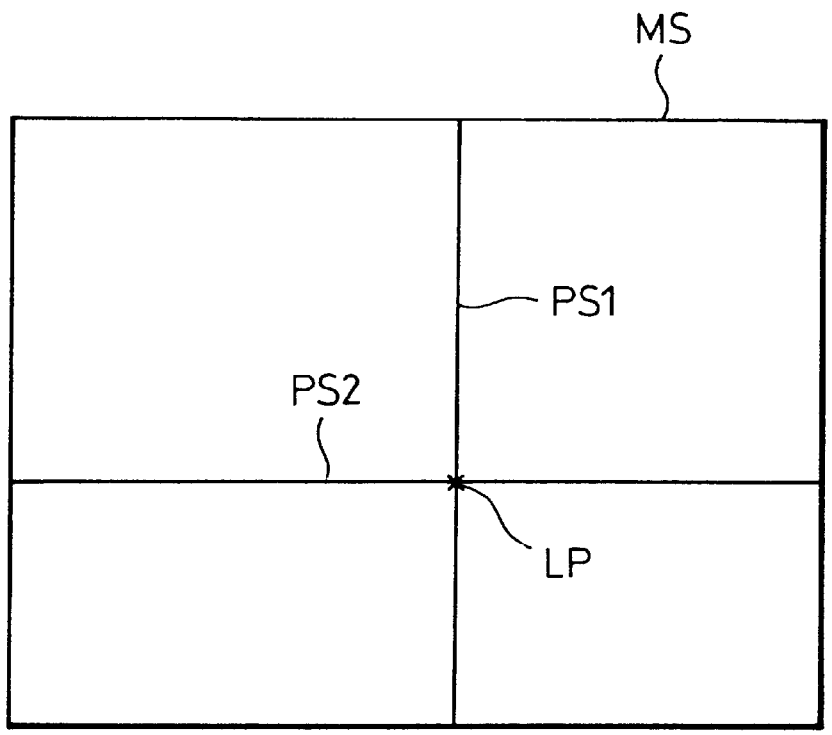
FIG. 3 is a schematic diagram for explaining virtual lines PS1 and PS2.
Figure 4:
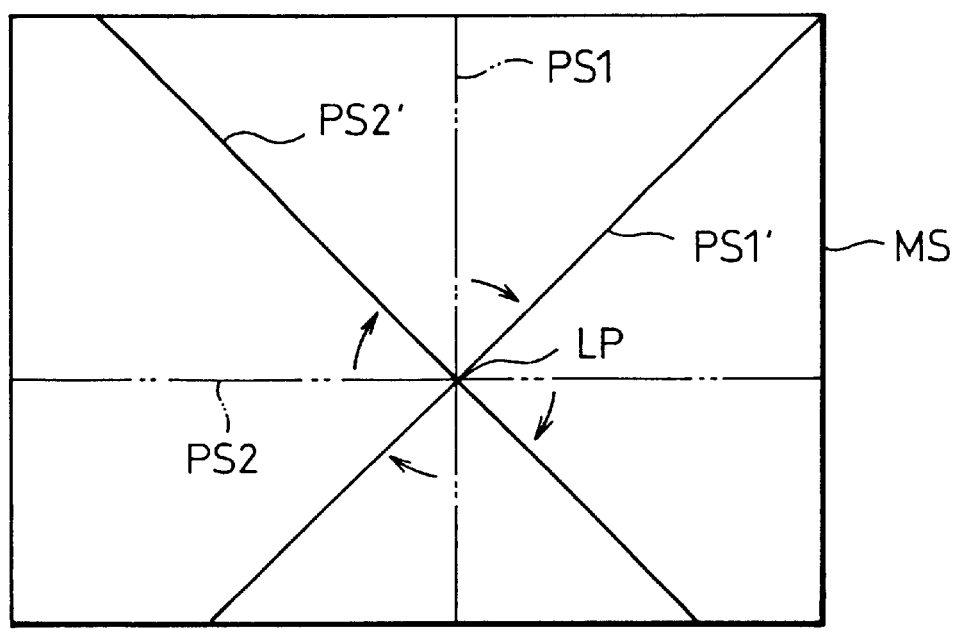
FIG. 4 is a schematic diagram of the virtual lines PS1 and PS2 rotated in the clockwise direction through 45 degrees about a reference point LP.
Figure 5:
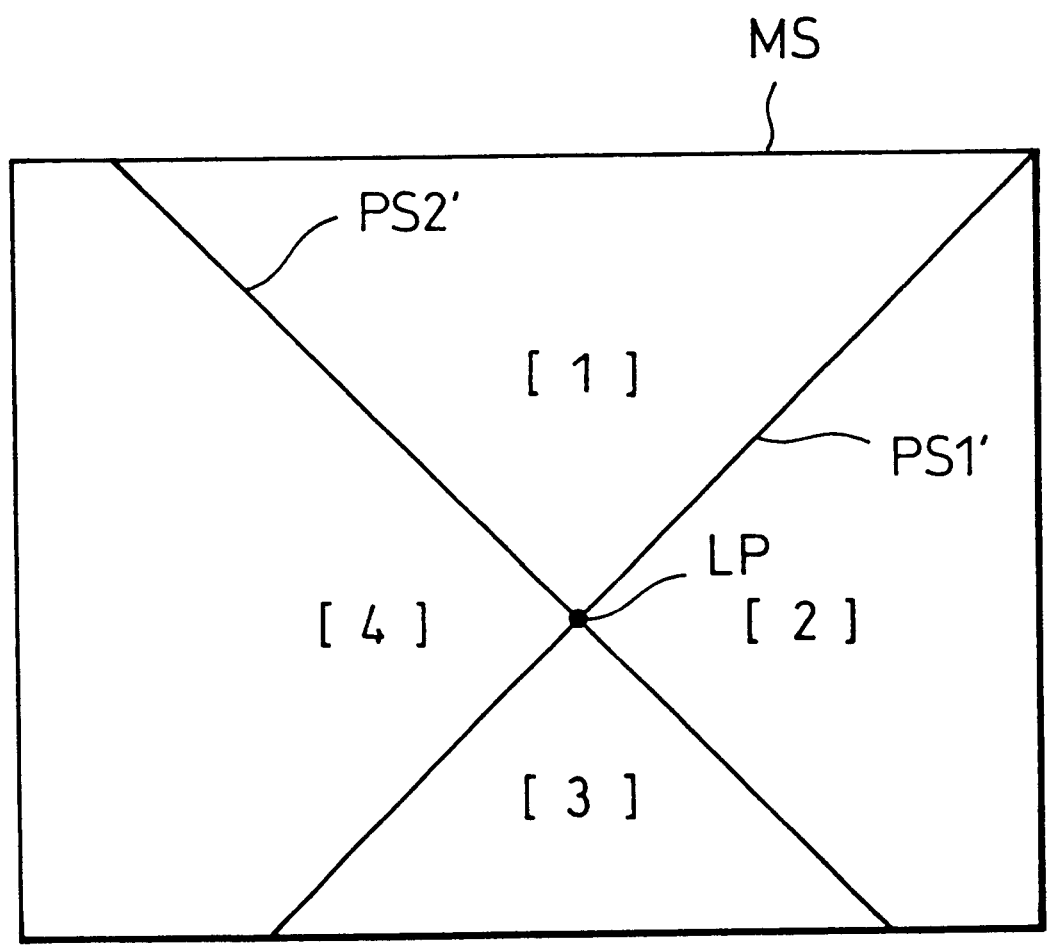
FIG. 5 is a schematic diagram showing move determination domains 1–4.
Figure 6:
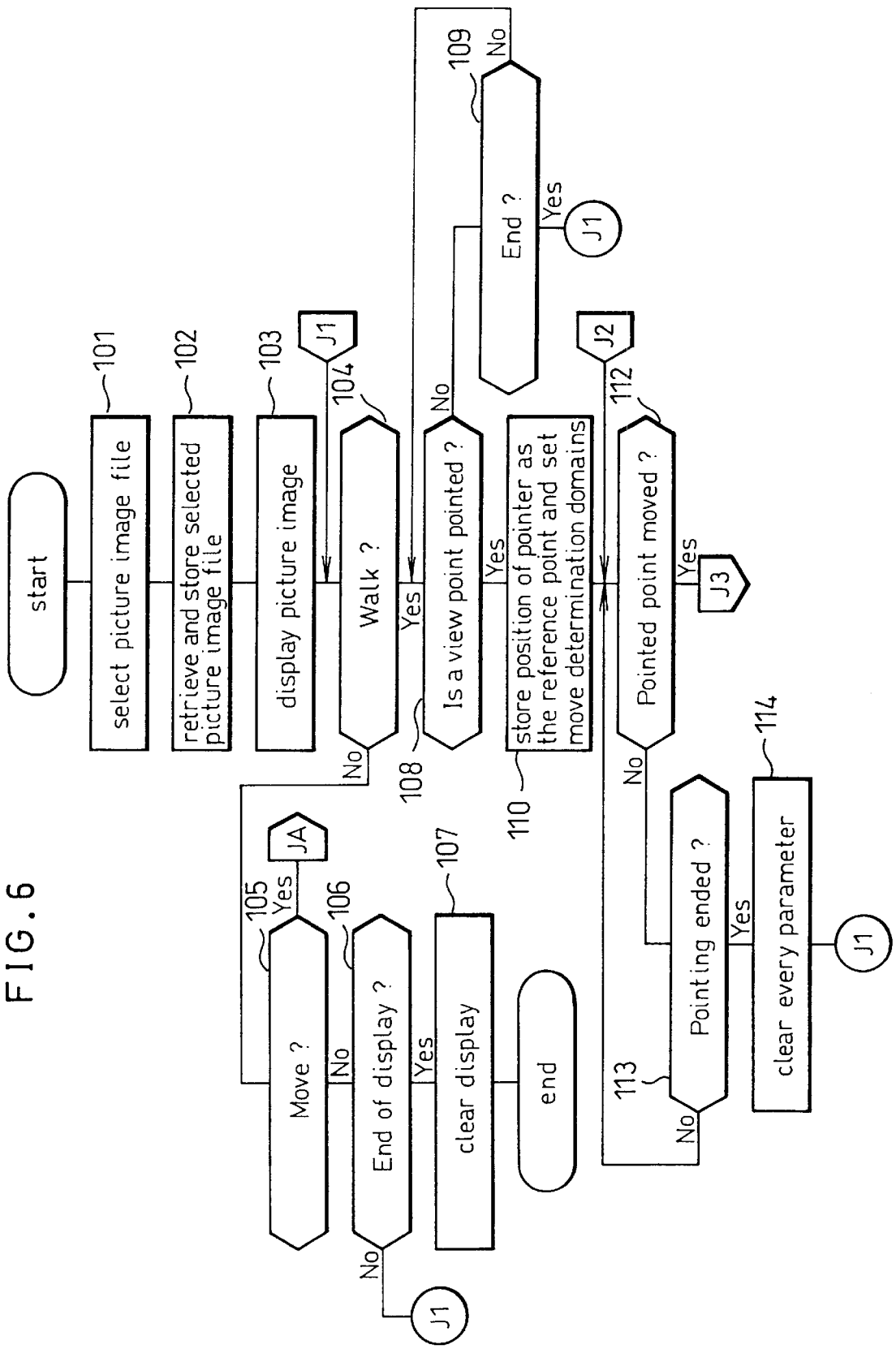
FIG. 6 is a portion of a flow-chart showing an algorithm of the two-dimensional color picture image display application.
Figure 7:
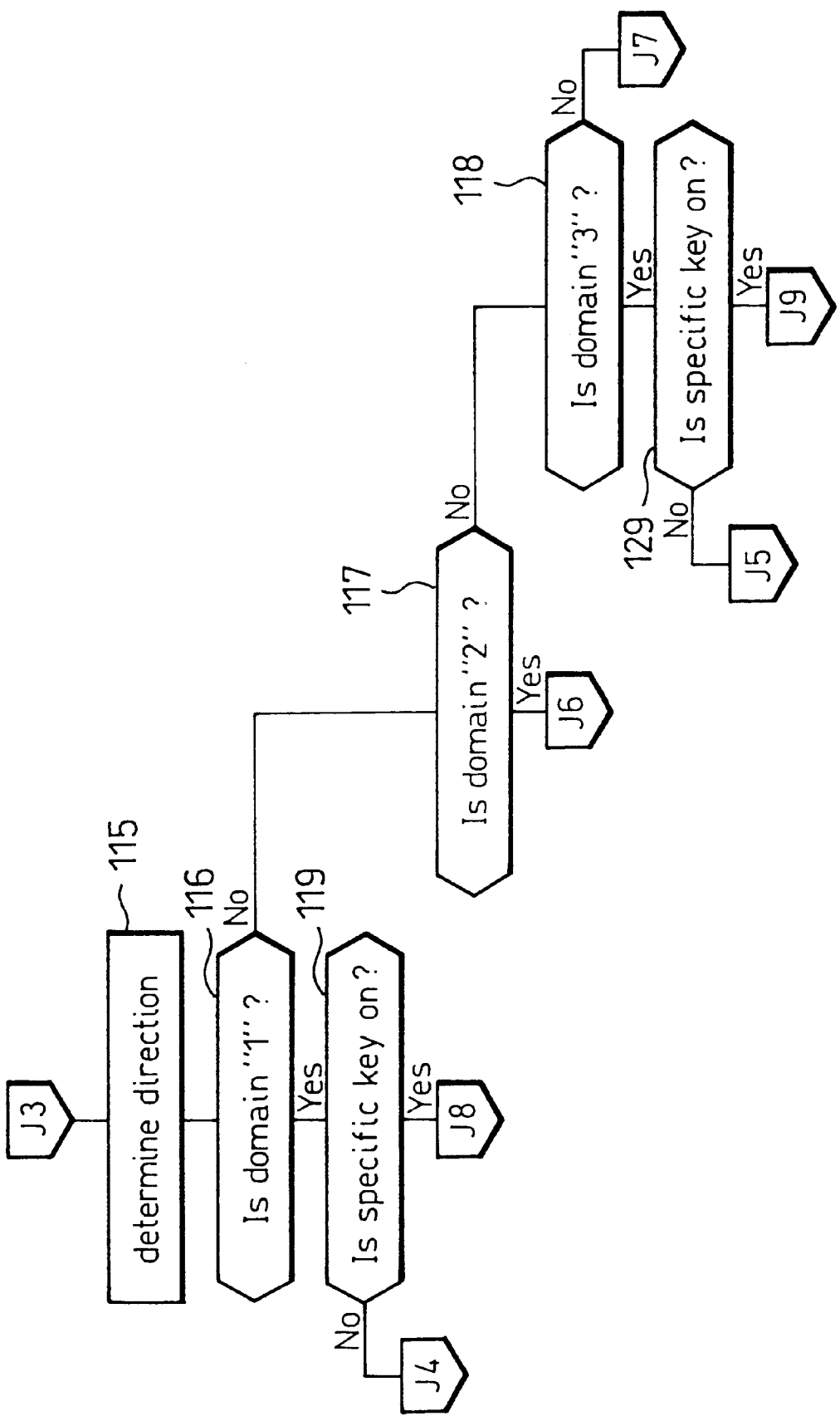
FIG. 7 is a another section of the flow-chart of the picture image display application.
Figure 8:
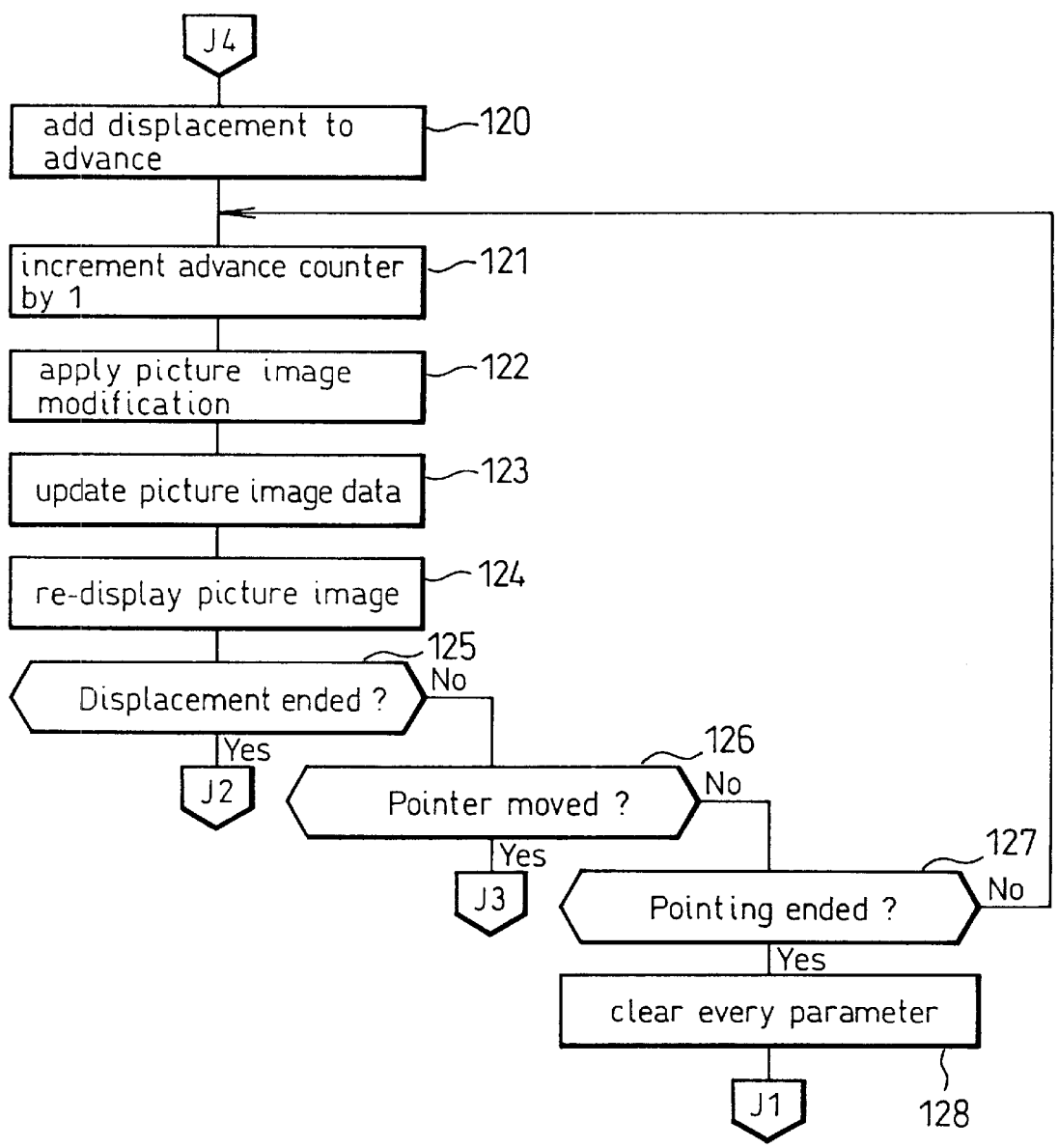
FIG. 8 is a further section of the flow-chart of the picture image display application.
Figure 9:
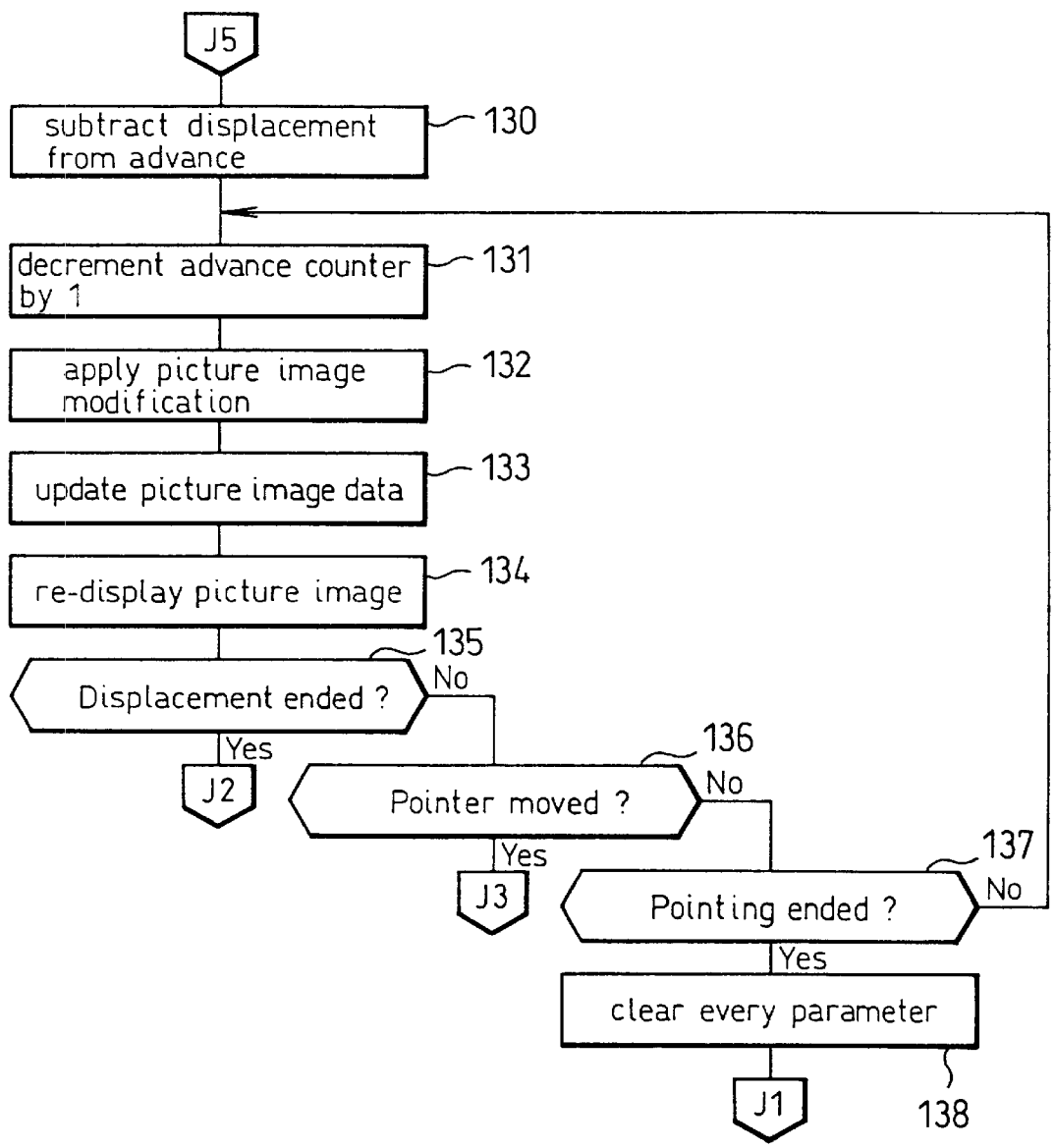
FIG. 9 is a still further section of the flow-chart of the picture image display application.
Figure 10:
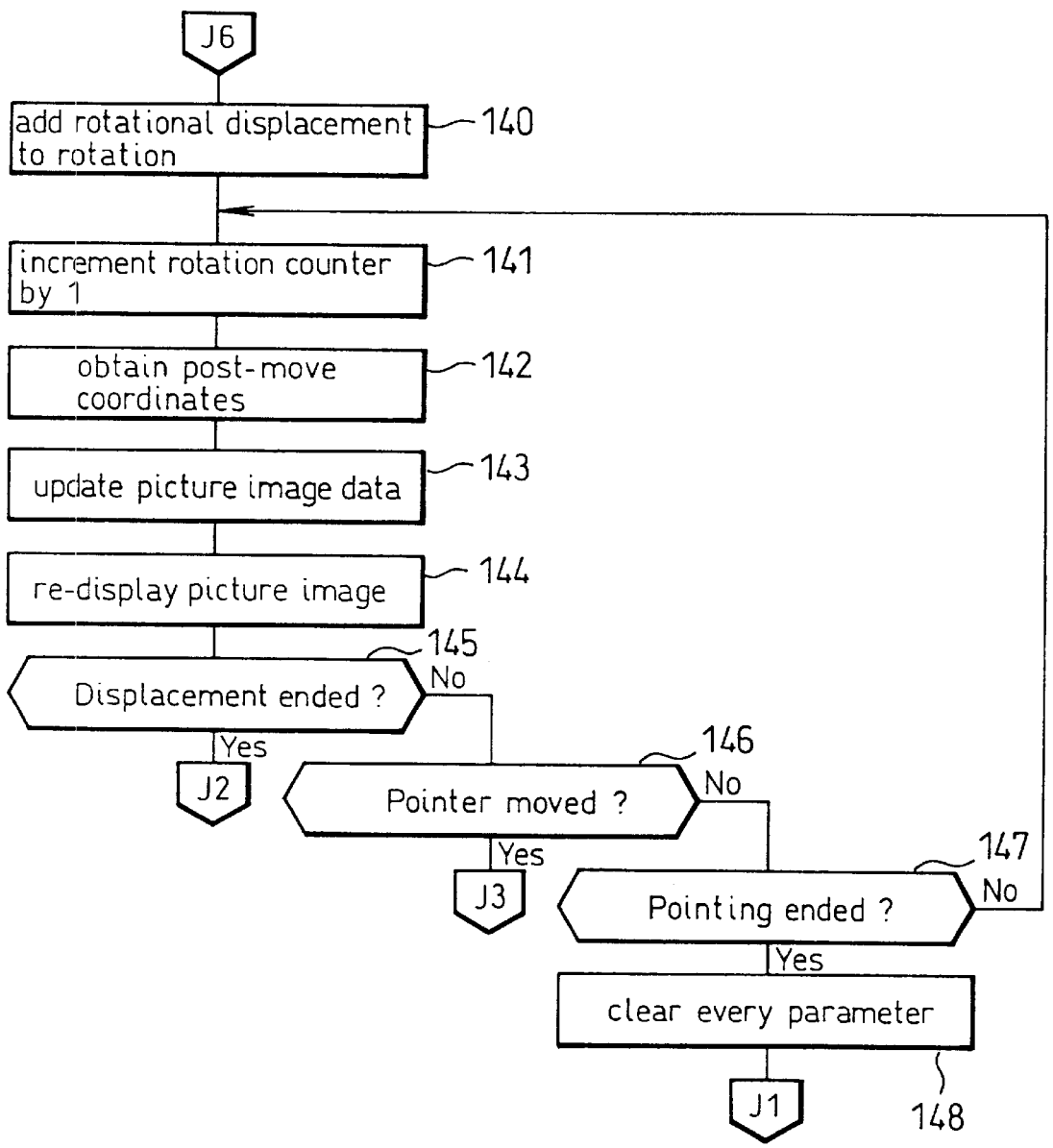
FIG. 10 is a still further section of the flow-chart of the picture image display application.
Figure 11:
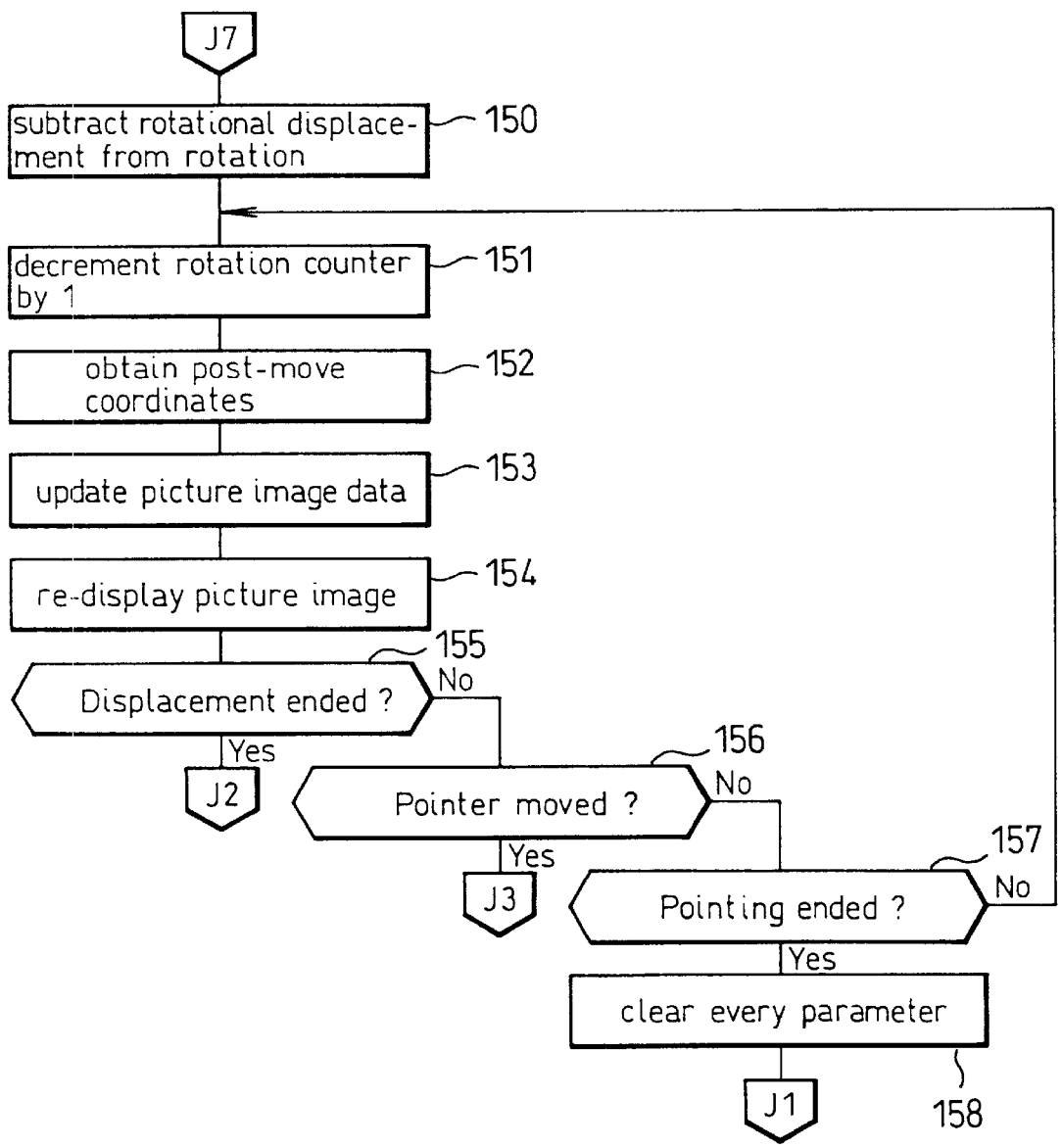
FIG. 11 is a still further section of the flow-chart of the picture image display application.
Figure 12:
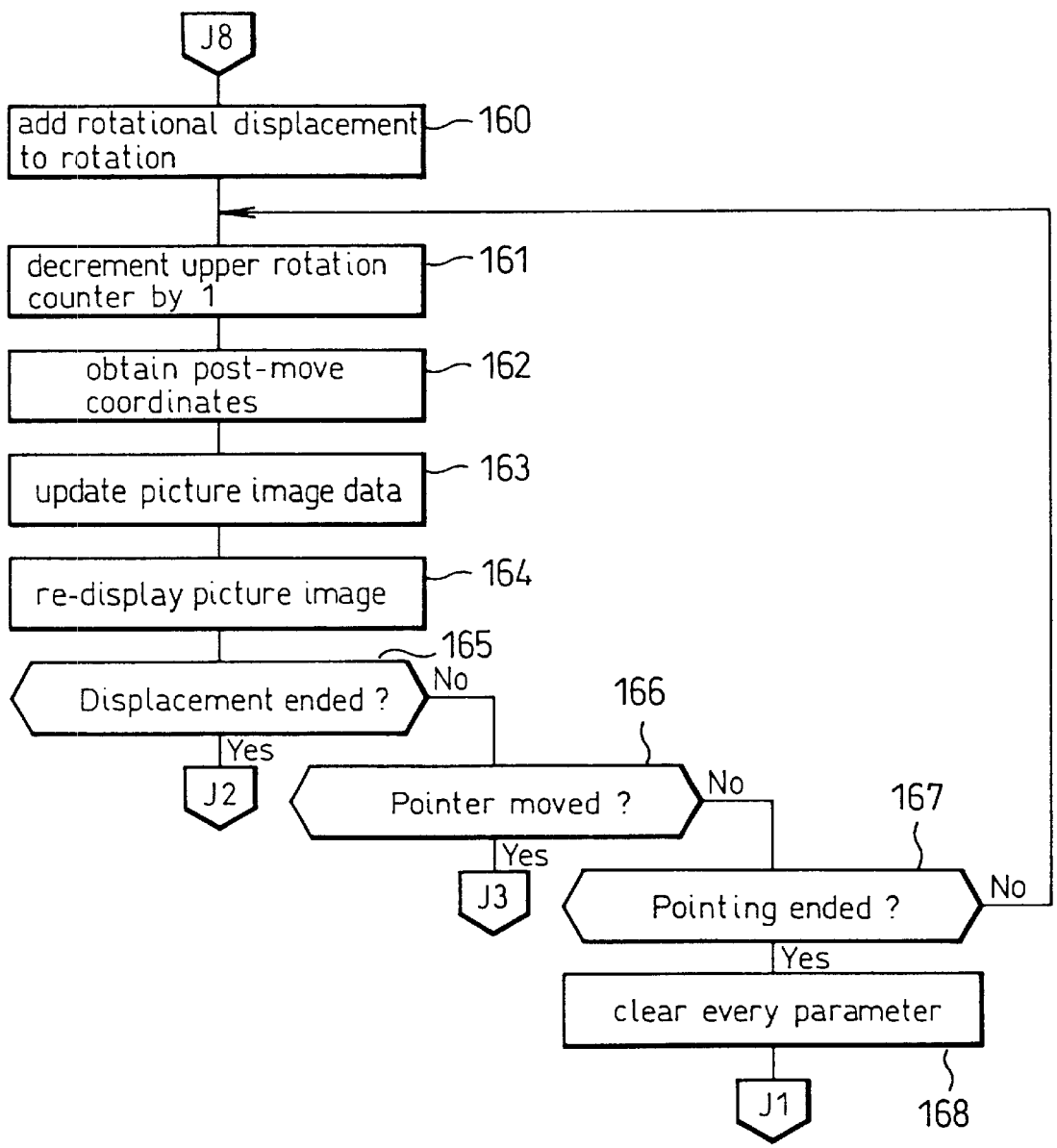
FIG. 12 is a still further section of the flow-chart of the picture image display application.
Figure 13:
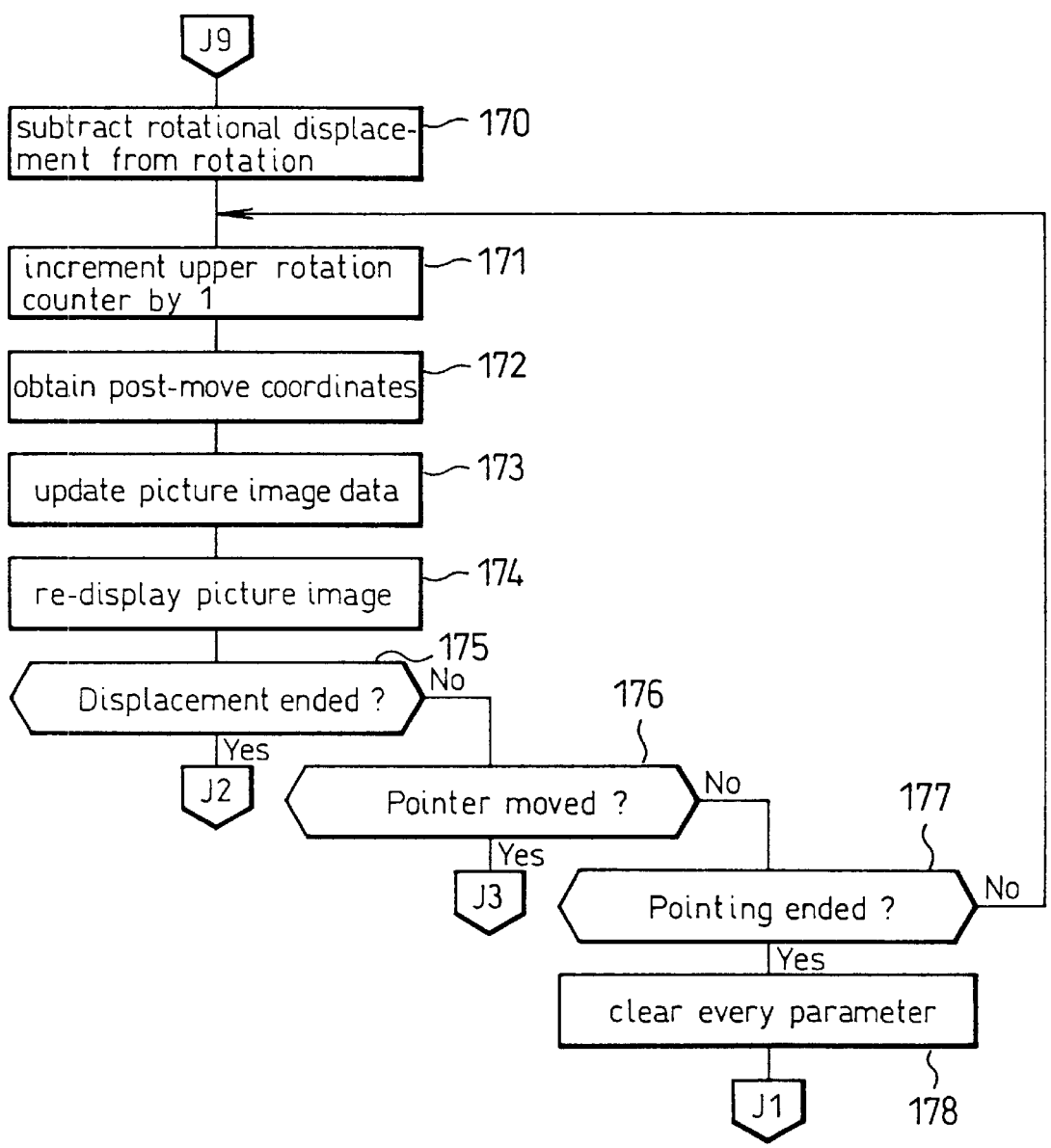
FIG. 13 is a still further section of the flow-chart of the picture image display application.
Figure 14:
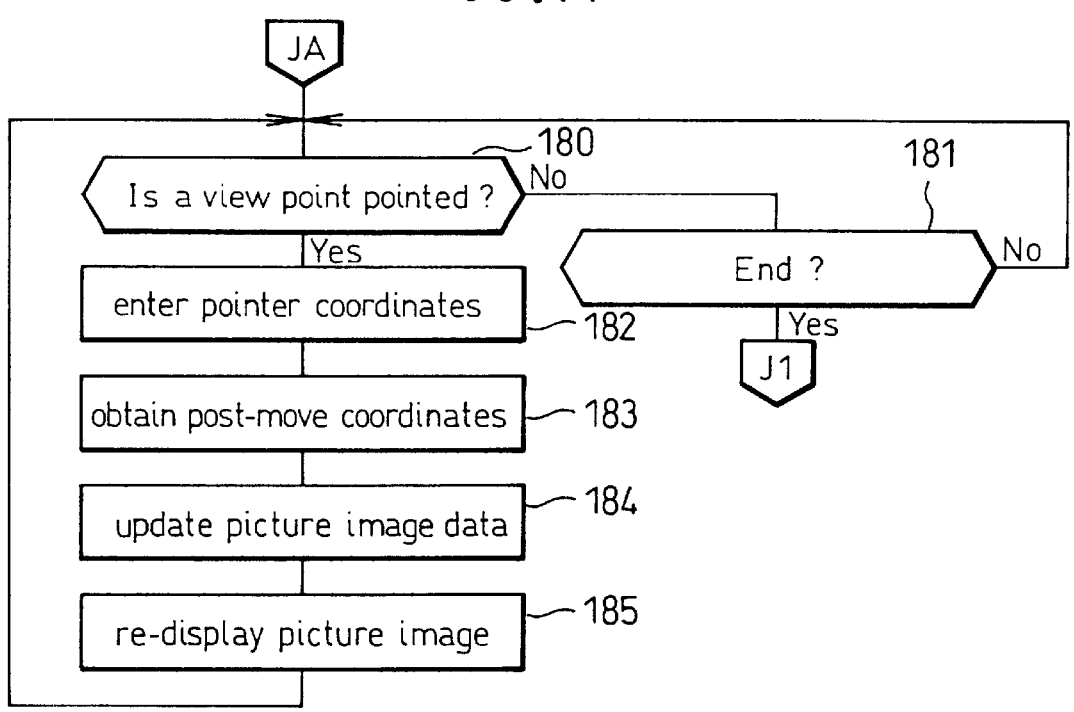
FIG. 14 is a still further section of the flow-chart of the picture image display application.

Workstation 1 internally constructs on the main window MS an imaginary line PS1 passing through the point LP selected by the pointer (hereinafter referred to as reference point LP) and extending vertically and an imaginary horizontal line PS2 passing through the reference point LP, as shown in FIG. 3. Workstation 1 then rotates the imaginary lines PS1 and PS2 through 45 degrees in the clockwise direction, as shown in FIG. 4, and as shown in FIG. 5, defines move determination domains 1–4.

Move determination domain 1 is provided for determining whether the view point is advanced or not; move determination domain 2 is provided to determine whether the view point has a rotational movement (i.e., whether the line of sight of the viewer is rotated at the site) to the right; move determination domain 3 is provided to determine whether the view point is receded or not; and move determination domain 4 is provided to determine whether the view point is rotated to the left. The amount of a move is determined from the amount of corresponding movement of the pointer from the reference point LP on the main window.

If, for example, the user selects a walk operation and "advances" the view point (i.e., advances the view point into the move determination domain 1), workstation 1 magnifies some portion of the picture in accordance with the advance, and updates the modified picture image on the display.

If, on the other hand, the user "recedes" (i.e., moves the view point into the move determination domain 3), workstation 1 contracts the picture in accordance with the amount of the recession, and display updated picture image data.

If the user chooses to rotate the line of sight to the left or right through an angle at the site of the view point (by moving the pointer to the left or right into the move determination domains 2 or 4), workstation 1 modifies the picture in a way such that the resultant picture represents the scene taken by a camera rotated through the angle as specified by the pointer.

In this case portions of the picture close to the perspective point are subjected to a greater amount of modification than the rest since the portions are remote from the camera, while portions of the picture adjacent to its fringe are subjected to no modification, so that "remote portions" of the picture representing remote objects are moved (modified) more than nearby portions, thereby giving the user a feeling as if he were looking at the scenery through a finder of a rotating camera.

When the user points to move determination domain 1 or 2 while pressing a specified key of the keyboard 2, workstation 1 interprets this instruction as indicating rotation of the camera (i.e., rotation of the line of sight) in the upward or downward direction, respectively, at a fixed camera position. The updated picture shows a section of the scenery taken by the camera which has been rotated upward or downward. (This movement of the camera may be interpreted as a "walk" of the line of sight of the camera.)

In this walk operation, the picture is updated in multiple steps, instead of a single step, until a desired modification is reached. This enables the main window to display various stages of changing views in a realistic manner as seen by a rotating camera.

When the user selects a "move" operation and points or selects an arbitrary point on the main window, the view point is set on the selected point, which results in shifting the camera to that point. The picture is then updated by modifying the picture image data to one which is obtained by the camera now looking at the perspective point from the new camera position. The updated picture image data is then displayed on the main window.

It should be noted that in this case portions of the picture close to the perspective point (remote portions) must have a smaller modification, while portions adjacent the picture frame (near portions) must have a greater modification, so that the remote portions are moved much more than the near portions. This modification provides the user with an impression that he is looking at the same object while moving to the new camera position.

Thus, in the example shown herein, as the user changes his view point on the main window from one view point to another, the picture displayed on the main window MS is changed realistically in a manner as if the camera is moved from one view point to another.

As a special example, given a picture of a satellite taken by a Voyager, it is possible to construct an image data of a picture that could be obtained from a camera position which is not actually accessible. Such picture would be very useful.

FIGS. 6–14 outlines the data processing procedure of a two-dimensional color picture image data display application according to the invention.

Figure 15:
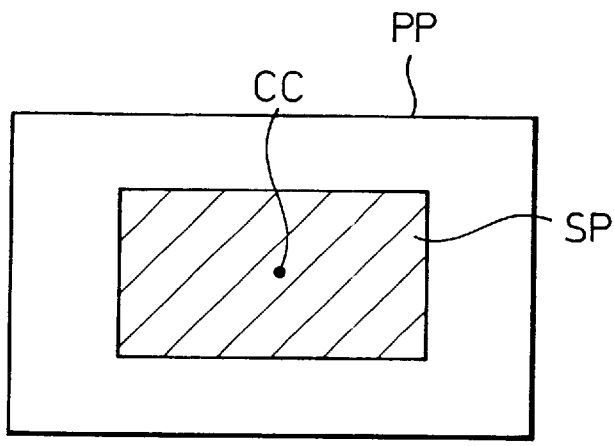
FIG. 15 is a schematic diagram used in explaining a relationship between the size of a picture image file to be displayed and the size of a picture displayed on a main picture image window.

The procedure proceeds from the starting step 100 to step 101 when the user selects a picture image data file. The data file is retrieved and then displayed on a work domain (step 102) and displayed on the main window MS of the display control window OP (step 103). It should be noted that in this case, the picture size SP, which is the size, in dots, of a picture displayed on the main window MS, is smaller than the size PP of the original picture image, as shown in FIG. 15. For example, a typical picture size SP is 320×240 dots as compared with 640×480 dots of the size PP, which corresponds to displayed bit ratio of 0.5.

Under this condition the procedure determines whether either one of the walk buttons BB1 of the OP, BB2, and BB5 has been pressed (steps 104, 104, and 106). If the BB5 has been pressed by the user, so that the determination in step 106 is YES, the main window is cleared (step 107), thereby ending the procedure.

If the button BB1 of the OP is pressed by the user, so that the determination in step 104 is YES, the procedure waits (NO loop of determinations 108 and 109) for another pointing on the pointing domain of the main window MS or an instruction for ending the procedure. If the determination in step 109 is YES, the procedure proceeds to step 104.

If a point is pointed to on the main window MS, so that the determination in step 108 is YES, the coordinates of the point are stored as the coordinates of the reference point LP, setting up move determination domains as described above (step 110).

Next, the procedure monitors whether the pointer is displaced or pointing is ended (NO loop of determinations 112 and 113). If the user has ended pointing, so that the determination in step 113 is YES, each of the display parameters including advance, advance counter, rotation, rotational counter, upward and downward rotational counters (which will be described in detail later) is cleared (step 114), and the procedure returns to determination 104 to prepare for further processes.

When the user has changed the position of point, so that the determination in step 112 is YES, a determination is made as to the move determination domain in which the moved point exists. (steps 115–118).

If the moved point is in the move determination domain 1, yielding YES in the determination 116, a further determination is made whether a specific key is pressed, as described above (determination 119).

If the determination of 119 is NO, indicating that an advance movement has been selected, the displacement of the move made in the Y direction with respect to the reference point LP is determined, which is then added to the value of the variable "advance" that represents the currently intended final advancement of the view point, thereby updating the target advance value (step 120).

Next, the advance counter is incremented by 1 for making one step for the advance movement (step 121), and a magnification factor is calculated by adding a constant number of 100 to the value of the advance counter in step 122. The original image data is modified such that the original picture is magnified by the magnification factor (step 123). The portion of the magnified picture having the size PP of the original picture is cut out, which is further multiplied by the factor to construct a picture image data having the display size SP. The picture image data is displayed on the main window MS, refreshing or updating the picture on the main window MS (step 124).

In step 125, it is determined whether the desired advancing displacement has been achieved by comparing the value of the advance counter with the target advance value. If the determination in step 126 is NO, a determination is made to see whether the user has moved the pointer again (step 126). If not, the procedure returns to step 121, and increment the advance counter by 1, and repeat updating of the picture image data, as described above.

If, on the other hand, the value of the advance counter matches the target advance value and the determination is YES in step 125, indicating that the specified displacement has been completed, the procedure returns to step 112 and prepares for the next user instruction.

If the user has moved the pointer again, so that the determination in step 126 is YES, the procedure returns to step 115, and determination of the direction of the move proceeds to the subsequent processes.

If the user has ended pointing, yielding YES in step 127, such parameters as target advance value, advance counter, rotation, rotational counter, and upward rotational counter) are cleared (step 128), and the procedure returns to step 104 to prepare for subsequent processes.

If the position of the moved pointer is in the move determination domain 3, so that the determination in step 118 is YES, a further determination is made if the specific key, as mentioned above, has been pressed in step 129.

If the answer is NO in the query 129, it implies that the operation selected by the user is a backward move. In this case, the displacement in Y direction from the reference point LP is subtracted from the target advance value, to thereby update the advance value and set a new target advance value (step 130).

Next in step 131, the value of the advance counter is decreased by 1 for carrying out one step for the receding movement, and a magnification factor is calculated by adding a constant number of 100 to the value of the advance counter in step 132. The original image data is updated such that the original picture is magnified (which is actually contraction) by the magnification factor (step 133). The portion of the magnified (i.e., contracted) picture that lies within the picture size PP of the original picture is cut out, which is further multiplied by a given displayed bit ratio to construct a picture image data having the display size SP. The picture image data is displayed on the main window MS, refreshing or updating the picture on the main window MS (step 134).

In step 135, it is determined whether the desired advancing displacement has been achieved by comparing the value of the advance counter with the target advance value. If the determination in step 136 is NO, a determination is made to see whether the user has moved the pointer again (step 136). If not, the procedure returns to step 131, and the advance counter is incremented by 1, and updating of the picture image data is repeated, as described above.

If, on the other hand, the value of the advance counter matches the target advance value and the determination is YES in step 135, indicating that the specified displacement has been completed, the procedure returns to step 112 and prepares for the next user instruction.

If the user has moved the pointer again, so that the determination in step 136 is YES, the procedure returns to step 115, and determination of the direction of the move proceeds to the subsequent processes.

If the user has ended pointing, yielding YES in step 137, such parameters as target advance value, advance counter, rotation, rotational counter, and upward rotational counter) are cleared (step 138), and the procedure returns to step 104 to prepare for subsequent processes.

If the position of the moved pointer is in the move determination domain 2, and the determination in step 117 is YES, implying that the rightward rotation has been selected, the displacement in X direction from the reference point LP is added to the value of the variable "rotation" which represents the desired final or target rotation, so that the target rotation is updated to the new target rotation (step 140).

Figure 16:
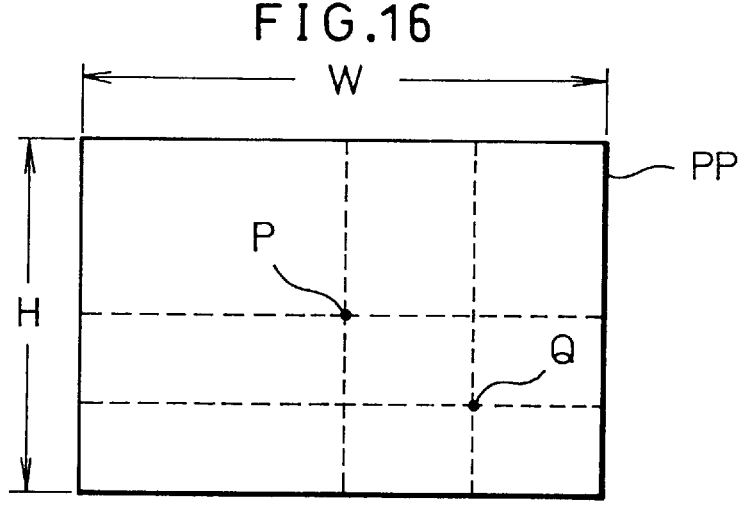
FIG. 16 is a schematic diagram useful in explaining the relationship between the center and a rotational center of an originally given picture image.
Figure 17:
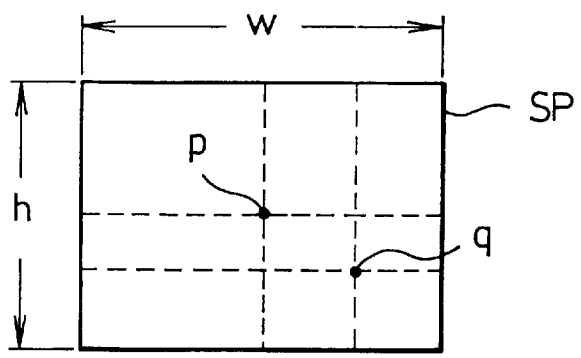
FIG. 17 is a schematic diagram usefull in explaining the relationship between the center and a rotational center of a picture image displayed on the main picture image window.

Next in step 141, the value of the rotational counter for carrying out one step of the rotation is incremented by 1. The X coordinate of the center point for carrying out the rotation is calculated by adding the value of the rotational counter to the X coordinate of the center point of the currently displayed picture. It should be noted that in this case the Y point for the rotation coincides with the Y coordinate of the center point of the picture since the picture is merely rotated to the right. FIGS. 16 and 17 show relative positions of the center point P of the original picture, the center point p of the picture as displayed on the main picture window MS, the center point Q of the rotation of the original picture, and the center point q of the picture displayed on the main window MS.

In step 142, given the coordinate (qx, qy) of the center q of the rotation, calculation is made to find a pixel of the original picture image data which a given pixel of the picture data displayed on the main window MS matches and determine the coordinate of the moved point.

Figure 18:
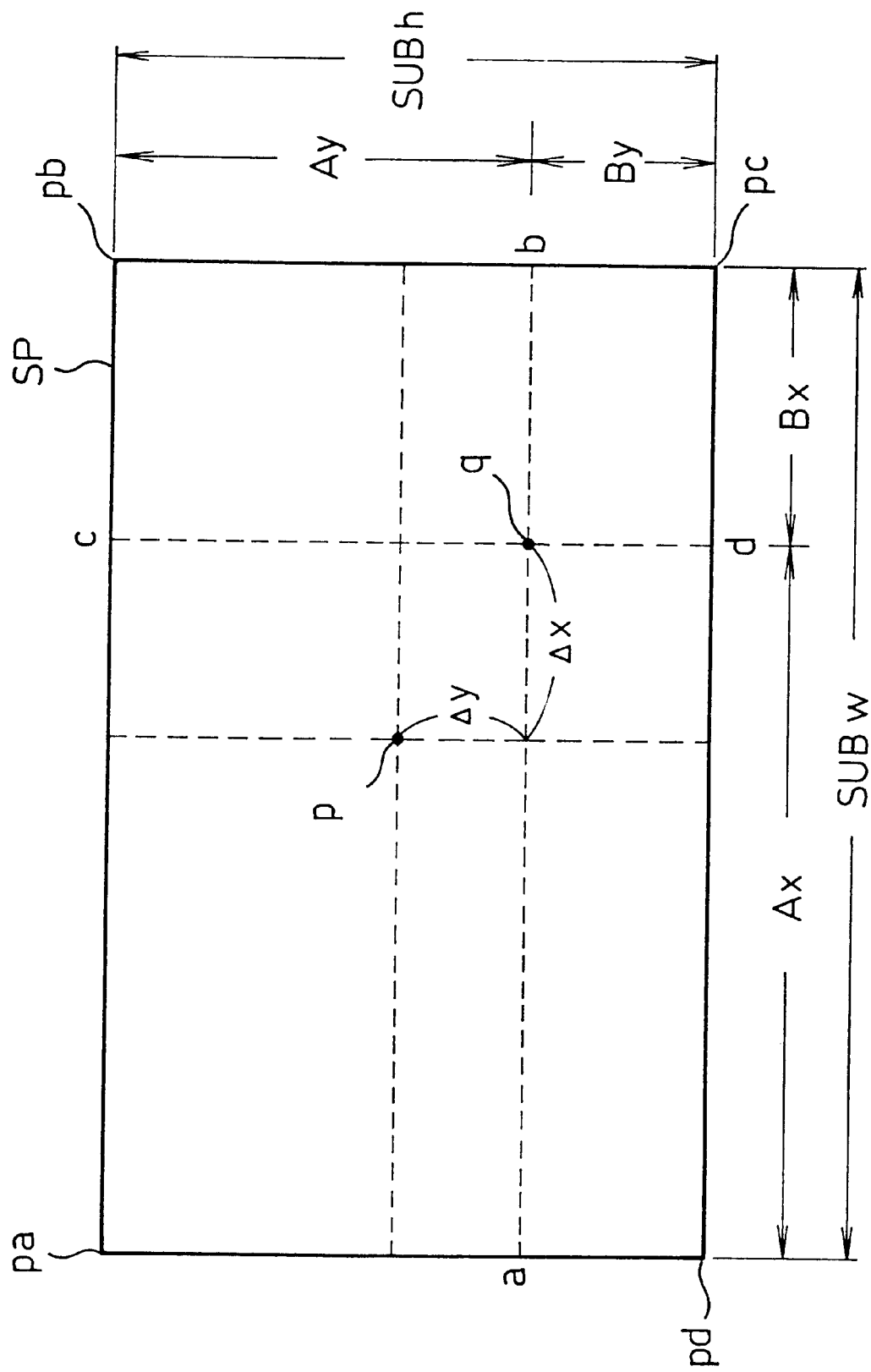
FIG. 18 is a schematic diagram showing various parameters and constants defined for a picture image displayed on the main picture image window.

Values of the various parameters and the values of the relevant constants are determined for a picture image data displayed on the main window MS, as shown in FIG. 18. The reference point for the pixels is the upper left corner point pa, whose coordinates are set to (0,0). The upper right corner point pb of the window has coordinates (320, 0); the point pc at the lower right corner, (320, 240); and the point pd at the lower left corner, (0, 240).

Variable Ax represents the X coordinate of the rotational center point 1, variable Bx is defined to be the size of picture in the X direction, SUBw (=320) minus the X coordinate of the rotational center point q. Variable Ay represents the Y coordinate of the rotational center 1, Variable By is defined to be the size of picture in the Y direction, SUBh (=240) minus the Y coordinate of the rotational center point q. Variable Δx represents the difference between the X coordinate of the center point p of the picture and the X coordinate of the rotational center point q. Variable Δy represents the difference between the Y coordinate of the center point p of the picture and the Y coordinate of the rotational center point q. The coordinates px and py of the center point p of the picture are obtained by multiplying corresponding coordinates of the center of the original picture Px and Py by a displayed bit ratio. The center point P of the original picture may be fixed at the center of the picture window, or fixed by the user at an arbitrary point of the window.

In step 142, if the coordinates of a pixel, (x, y) are such that x≦qx and y≦qy, the corresponding coordinates (Qx, Qy) of the original picture are calculated using the following formulas I and II:

$$Qx=(x+(Ax/SUBw)\cdot \Delta \cdot S \tag{I}$$

$$Qy=y\cdot S, \tag{II}$$

where S is the displayed bit ratio.

Also, the coordinates (Qx, Qy) of the original picture are calculated from the coordinates of the pixel, (x, y), by the following formulas (III) and (IV) if x>qx and y≦qy:

$$Qx=(x-((SUBw-x)Bx)\cdot \Delta x)\cdot S \tag{III}$$

$$Qy=y\cdot S \tag{IV}$$

The coordinates (Qx, Qy) of the original picture are calculated from the coordinates of the pixel, (x, y), by the following formulas (V) and (VI) if x>qx and y>qy:

$$Qx=(x-((SUBw-x)/Bx)\cdot \Delta x)\cdot S \tag{V}$$

$$Qy=y\cdot S \tag{VI}$$

Similarly, the coordinates (Qx, Qy) of the original picture are calculated from the coordinates of the pixel, (x, y), by the following formulas (VII) and (VIII) if x≦qx and y>qy:

$$Qx=(x+(Ax/SUBw)\cdot \Delta x)\cdot S \tag{VI}$$

$$Qy=y\cdot S \tag{VIII}$$

In this manner, when every corresponding coordinates (Qx, Qy) of the original picture are calculated for each of the pixels of the picture displayed on the main window, picture data is constructed by copying each of the calculated coordinates (step 143) and is displayed on the main window, thereby updating the window (step 144).

In step 145, it is queried whether the specified displacement has been completed, that is, whether the value of the rotational counter matches the specified rotation. If the answer is NO, it is further determined whether the user has again displaced the pointer (step 146). If he has not, it is determined whether the user has ended pointing (step 147). If he has not, the procedure returns to step 141 to increment the rotational counter by 1 and proceeds to a further picture image processing.

If the value of the rotational counter matches the specified rotation, so that the specified displacement has been completed (YES in query 145), the procedure returns to step 112 to wait for the user's next instruction.

If the user has again displaced the pointer (YES in the determination in step 146), the procedure returns to step 115, where the direction of the new displacement is determined for subsequent processing.

If the user has ended the pointing operation, so that the determination is YES in step 147, every parameter (advance value, advance counter, rotation, rotational counter, and upward rotational counter, and so forth) used in displaying the current picture image data is cleared (step 148), and the procedure returns to step 104 to prepare for the next operation.

If the position of the displaced pointer is in the move determination domain 4, and the determination in step 118 is NO, implying that the user selected a leftward rotation, a new target rotation is obtained by subtracting the magnitude of the displacement in X direction from the reference position LP from the current target rotation (step 140).

Next, in step 141, the value of the rotational counter for carrying out one step of the rotation is decreased by 1. The X coordinate of the center point for carrying out the rotation is calculated by adding the value of the rotational counter to the X coordinate of the center point of the currently displayed picture.

In step 152, given the coordinates (qx, qy) of the center q of the rotation, a calculation is made to find a pixel of the original picture image data which a given pixel of the picture data displayed on the main window MS matches and determine the coordinate of the pixel of the original picture image data for each of the pixel of the picture displayed on the main window MS, as is done in step 142.

A picture data is constructed by copying each of the calculated coordinates (step 153) and is displayed on the main window, thereby updating the window (step 154).

In step 155, it is queried whether the specified displacement has been completed, that is whether the value of the rotational counter matches the specified rotation. If the answer is NO, it is further determined whether the user has again displaced the pointer (step 156). If he has not, it is determined whether the user has ended pointing (step 157). If he has not, the procedure returns to step 151 to decrease the value of the rotational counter by 1 and proceeds to a further picture image processing.

If the value of the rotational counter matches the specified rotation, so that the specified displacement has been completed (YES in query 155), the procedure returns to step 112 to wait for the user's next instruction.

If the user has again displaced the pointer (YES in the determination in step 146), the procedure returns to step 115, where the direction of the new displacement is determined for subsequent processing.

If the user has ended pointing operation, so that the determination is YES in step 157, every parameter (advance value, advance counter, rotation, rotational counter, and upward rotational counter, and so forth) used in displaying the current picture image data is cleared (step 158), and the procedure returns to step 104 to prepare for the next operation.

If the position of the displaced pointer is in the move determination domain 1, and a specific key is pressed, so that the determination in step 119 is YES, implying that the user selected an upward rotation, a new target rotation is obtained by subtracting the magnitude of the displacement in Y direction from the reference position LP from the current target rotation (step 160).

Next, in step 161, the value of the rotational counter for carrying out one step of the rotation is decreased by 1. The Y coordinate of the center point for carrying out the rotation is calculated by adding the value of the rotational counter to the Y coordinate of the center point of the currently displayed picture. It is noted that the X coordinate of the rotational center is the same as the X coordinate of the center of the picture, since the intended operation is to rotate the displayed picture upward.

In step 162, given the coordinates (qx, qy) of the center q of the rotation, calculation is made to find a pixel of the original picture image data which a given pixel of the picture data displayed on the main window MS matches and determine the coordinates of the moved point.

In step 162, if the coordinates of a pixel, (x, y) are such that $x \leq qx$ and $y \leq qy$, the corresponding coordinates (Qx, Qy) of the original picture are calculated using the following formulas IX and X:

$$Qx = x \cdot S \qquad \text{(IX)}$$

$$Qy = (y + (Ay/SUBh) \cdot \Delta y) \cdot S \qquad \text{(X)}$$

If the coordinates of the pixel (x, y) are in the domain with $x > qx$ and $y \leq qy$, the coordinates (Qx, Qy) of the original picture are calculated by the following formulas (XI) and (XII):

$$Qx = x \cdot S \qquad \text{(XI)}$$

$$Qy = (y + (Ay/SUBh) \cdot \Delta y) \cdot S \qquad \text{(XII)}$$

If the coordinates of the pixel (x, y) are in the domain with $x > qx$ and $y > qy$, the coordinates (Qx, Qy) of the original picture are calculated by the following formulas (XIII) and (XIV):

$$Qx = x \cdot S \qquad \text{(XIII)}$$

$$Qy = (y + ((SUBh - y)/By) \cdot \Delta y) \cdot S \qquad \text{(XIV)}$$

If the coordinates of the pixel (x, y) are in the domain with $x \leq qx$ and $y > qy$, the coordinates (Qx, Qy) of the original picture are calculated by the following formulas (XV) and (XVI):

$$Qx = x \cdot S \qquad \text{(XV)}$$

$$Qy = (y + ((SUBh - y)/By) \cdot \Delta y) \cdot S \qquad \text{(XVI)}$$

In this manner, when every corresponding pair of coordinates (Qx, Qy) of the original picture are calculated for each of the pixel of the picture displayed on the main window, picture data is constructed by copying each of the calculated coordinates (step 163) and is displayed on the main window, thereby updating the window (step 164).

In step 165, it is queried whether the specified displacement has been completed, that is, whether the value of the rotational counter matches the specified rotation. If the answer is NO, it is further determined whether the user has again displaced the pointer (step 166). If he has not, it is determined whether the user has ended pointing (step 167). If he has not, the procedure returns to step 161 to decrease the value of the rotational counter by 1 and proceeds to a further picture image processing.

If the value of the rotational counter matches the specified rotation, so that the specified displacement has been completed (YES in query 165), the procedure returns to step 112 to wait for the user's next instruction.

If the user has again displaced the pointer (YES in the determination in step 166), the procedure returns to step 115, where the direction of the new displacement is determined for subsequent processing.

If the user has ended the pointing operation, so that the determination is YES in step 167, every parameter (advance value, advance counter, rotation, rotational counter, and upward rotational counter, and so forth) used in displaying the current picture image data is cleared (step 168), and the procedure returns to step 104 to prepare for the next operation.

If the position of the displaced pointer is in the move determination domain 3 and a specific key has been pressed, so that the determination in step 129 is YES, implying that the user selected a downward rotation, a new target rotation is obtained by adding the magnitude of the displacement in the Y direction from the reference position LP from the current target rotation (step 170).

Next, in step 171, the value of the rotational counter for carrying out one step of the rotation is decreased by 1. The Y coordinate of the center point for carrying out the rotation is calculated by adding the value of the rotational counter to the Y coordinate of the center point of the currently displayed picture.

In step 172, given the coordinates (qx, qy) of the center q of the rotation, calculation is made to find a pixel of the original picture image data in which a given pixel of the picture data displayed on the main window MS matches and to determine the coordinate of the pixel of the original picture image data for each of the pixels of the picture displayed on the main window MS, as is done in step 162.

Picture data is constructed by copying each of the calculated coordinates (step 173) and is displayed on the main window, thereby updating the window (step 174).

In step 175, it is queried whether the specified displacement has been completed, that is, whether the value of the rotational counter matches the specified rotation. If the answer is NO, it is further determined whether the user has again displaced the pointer (step 176). If he has not, it is determined whether the user has ended pointing (step 177). H he has not, the procedure returns to step 171 to increment the upward rotational counter by one and proceeds to a further picture image processing.

If the value of the rotational counter matches the specified rotation, so that the specified displacement has been completed (YES in query 175), the procedure returns to step 112 to wait for the user's next instruction.

If the user has again displaced the pointer (YES in the determination in step 176), the procedure returns to step 115, where the direction of the new displacement is determined for subsequent processing.

If the user has ended the pointing operation, so that the determination is YES in step 177, every parameter (advance value, advance counter, rotation, rotational counter, and upward rotational counter, and so forth) used in displaying the current picture image data is cleared (step 178), and the procedure returns to step 104 to prepare for the next operation.

If the button BB2 of the OP is pressed by the user, so that the determination in step 105 is YES, the procedure waits (NO loop of determinations 180 and 181) for another pointing on the pointing domain of the main window MS or an instruction for ending the procedure. If the determination in step 109 is YES, the procedure proceeds to step 104.

If a point is pointed to on the main window MS, so that the determination in step 180 is YES, the coordinates of the point are stored as the coordinates of the new viewpoint (step 182).

In step 183, the coordinates of the pixels moved on the main picture window MS are calculated based on the new view point in such a way that portions of the picture close to the perspective point have a smaller modification but portions adjacent the picture frame have a greater modification. A new picture image data is constructed from the calculated coordinates for the original picture data by copying the calculated coordinates, which picture data is displayed on the main window MS, refreshing the window MS in step 185. The procedure then returns to step 180.

Although the present invention has been described above for a case in which a photograph is used as a source picture, it would be apparent that the invention is equally applicable to a pictorial image drawn by a perspective method.

The present invention will be now described for cases of animating a picture. The animation may be carried out using the apparatus as shown in FIG. 1 and described in connection with the foregoing example. However, a mouse is used as a picture pointing device 3 in the example below.

In animating a picture, the picture is imported on the main window to set up a multiplicity of arbitrarily separated view points for looking at the picture in just the same way as described in the preceding sections. A multiplicity of frames (which will be referred to as moving frames) are formed, interposed between two neighboring view points, along with a multiplicity of halt frames formed at the corresponding view points. The number of such frames are initially set by the user.

In addition to the view points, temporary view points are created, one for each moving frame, along an estimated path of the eye from one view point to anther. These view points are switched sequentially along the path and picture image data is constructed for each of the view points and displayed in the order of the frames along the path at a predetermined time interval, thereby showing them in the form of animated pictures.

An AVI type animation data may be obtained by storing these displayable picture image data as frame data of an AVI file. Also, by creating a CHS (tracing information) file comprising view point coordinates and transfer frame coordinates arranged in the order of the frames, the CHS file together with the original picture image data (such as an original photograph) may be used as a new animated picture.

Figure 19:
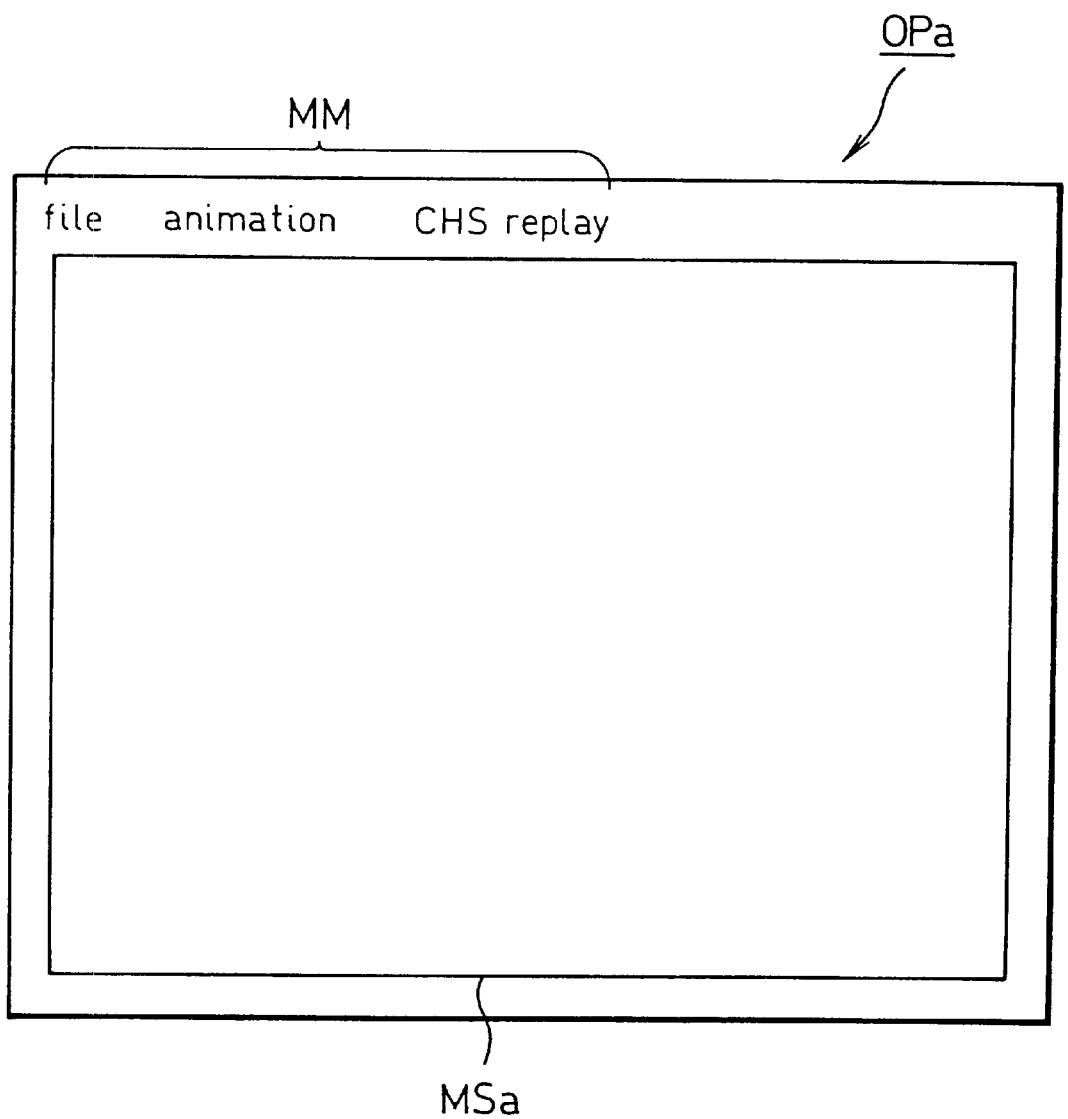
FIG. 19 is an example of a working window for displaying the picture created by the execution of the animation program of the application.

Animation pictures may be constructed by means of an application providing for a working window OPa as shown in FIG. 19.

The working window OPa has a main window MSa for displaying thereon a (two-dimensional) picture image data to be processed for generating animation picture. Provided above the main window MSa is a menu bar MM which can be opened for various works available.

Figure 20:
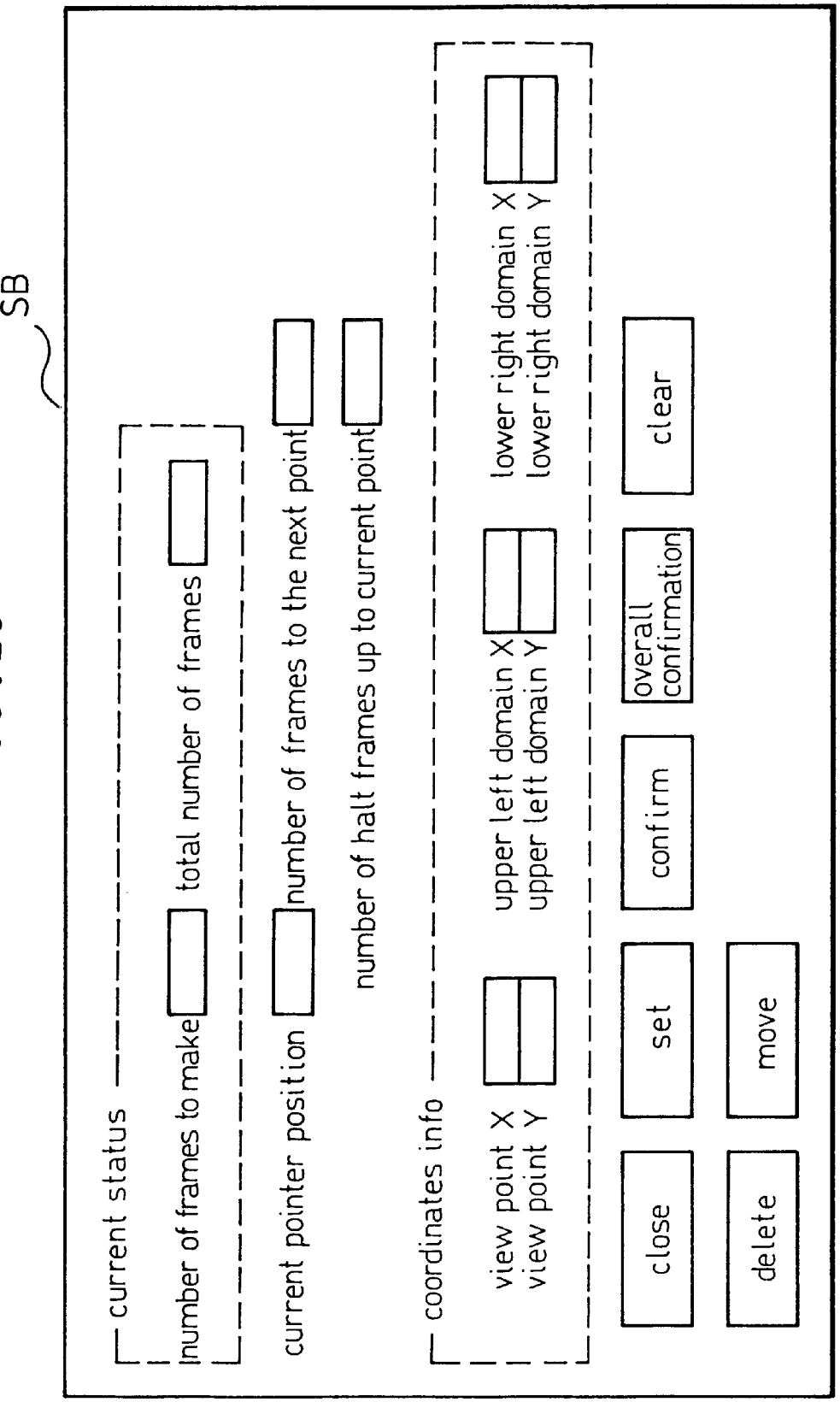
FIG. 20 shows a sub-window for the main picture image window.

Opening the File menu of the menu bar MM, there will be shown a panel listing displayable (two dimensional) picture image data. If the user selects one of them, it is displayed on the main window MSa in addition to the sub-window SB below the main window MSa, as shown in FIG. 20.

The sub-window SB contains such information as the number of view points set on the main window MSa, the total number of frames, the number of the view points of current interest (i.e., the current view point), the number of the moving frames lying between the current view point and the next view point, the number of halt frames of current interest (i.e., the number of the halt frames up to the current view point), X- and Y-coordinates of the view points (which will be referred to as view point X, and view point Y, respectively), the range of a transfer frame of a two-dimensional picture selected (that is, that portion of the picture displayed on the main window MSa) in terms of the coordinates of the upper left corner and lower right corner of the frame (upper left X, upper left Y, lower right X, and lower right Y), and operation buttons (for "CLOSE", "SET", "CONFIRM", "OVERALL CONFIRMATION", "CLEAR", "DELETE", and "MOVE").

Figure 21:
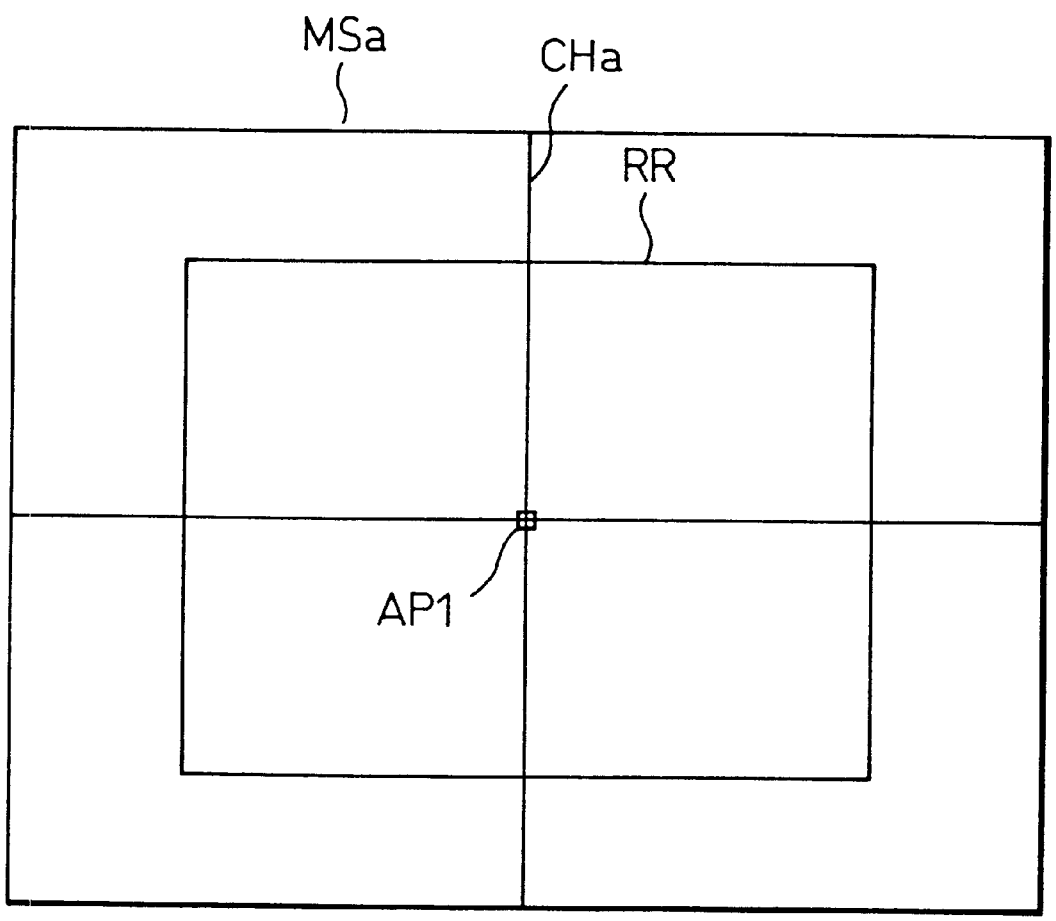
FIG. 21 is a guide figure used in creating an animation picture image.

The main window MSa also shows work guide lines which are superposed on the selected picture, as shown in FIG. 21. A mark AP1 is shown on the first view point. Centered at this mark AP1 is a cross-line cursor Cha. A range for a view point movable on the main window is marked by a frame RR.

Figure 22:
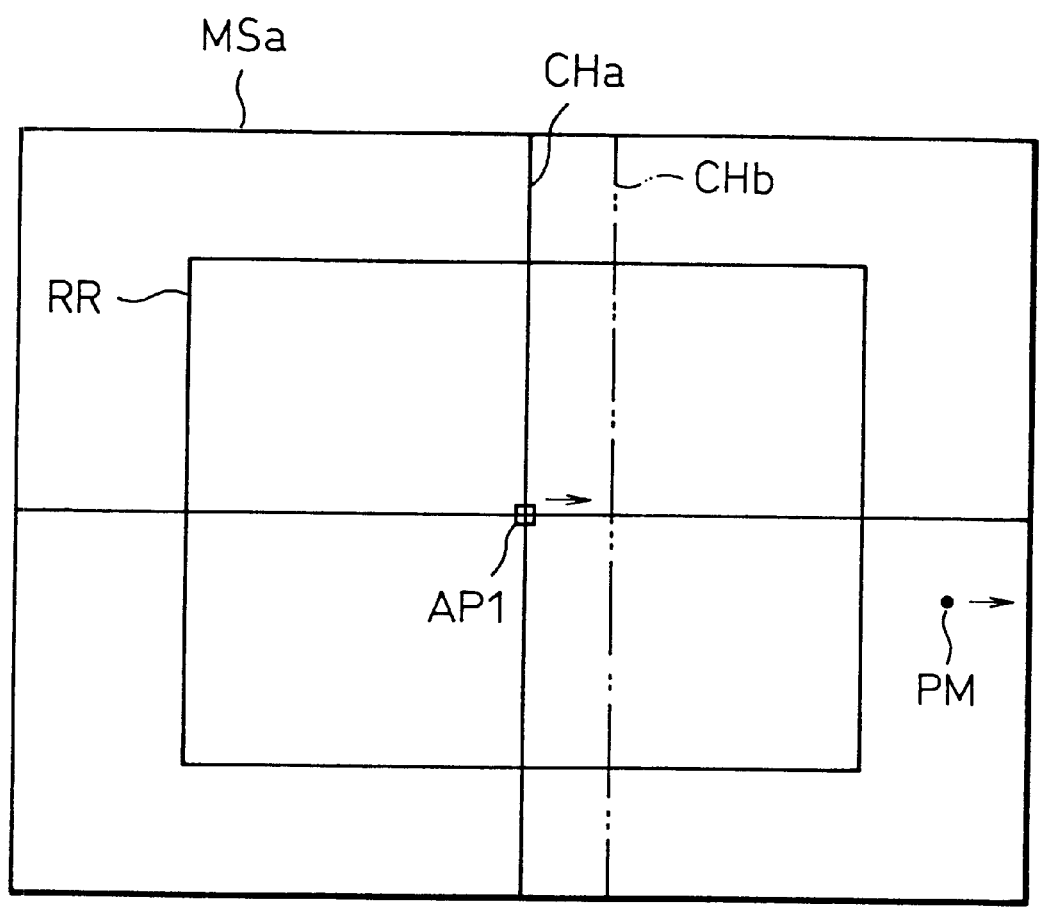
FIG. 22 is a figure displayed when the view point of the picture image is moved rightward.

In operation, in order to determine the next view point, the user places a mouse pointer PM at an appropriate point on the main window MSa, clicks the mouse button to select the point, and then drags the mouse pointer to the right, for example, with the mouse button still pressed, as shown in FIG. 22. Then the picture is gradually changed to represent the rotation of the view point (line of sight) to the right. That is, the picture is changed as if the user were looking at the scenery through a rotating viewer or a camera (view point) rotating about its position. At the same time, a cross-line cursor CHb is shown on the main window to indicate the orientation of the rotation of the camera in the direction in which the cross-line cursor CHb is deviated from the original cursor line CHa. In this instance the cursor, and hence the camera (view point), is rotated to the right.

It should be noted that the changes of the picture is carried out by a sequence of modifications with a predetermined short time interval while the user is dragging the mouse pointer. Other similar changes, i.e., leftward upward, and downward rotation, enlargement and contraction of the picture are also carried out in the same manner, with one modification in each of the short time intervals.

Figure 23:
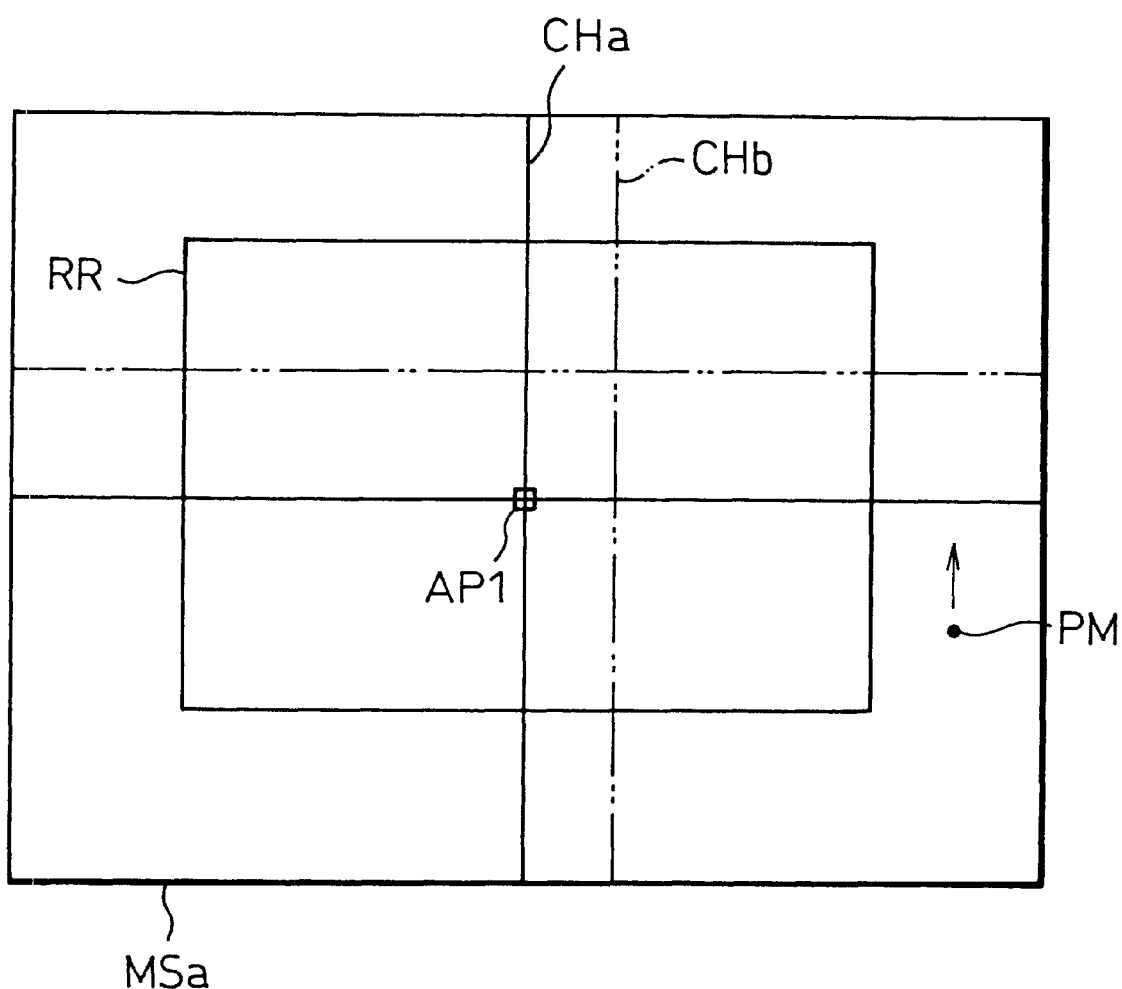
FIG. 23 is a figure displayed when the view point of the picture image is moved upward.

If the mouse pointer PM is then clicked at some appropriate position on the main window MSa as shown in FIG. 23, and dragged upward, for example, while pressing a shift key of the keyboard 2 (such dragging referred to as upward shift-dragging), the picture will be changed as if the camera were rotated upward about the current view point. The cross-line cursor CHb is now moved upward to indicate that the camera or the view point is rotated upward as described above.

At this stage, if the "SET" button of the sub-window SB is clicked with the mouse, a new view point is defined at the position indicated by the cross-line cursor CHb. The display maintains the picture as it is and the coordinate of the new view point is stored. In addition, a second mark AP2 is shown at the new view point, as shown in FIG. 24. Between the first mark AP1 and the second mark AP2 is a line segment connecting them to indicate a path LK1 of the view point moved from the first to the second view points.

Figure 25:
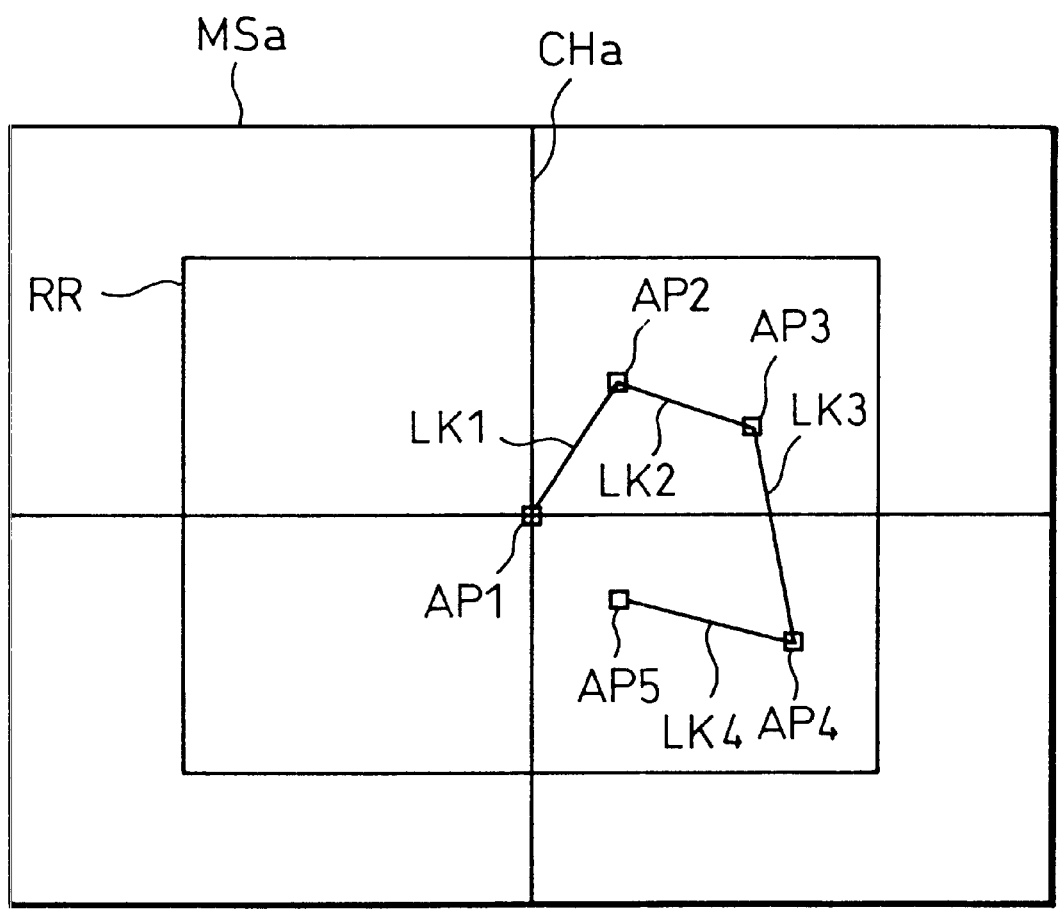
FIG. 25 is another figure displayed while setting a view point.

By repeating such an operation, the user may set up a multiplicity of view points connected by a sequence of paths, as shown in FIG. 25. In doing so, the mouse is dragged to the left when the user wishes to rotate the view point to the left, and the mouse is shift-dragged downward if he wishes to rotate the view point downward.

Shown in FIG. 25 are five view points as marked by marks AP1 through AP5, and a path which consists of four path segments LK1 through LK4, indicating the move of the view point along the path.

The picture may be enlarged in scale (i.e., magnified) and reduced in scale (i.e., contracted). For example, the user selects a portion of interest of the picture displayed on the main window MSa and sets a point (referred to as observation point) by clicking the mouse with the mouse pointer PM placed on the observation point. He then drags the mouse pointer upward as shown in FIG. 26, then the picture is enlarged with the observation point as the center of the magnification, as described in detail in the following paragraphs.

The procedure for this magnification will now be described in detail.

When the picture PPa of a picture image data is displayed on the main window MSa with a magnification factor of 1, the frame of the picture PPa coincides with the transfer frame SPa for defining the section of the picture cut out from the main window.

Figure 26:
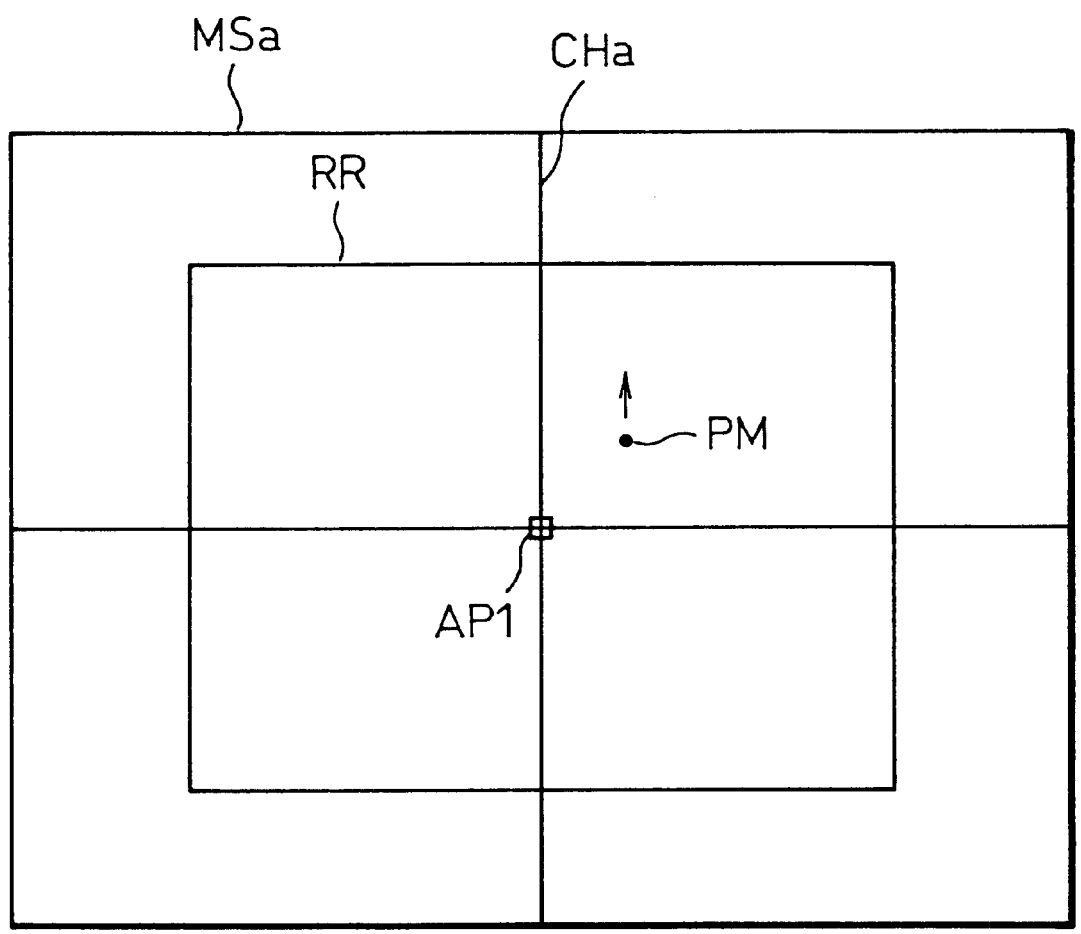
FIG. 26 is a figure displayed while a picture is enlarged.
Figure 27:
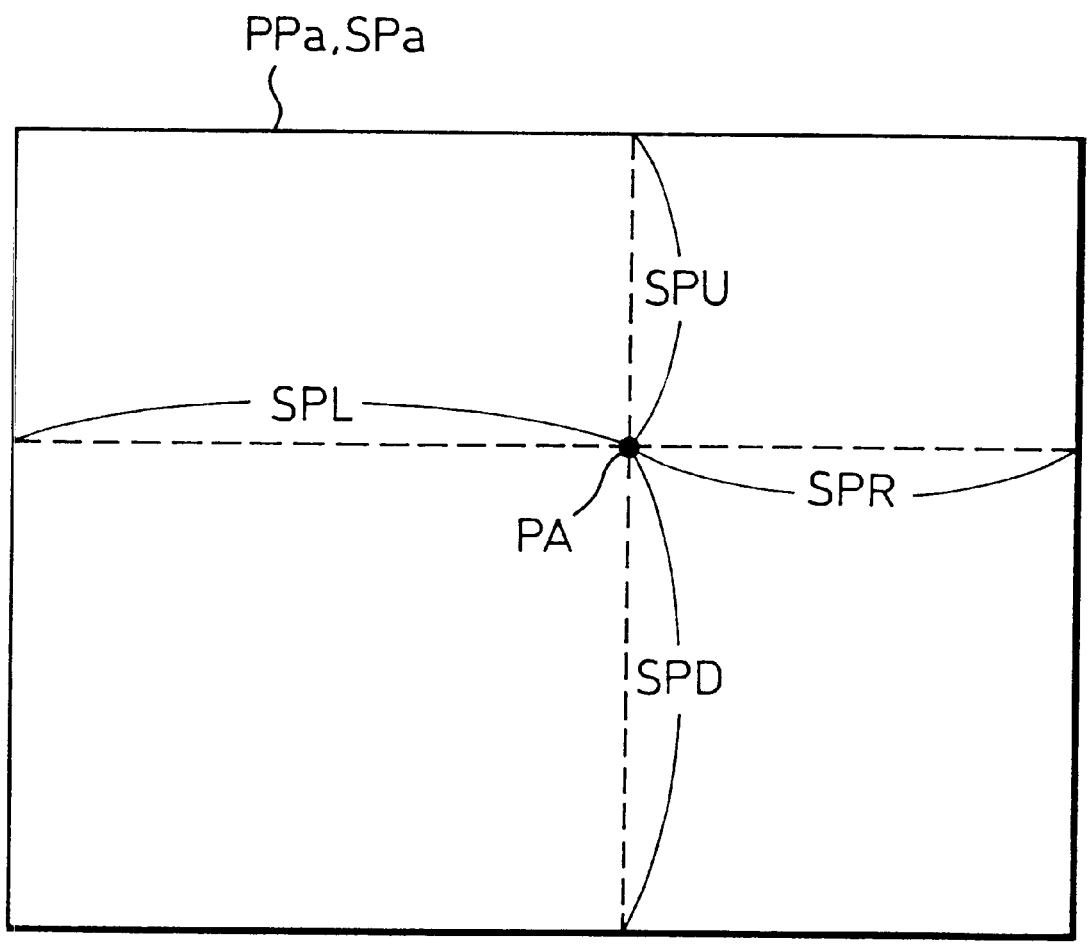
FIG. 27 is a figure showing a transfer frame for a picture displayed while a magnification factor is 1.

In an enlarging operation, a point of interest PA on the picture (the coordinated on the picture data PPa) is selected by the user using the mouse pointer PM, as shown in FIG. 26. Using the coordinate of this point PA, the distances SPa, SPU, SPD, SPR, SRL from the point PA to the upper end, the lower end, the right end, and the left end of the transfer frame, respectively, are contracted continuously by a specified factor while the mouse is dragged.

Figure 28:
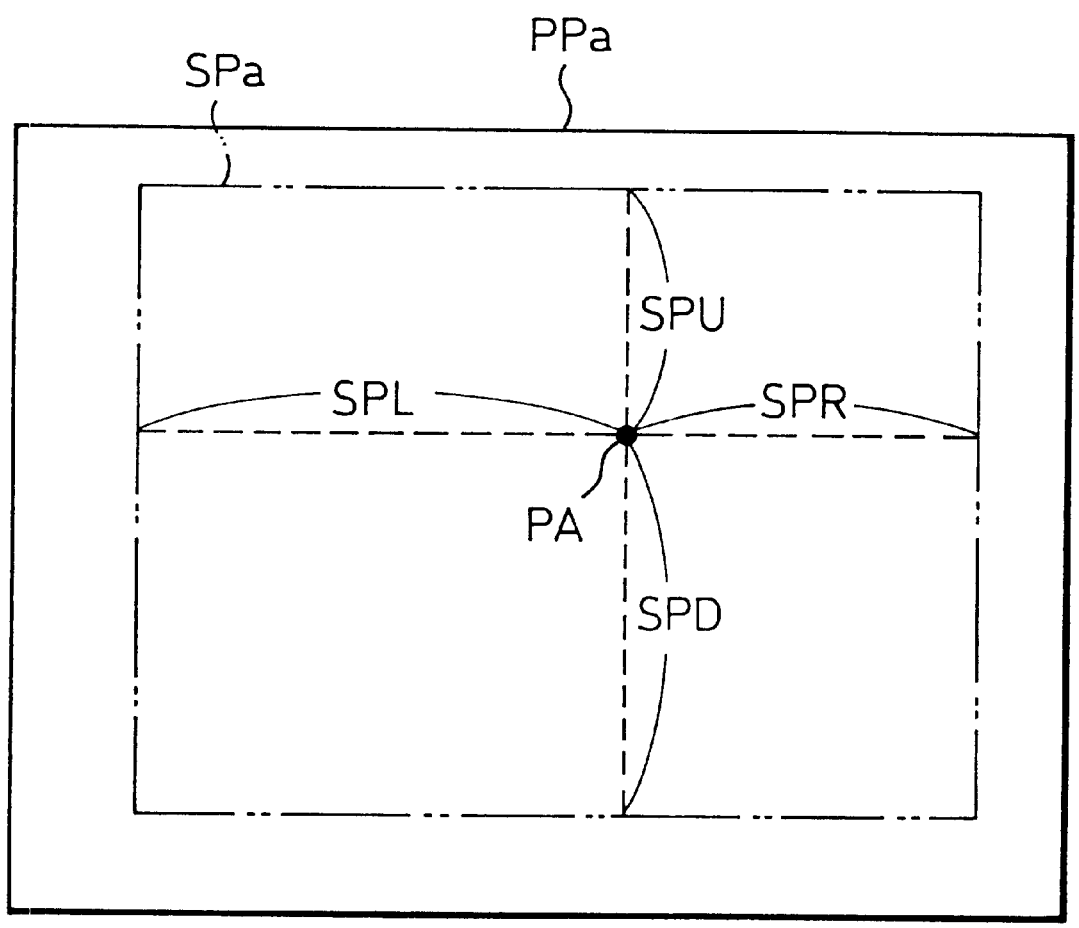
FIG. 28 is a figure showing a transfer frame for a picture displayed while the picture image is enlarged.

The portion of the picture cut by the transfer frame will be then enlarged to the full size of the picture window SMa, as shown in FIG. 28. It should be noted that since the point PA is always in the transfer frame, the point will never be cut off from the enlarged picture.

Similarly, contraction of the picture can be made by dragging the mouse pointer downward from the observation point PA. In this case, the transfer frame is enlarged in cutting out an enlarged portion of the picture on the main window MSa. The magnification of the cut portion of the picture is stopped, however, when the size of the magnified picture becomes the same as that of the frame PPa.

Figure 29:
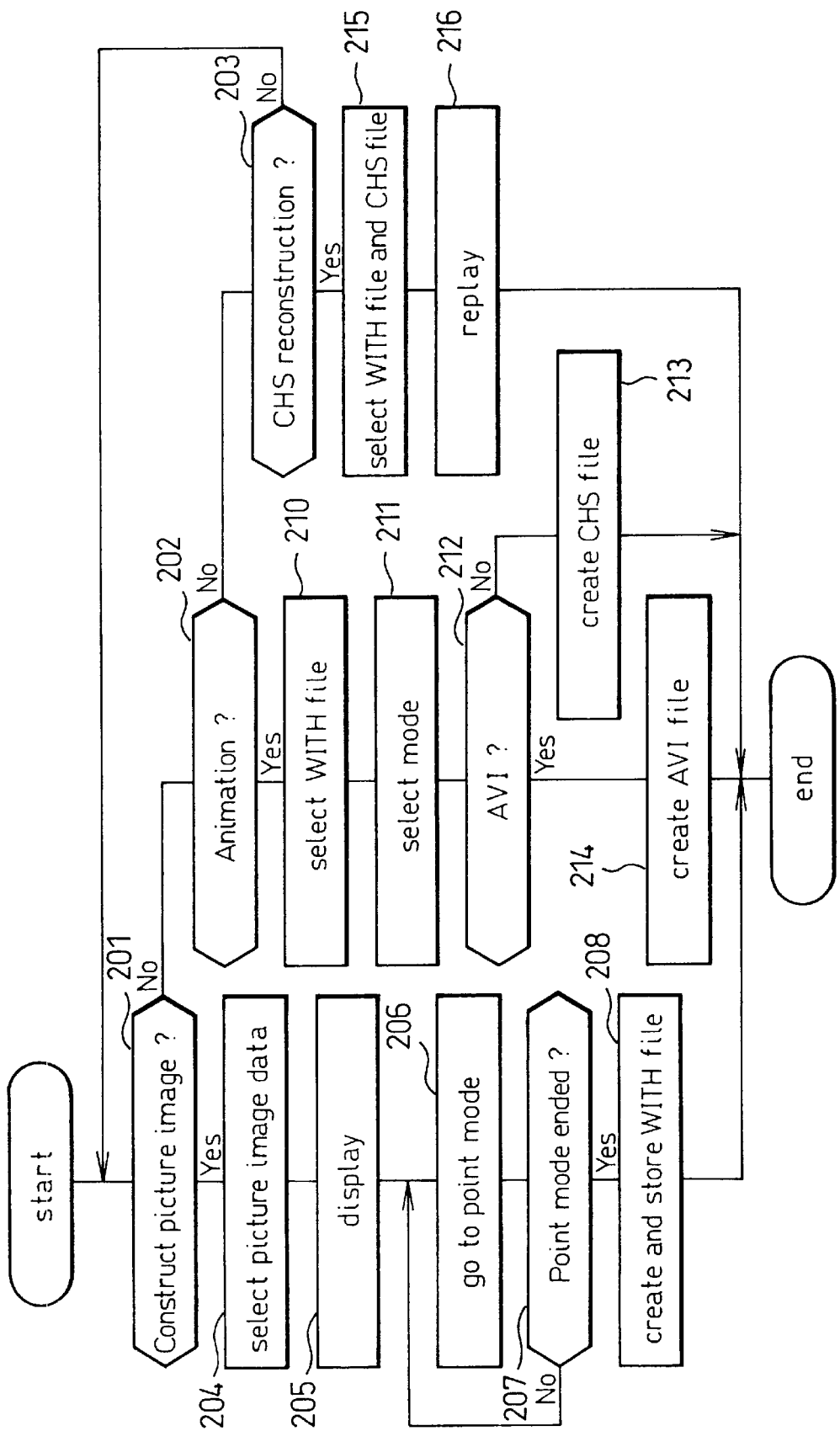
FIG. 29 is a flow-chart of a procedure for processing a picture image displayed on the main picture image window MSa.

The flowchart in FIG. 29 shows the procedure for executing operations for the modification of a given picture as described above. This requires display of the main window MSa.

First, it is queried and monitored which one of three processes is to be made: construction of a picture from an original picture data by selecting the picture data from the "menu" option, animation of a picture by selecting "animation" option, and CHS re-display by selecting CHS Re-display option (NO loop circulating through steps 201, 202, and 203).

If File menu is opened and construction of a picture is instructed, so that the answer to step 201 is YES, a picture image data selected by the user (step 204) is displayed on the main window MSa (step 205). The procedure continues the pointing mode procedure (step 206) until "END" of the procedure is instructed by the user (steps 206, 207).

Figure 30:
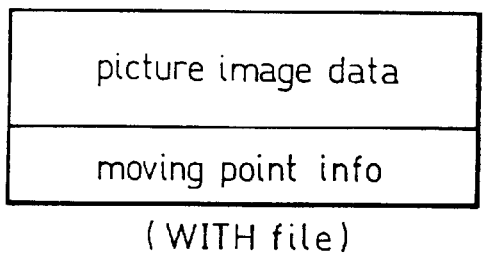
FIG. 30 shows the content of a WITH file.
Figure 30:
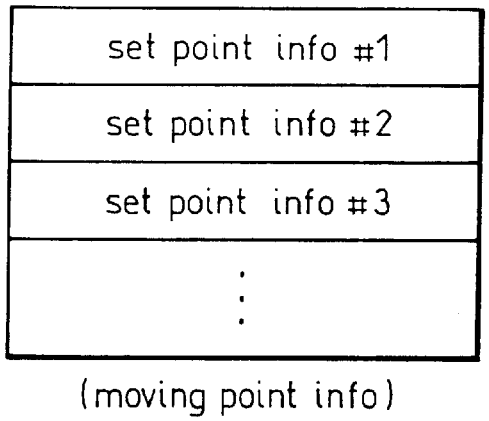
Figure 30:
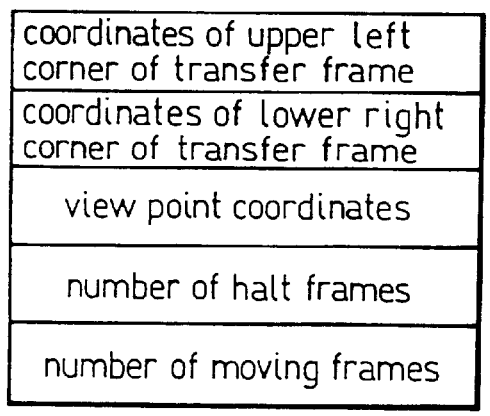

After the pointing mode processes were finished (YES in the determination in step 207). a WITH format file is created and stored (step 208) as shown in FIG. 30(a) before the procedure is ended.

The WITH format file contains the selected picture image data and moving point information which contains an ordered set of information on the coordinates of the upper left corner and lower right corner of the transfer frame, the coordinate of each of the view points, the number of halt frames, and the number of moving frames, as shown in FIG. 30(b).

When the "animation" option is selected in the animation menu, so that the determination in step 202 is YES, the user is prompted to select the WITH file (step 210), and to determine whether the animation picture date file is made in AVI mode or CHS mode (step 211).

If, in step 212, AVI mode is selected, the procedure goes to step 214 to create an AVI file, while if CHS mode is selected, the procedure goes to step 213 to create a CHS file.

When CHS re-display menu is selected to perform CHS re-display (YES in step 203), the user is prompted to select both the WITH file and the CHS file associated with the picture image data to be re-displayed in step 215. The procedure then proceeds to step 216 to execute the re-display processing of the picture data based on the WITH file and the CHS file.

Figure 31:
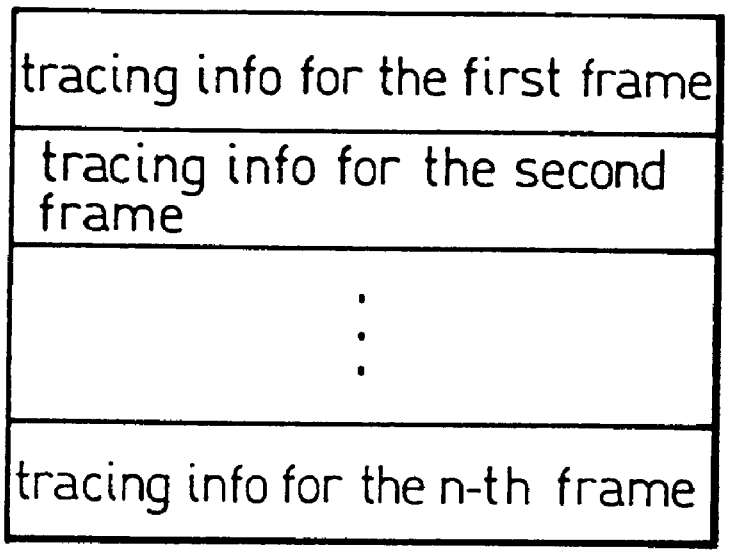
FIG. 31 shows the content of a CHS file.
Figure 31:
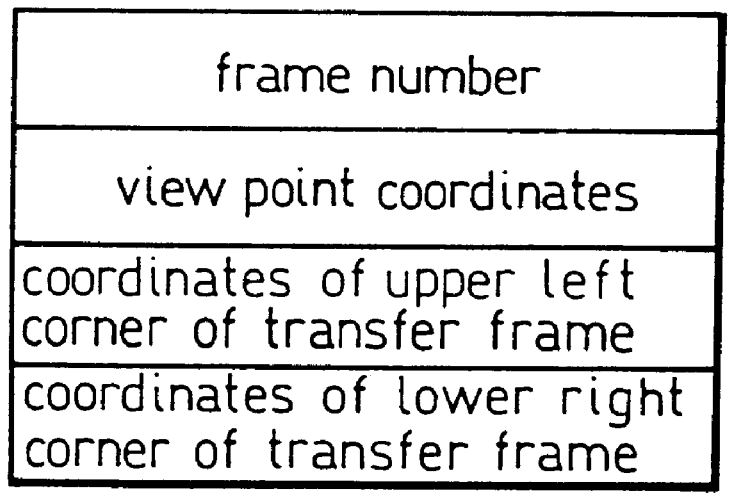

Referring now to FIG. 31(a), there is shown a CHS file containing view point tracing information for the first frame through the final frame. The view point tracing information contains the frame number, coordinates of the view point as well as the upper left and lower right corner of the transfer frame for each of the frames, as shown in FIG. 31(b).

An animation picture data may be created from a CHS file and the original picture image data (WITH file) as follows. First, an ordered set of picture data is extracted from the original picture image data using the given set of ordered transfer frames. Next, each of the extracted picture data is subjected to a rotational/move coordinate transformation, constructing a picture image data to be displayed. Finally, the set of the extracted picture data is updated with the set of transformed picture image data for re-display in the same order. The animation picture thus created, when displayed, has essentially the same picture quality as displayed AVI file.

Thus, one may produce an animation picture from a CHS file and a WITH file having substantially the same picture quality. The size of the CHS file is the size of data multiplied by the number of the frames contained therein, which normally amounts to a few KB for an animation made up of about 200 frames, which size is surprisingly small compared to any conventional animation file. In addition, the WITH file can be compressed in size to a several 100 KB if the original picture image data is compressed by a proper compression format (such as JPEG), which is extremely small compared to an average AVI file (whose image size is often of order of 100 MB).

Accordingly, the animation picture image data, thus created, requires only a small memory size when it is stored, and can be transferred through the Internet in a very short period of time, so that it can be better provided from a WEB page, provided that a software, capable of processing the CHS file and the WITH file to re-construct the animation picture data, is also provided in a WEB browser. (The software is said to have CHS reproduction function.)

A typical WEB browser has a plug-in applet which provides the browser with additional display capability. Thus, the software may be substituted for by a plug-in having a CHS reproduction function.

Figure 32:
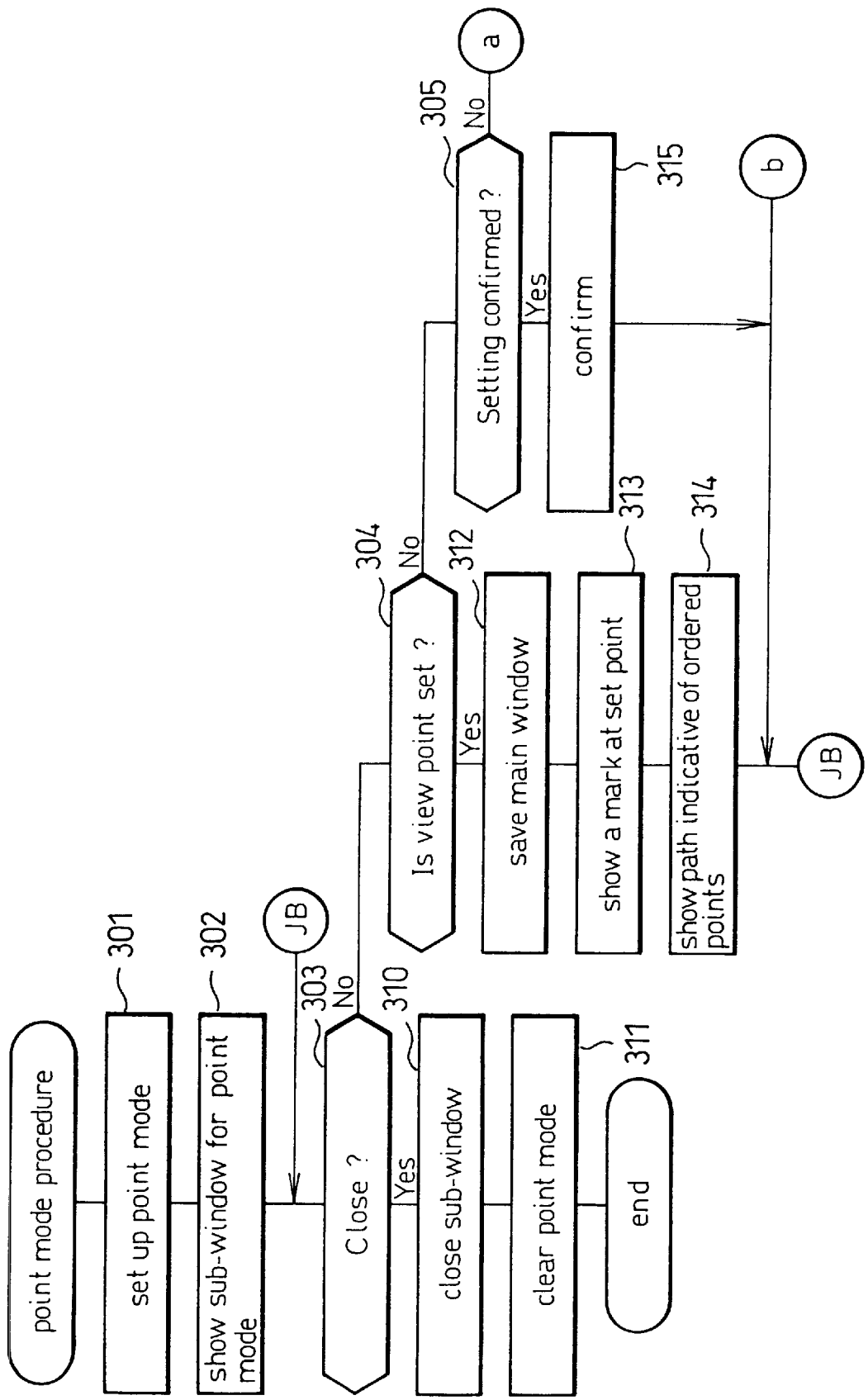
FIG. 32 is a flow-chart of a point mode procedure.
Figure 32B:
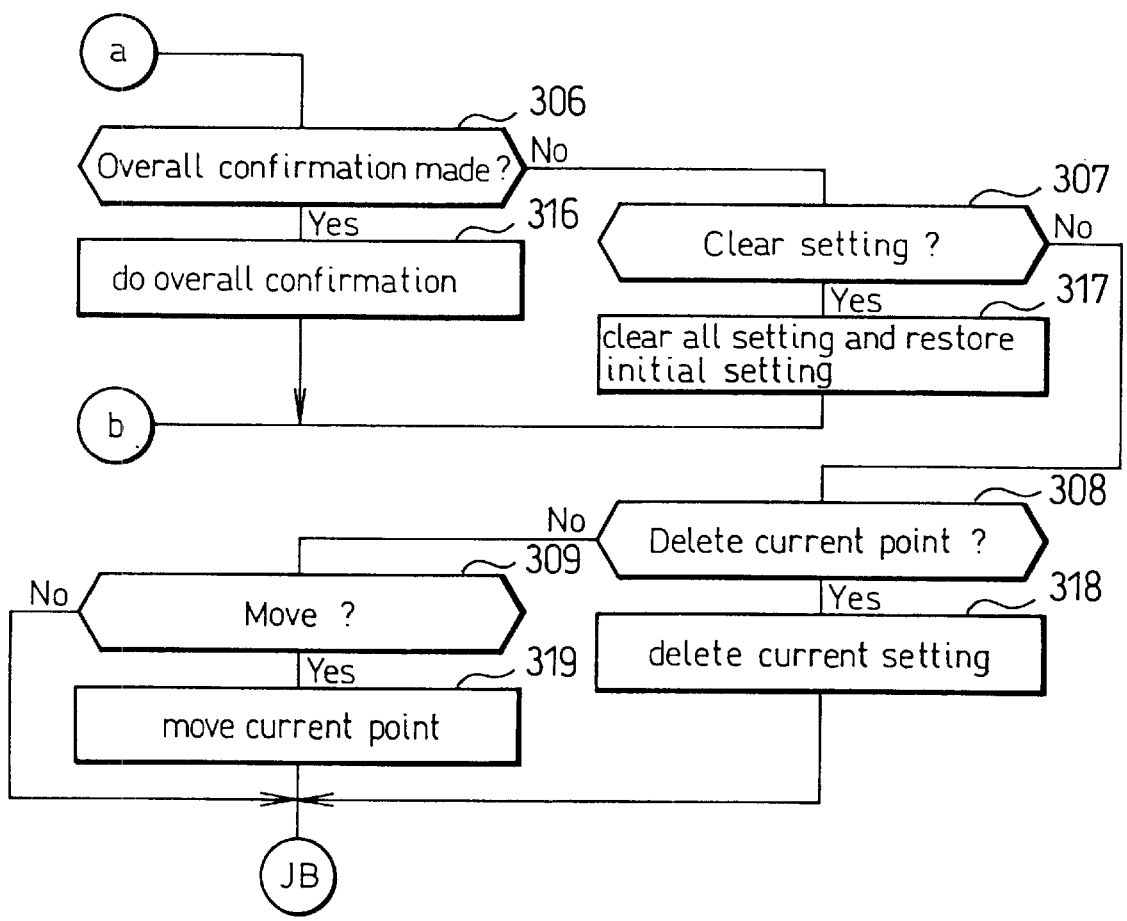

Referring now to FIG. 32, there is shown an example of a pointing mode.

In this mode, a point mode is first set in the starting step 301. In step 302, sub-window SB is shown for setting a particular point set. The procedure monitors which one of the "CLOSE" button, "SET" button, "CONFIRMATION" button, "OVERALL CONFIRMATION" button, "CLEAR" button, "DELETE" button, and "MOVE" button is pressed (NO-loop going through steps 303–309).

If "CLOSE" button is pressed, so that the determination in step 303 is YES, the sub-window SB is closed in step 310. The pointing mode is cleared in step 311, terminating the point mode operation.

If the "SET" button is pressed, so that the determination is YES in step 304, the procedure set the position of the current view point as one of the set points, and stores the condition of the main window MS in step 312, shows a mark at the set point (in step 313) and a path associated with the set point (step 314), and returns to step 303.

If "CONFIRMATION" button is pressed, so that the determination in step 305 is YES, the procedure goes to step 315, where the user may confirm if all the picture data can be successfully constructed for all the frames defined for the interval between any two set points (view point) specified by the user, as will be described in detail in connection with FIG. 41. Following this confirmation, the procedure returns to step 303.

If "OVERALL CONFIRMATION" button is pressed, so that the determination in step 306 is YES, the procedure goes to step 316 to obtain and show the picture data associated with the entire set points that have been selected, and returns to step 303.

If "DELETE" button is pressed, so that the determination is YES in step 308, the procedure deletes all the set points in step 318, and returns to step 303.

If the "MOVE" button is pressed, so that the determination in step 309 is YES, the procedure moves the currently selected set point in step 319, and returns to step 303.

Figure 33:
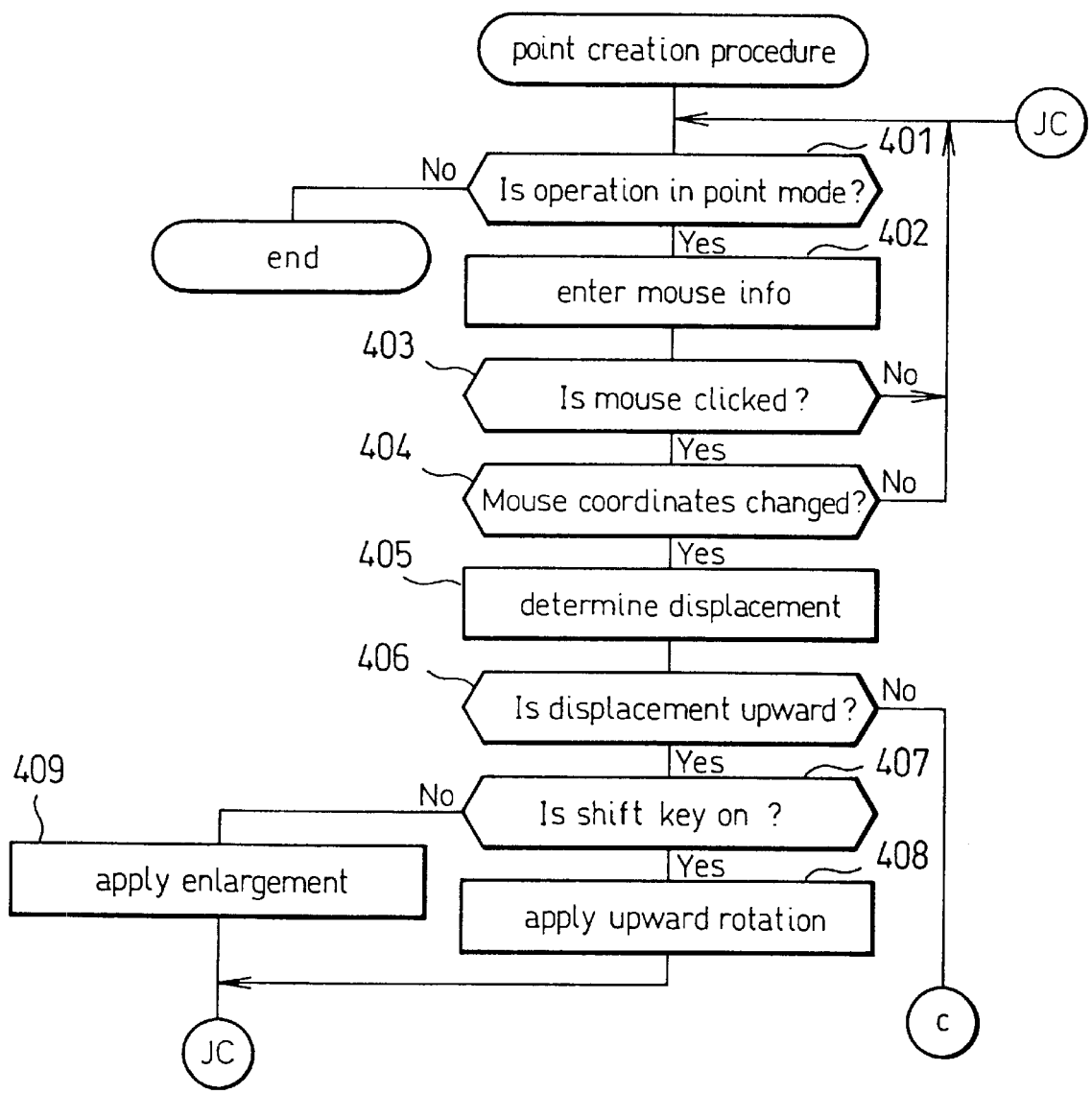
FIG. 33 is a flow-chart of a point creation procedure.
Figure 33B:
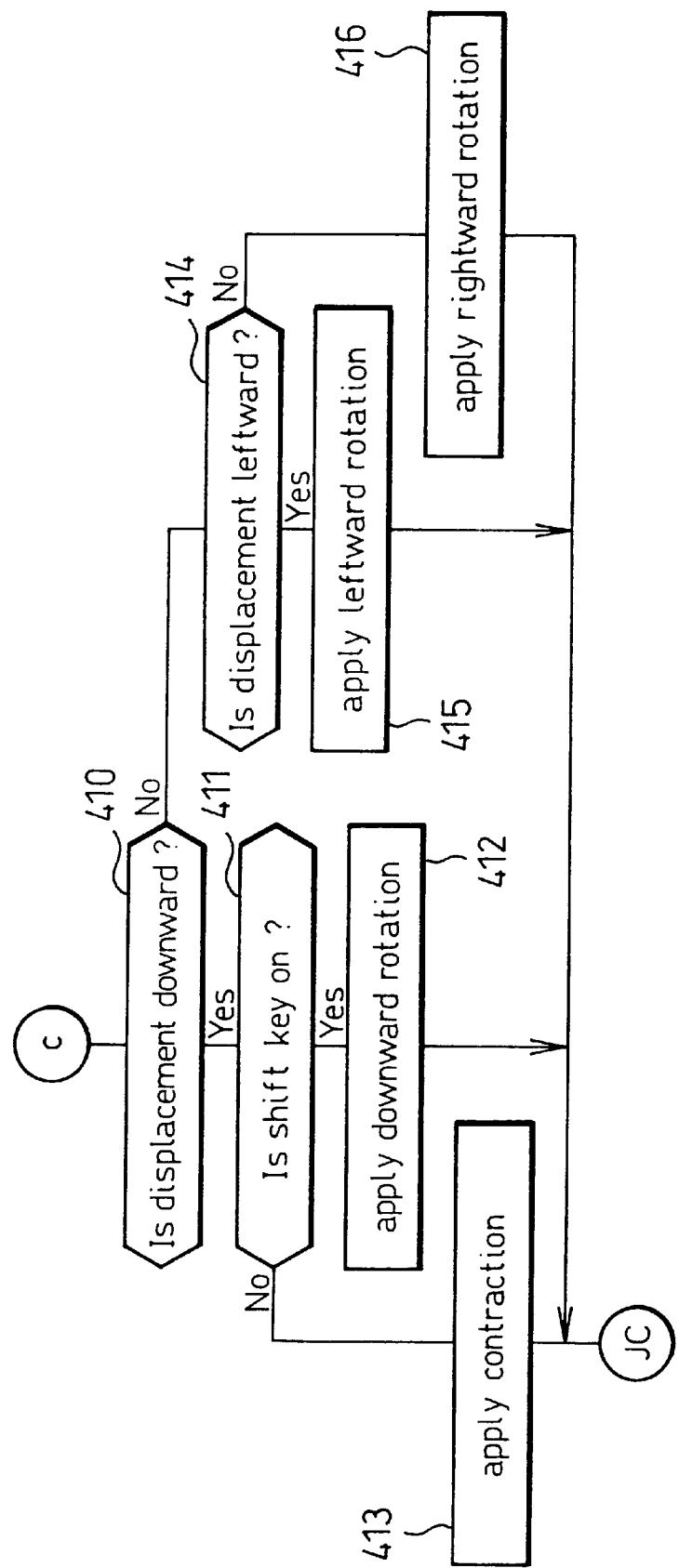

Referring now to FIG. 33, there is shown a general procedure for the point mode.

In step 401, it is determined whether the point mode is set. If not, the procedure ends, since then the point mode has been cleared.

In the determination in step 401 is YES, the procedure accepts mouse information in step 402, and sees if the mouse has been clicked in step 403. If it has not, implying that the mouse has not been dragged, the procedure returns to step 401.

If, on the other hand, the determination is YES in step 403, the procedure proceeds to step 404 to determine whether the mouse position has been displaced (i.e., dragged). If it has not, implying that the mouse has not been displaced, the procedure returns to step 410.

If the determination in step 404 is YES, the amount of displacement of the mouse is calculated in step 405, yielding the vertical and horizontal components of the displacement (which are referred to as vertical and horizontal displacement, respectively).

If the vertical displacement is greater than the horizontal displacement, and is made upward, it is determined in step 406 that the mouse has been dragged upward (in correspondence with the determination YES in the step). It is then determined in step 407 if the shift key on the keyboard 2 is pressed then. If it is YES, implying that the drag is an upward shift-drag, the procedure executes a corresponding upward rotation operation in step 408, and then returns to step 401. Otherwise, the procedure executes an enlargement operation in step 409, and then returns to step 401.

If the vertical displacement is greater than the horizontal displacement, and is downward, it is determined in step 410 that the mouse has been dragged downward (in correspondence with the determination YES in the step). It is then determined in step 411 if the shift key on the keyboard 2 has been pressed then. If it is YES, implying that the drag is a downward shift-drag, the procedure executes a corresponding downward rotation operation in step 412, and then returns to step 401. Otherwise, the procedure executes a contraction operation in step 413, and then returns to step 401.

If the vertical displacement is equal to or smaller than the horizontal displacement, and is made leftward, it implies that the mouse has been shift-dragged leftward, as determined YES in step 414, the procedure executes a corresponding leftward rotation operation in step 415, and then returns to step 401.

Otherwise, the procedure executes a corresponding rightward rotation operation in step 416, and the returns to step 401.

Referring now to FIG. 34, there are shown details of the upward rotation operation of step 408.

In step 501, an upward rotation coordinate transformation, similar to the post-move coordinate transformation in step 142, is carried out, in which the coordinate on the picture image data PPa is calculated for every point of the picture data displayed on the main window. In step 502, the current view point is updated with the view point moved upward by a given ratio and is stored. In step 503, of the picture data displayed on the main window MSa a portion of the picture data that is mapped within the transfer frame is selected and copied to construct a new enlarged picture.

The procedure waits for a predetermined period of time (step 506), and accepts mouse information in step 507, checking if the mouse has been clicked or not (step 508). Here, if the determination in step 508 is NO, implying that the upper shift-drag has been completed, the upward rotation operation is ended.

If, on the other hand, the determination in step 508 is YES, the amount of the displacement of the mouse is calculated in step 509, in just the same manner as in the foregoing operation. A determination is made in step 510 of whether the mouse has been dragged upward. If it is YES, a further determination is made whether the shift key on the keyboard 2 has been pressed in step 511.

If the determination in step 511 is YES, implying that the upward dragging is still in process, the procedure loops back to step 501 to repeat the steps that follow. If either the determination in step 510 or in step 511 is NO, implying that the upward shift-drag has been completed, the upward rotation operation is ended.

Referring now to FIG. 35, there is shown in detail an enlargement operation of step 409.

In this operation, the coordinates of the point pointed to by the mouse are first transformed into corresponding coordinates of a picture image data (step 601). In step 602, a new transfer frame is created by the transfer frame contraction operation as described previously, and the coordinates characterizing the transfer frame are updated and stored in step 603.

Next, the procedure displays the picture data contained in the transformation frame on the main window MSa, updating the window, in step 604, and then waits for a predetermined period of time (step 605), accepts mouse information (step 606), and determines whether the mouse has been clicked (step 607). If it is NO, it implies the completion of the upward drag, so that the enlargement operation is ended.

If the determination in step 607 is YES, the amount of the displacement of the mouse is calculated in step 608, and as in the preceding operation, a further determination is made as to whether the mouse has been dragged upward in step 609. If it has, it implies that the upward drag is still in process, the procedure returns to step 602 to repeat the steps that follow. If the determination in step 609 is NO, it implies the completion of the upward drag, so that the procedure is ended.

Referring now to FIG. 36, there is shown in detail a downward rotation operation of step 412.

In step 701, an downward rotation coordinate transformation, similar to the post-move coordinate transformation in step 142, is carried out, in which the coordinates of every point of the picture image data PPa which is to lie within the transfer frame and is associated with a pixel of the picture displayed on the main window MSa are calculated. Then in step 702, the current view point is updated to move downward by a given ratio and is stored.

In step 703, a copy of the pixel-wise coordinates calculated in step 701 for the picture image data PPa is made to construct a new picture image, which is supplemented with an image data of the cross-line cursor CHb centered at the current view point in step 704. In step 705, the picture on the main window MSa is updated by the updated picture image data.

The procedure waits for a predetermined period of time (step 706), and accepts mouse information in step 707, checking if the mouse has been clicked or not (step 708). Here, if the determination in step 708 is NO, implying that the upper shift-drag has been completed, the downward rotation operation is ended.

If, on the other hand, the determination in step 708 is YES, the amount of the displacement of the mouse is calculated in step 709, in just the same manner as in the foregoing operation. A determination is made in step 710 whether the mouse has been dragged downward. If it is YES, a further determination is made whether the shift key on the keyboard 2 has been pressed in step 711.

If the determination in step 711 is YES, implying that the downward dragging is still in process, the procedure loops back to step 701 to repeat the steps that follow. If either the determination in step 710 or in step 711 is NO, implying that the downward shift-drag has been completed, the downward rotation operation is ended.

Referring now to FIG. 37, there is shown in detail an contraction operation of step 413.

In this operation, the coordinates of the point pointed to by the mouse is first transformed into corresponding coordinates of picture image data (step 801). In step 602, anew transfer frame is created by the transfer frame contraction operation as described previously, and the coordinates characterizing the transfer frame are updated and stored in step 803.

Next, the procedure displays the picture data contained in the transformation frame on the main window MSa, updating the window, in step 804, and then waits for a predetermined period of time (step 805), accepts mouse information (step 806), and determines whether the mouse has been clicked (step 807). If it is NO, it implies the completion of the upward drag, so that the contraction operation is ended.

If the determination in step 807 is YES, the amount of the displacement of the mouse is calculated in step 808, and as in the preceding operation, a further determination is made as to whether the mouse has been dragged upward in step 809. If it has, it implies that the upward drag is still in process, the procedure returns to step 802 to repeat the steps that follow. If the determination in step 809 is NO, it implies the completion of the upward drag, so that the procedure is ended.

Figure 38:
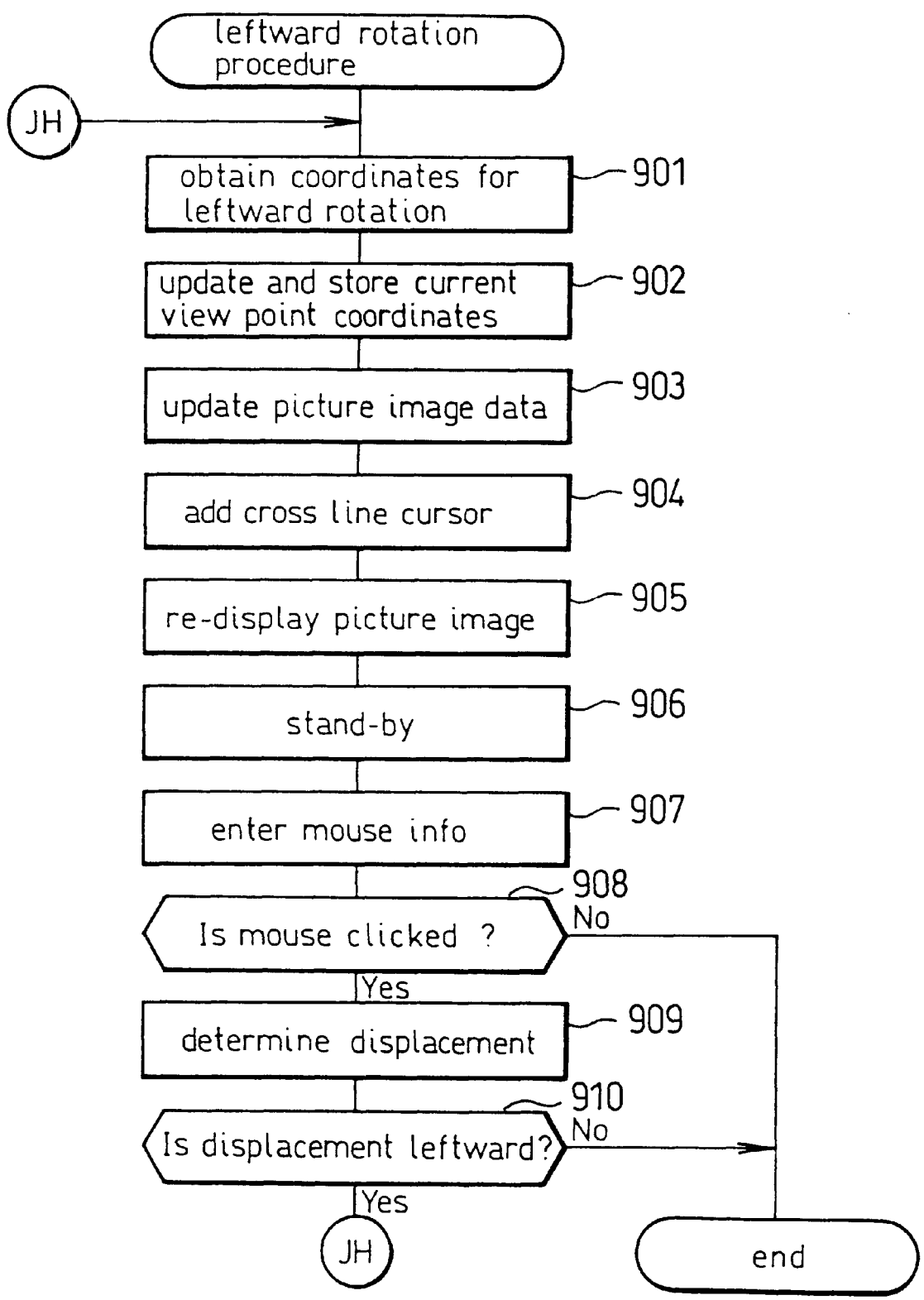
FIG. 38 is a flow-chart of leftward rotation procedure (Step 415)

Referring now to FIG. 38, there is shown in detail a leftward rotation operation of step 415.

In step 901, an leftward rotation coordinate transformation, similar to the post-move coordinate transformation in step 142, is carried out, in which the coordinates of every point of the picture image data PPa which are to lie within the transfer frame and are associated with a pixel of the picture displayed on the main window MSa are calculated. Then in step 902, the current view point is updated to move leftward by a given ratio and is stored. In step 903, a copy of the pixel-wise coordinates calculated in step 901 for the picture image data PPa is made to construct a new picture image, which is supplemented with an image data of the cross-line cursor CHb centered at the current view point in step 904. In step 905, the picture on the main window MSa is updated by the updated picture image data.

The procedure waits for a predetermined period of time (step 906), and accepts mouse information in step 907, checking if the mouse has been clicked or not (step 908). Here, if the determination in step 908 is NO, implying that the upper shift-drag has been completed, the leftward rotation operation is ended.

If, on the other hand, the determination in step 908 is YES, the amount of the displacement of the mouse is calculated in step 909. A determination is made in step 910 in just the same manner as in the foregoing operation as to whether the mouse has been dragged leftward. If it has, it implies that the leftward drag is still in process, so that the procedure loops back to step 901 to repeat the steps that follow. If, on the other hand, the determination in step 901 is NO, implying that the leftward drag has been completed, the leftward rotation operation is ended.

Figure 39:
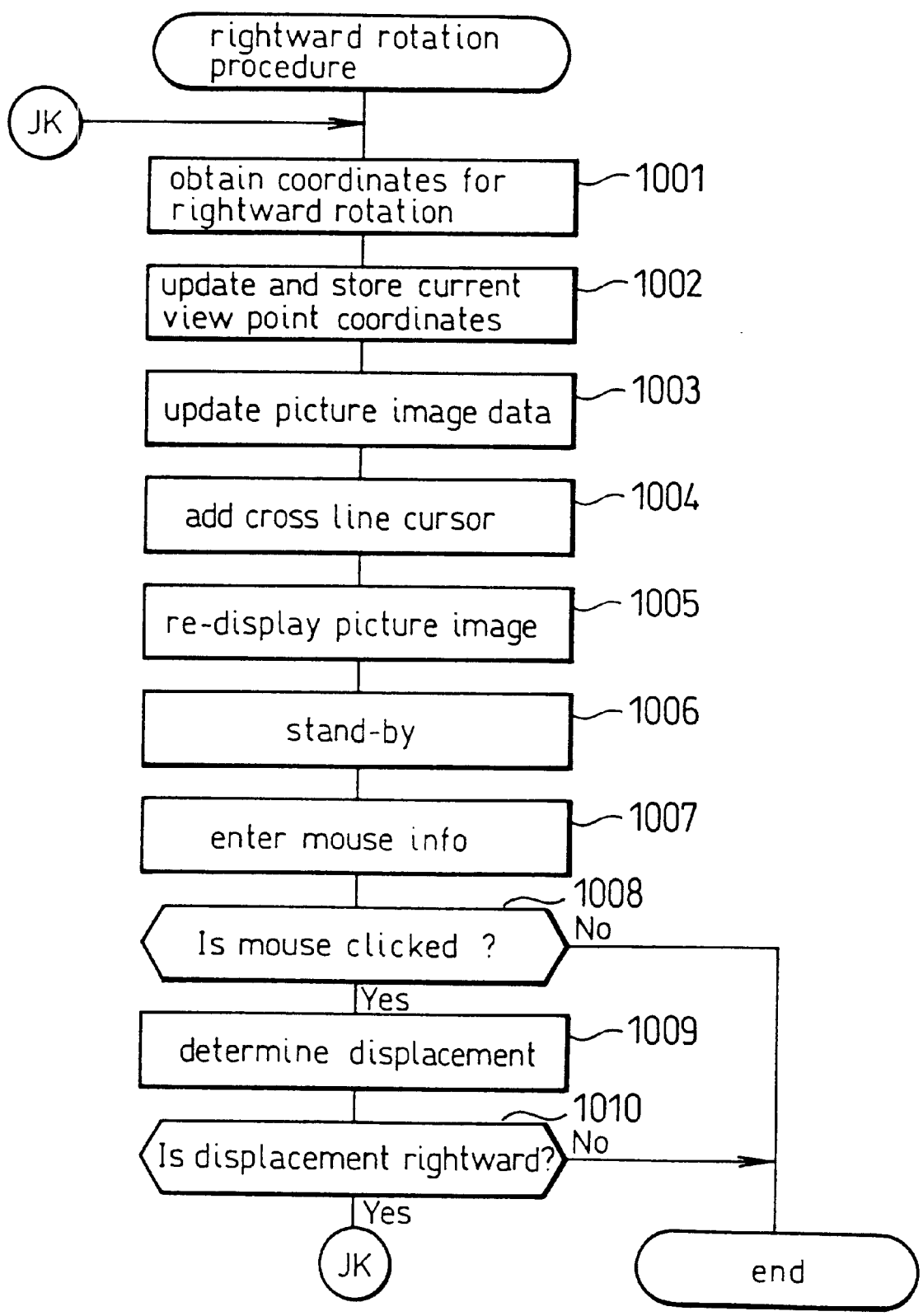
FIG. 39 is a flow-chart of rightward rotation procedure (Step 416)

Referring now to FIG. 39, there is shown in detail a rightward rotation operation of step 416.

In step 1001, a rightward rotation coordinate transformation, similar to the post-move coordinate transformation in step 142, is carried out, in which the coordinate of every point of the picture image data PPa which is to lie within the transfer frame and is associated with a pixel of the picture displayed on the main window MSa is calculated. Then in step 1002, the current view point is updated to move rightward by a given ratio and is stored. In step 1003, a copy of the pixel-wise coordinates calculated in step 1001 for the picture image data PPa is made to construct a new picture image, which is supplemented with an image data of the cross-line cursor CHb centered at the current view point in step 1004. In step 1005, the picture on the main window MSa is updated by the updated picture image data.

The procedure awaits for a predetermined period of time (step 1006), and accepts mouse information in step 1007, checking if the mouse has been clicked or not (step 1008). Here, if the determination in step 1008 is NO, implying that the upper shift-drag has been completed, the rightward rotation operation is ended.

If, on the other hand, the determination in step 1008 is YES, the amount of the displacement of the mouse is calculated in step 1009. A determination is made in step 1010 in just the same manner as in the foregoing operation as to whether the mouse has been dragged rightward. If it has, it implies that the rightward drag is still in process, so that the procedure loops back to step 1001 to repeat the steps that follow. If, on the other hand, the determination in step 1001 is NO, implying that the rightward drag has been completed, the rightward rotation operation is ended.

Figure 40:
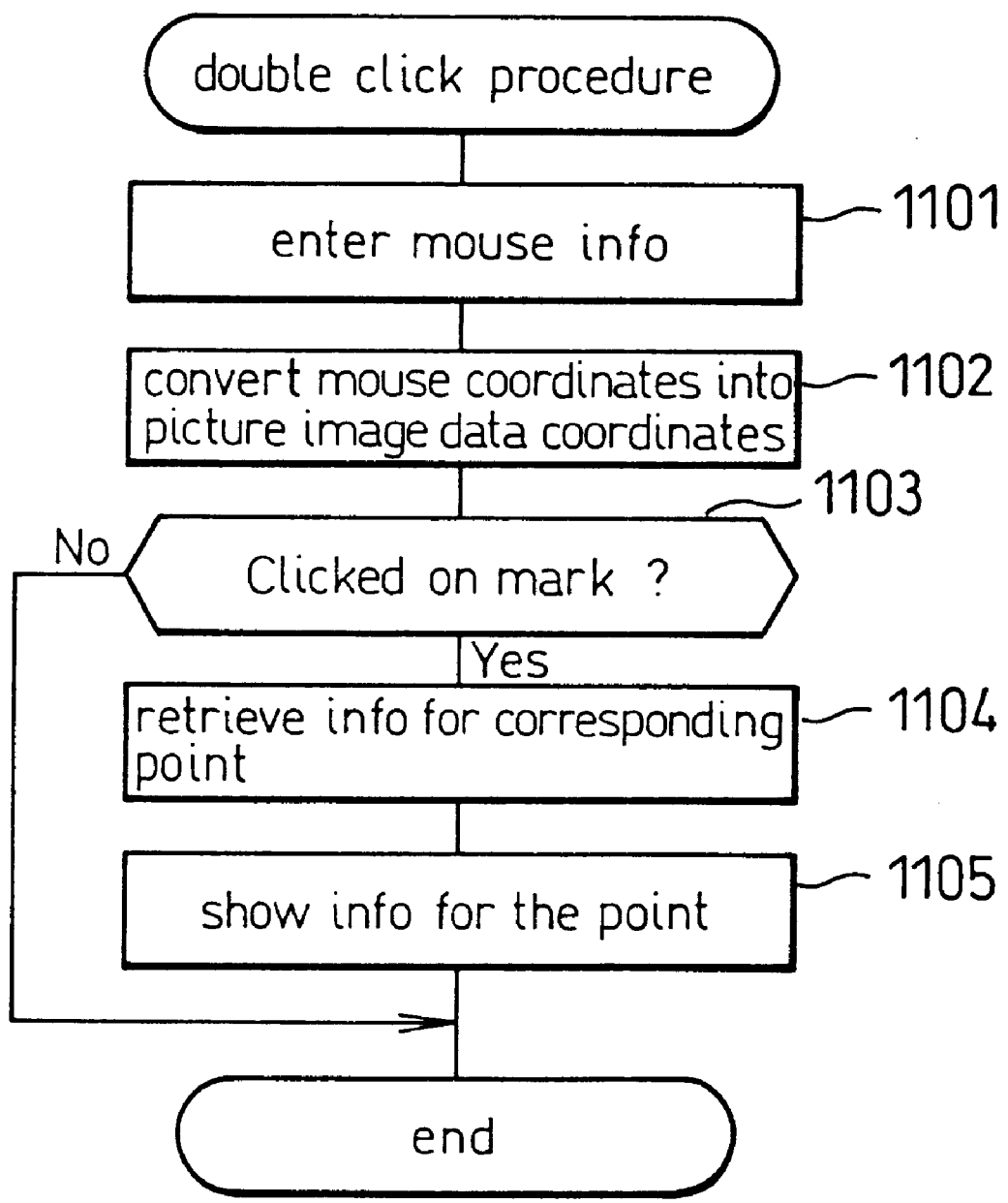
FIG. 40 is a flow-chart of a procedure with a mouse double clicked under the point mode.

Referring now to FIG. 40, there is shown an operation carried out when the mouse is clicked in point mode.

First, the procedure accepts mouse information in step 1101. In step 1102, the coordinates of the point pointed by the mouse is first transformed into corresponding coordinates of picture image data. The clicked point is checked if it is an interior point of any mark PA associated with some set point. (step 1103). If the determination in step 1103, set point information associated with the point is retrieved in step 1104, and display it on the sub-window SB in step 1105. The procedure then ends the operation.

Figure 41:
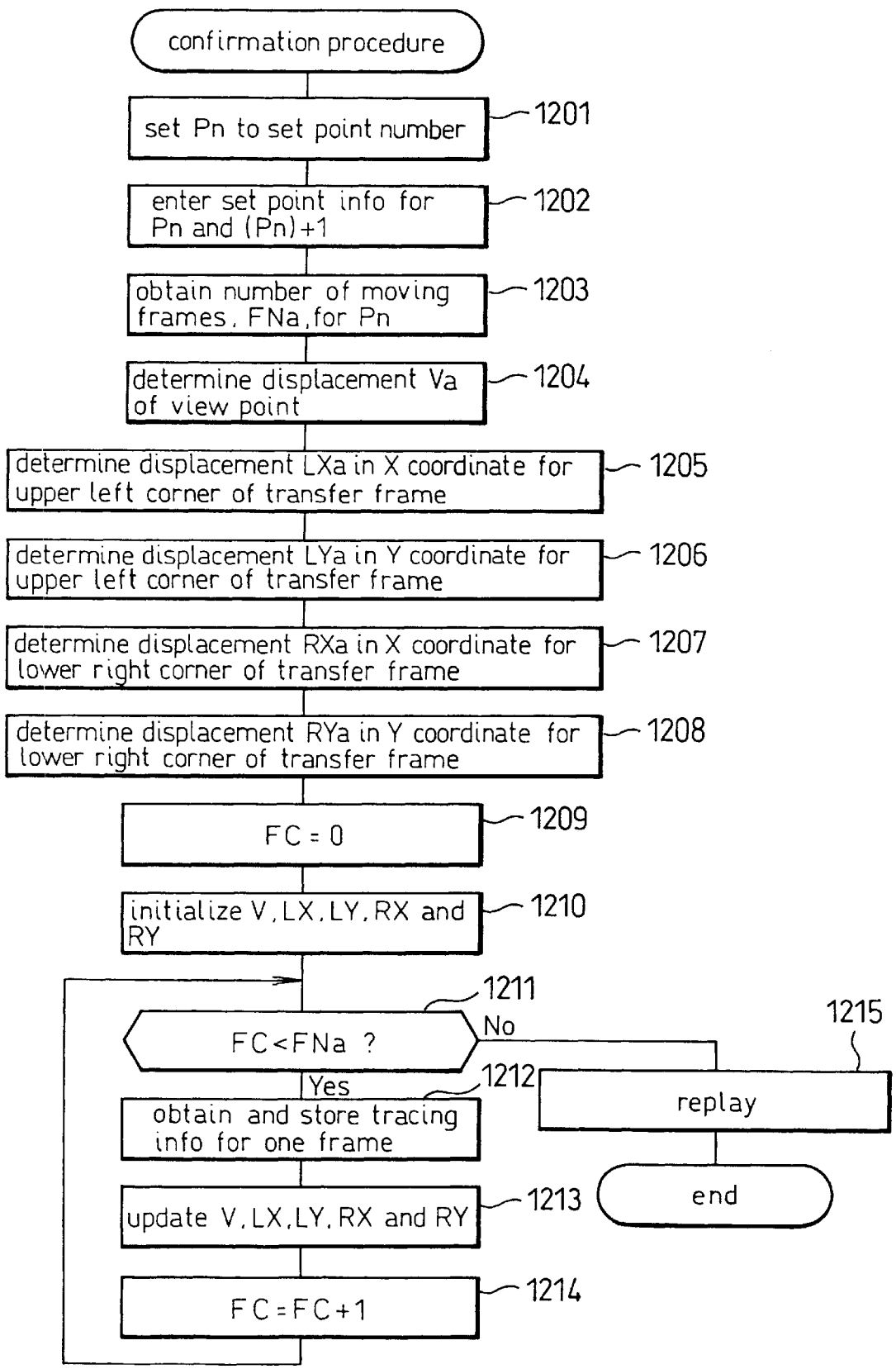
FIG. 41 is a flow-chart of confirmation procedure (Step 315)

Referring now to FIG. 41, there is shown in detail the confirmation operation of step 315. In step 1201, the procedure first assigns to processing point number Pn the number of the set point specified the user, where processing point number Pn is a counter for counting the number of the frame to be confirmed, and the specified set point is the position of the first frame to be confirmed.

The procedure then:

Enters set point information associated with Pn and Pn+1 (step 1202);

Obtains the number of the moving frames, FNa, between the specified set point and the next set point (step 1203);

Determines the displacement Va per one frame by dividing by the number, FNa, of the moving frames between the two set points the relative displacement between the two set points associated with point Pn and Pn+1, based on the information preserved for the set points (which will be referred to as set point information) (step 1204);

Determines the displacement LXa per one frame by dividing by the number, FNa, the displacement in the X coordinate of the upper left corner of the transfer frame between points Pn and Pn+1 based on the information preserved for the set points (step 1205);

Determines the displacement LYa per one frame by dividing by FNa the displacement in the Y coordinate of the upper left corner of the transfer frame between points Pn and Pn+1, based on the information preserved for the set points (step 1206);

Determines the displacement RXa in the X coordinate per one frame and RYa in the Y coordinate per one frame in are calculated for the lower right corner of the transfer frame (step 1207);

Determines the displacement RYa in the Y coordinate per one frame by dividing by FNa the displacement in the X coordinate of the lower right corner of the transfer frame between points Pn and Pn+1 (step 1208);

The procedure further proceeds to:

Initializes variables V, LX, LY, RX and RY to the coordinate of the view point, X and Y coordinates of the upper left corner of the transfer frame, X and Y coordinates of the lower right corner of the transfer frame, respectively, as obtained from the set point information for point Pn, (step 1210);

Queries whether the counter value of the frame counter FC is smaller than the number of the moving frames, FNa (1211);

Creates tracing information for one frame based on the current values of V, LX, LY, RX, and RY, provided that the answer to the query in step 1211 is YES, and stores the information in temporary CHS file (step 1212);

Adds to each of variables V, LX, LY, RX, and RY, corresponding displacements Va, LXa, LYa, RXa, RYa, updating V, LX, LY, RX, and RY (step 1213);

Increments frame counter FC (step 1214) and then returns to step 1211.

If in step 1215, the answer to the query in step 1211 is NO, implying that the tracing information has been stored in temporary CHS file the procedure carries out reproduction or re-display the picture data for the frames between the two specified points in the form of animation, using the temporary CHS file together with WITH file, thereby confirming the animation for the interval.

Following this confirmation, the procedure ends.

Figure 42:
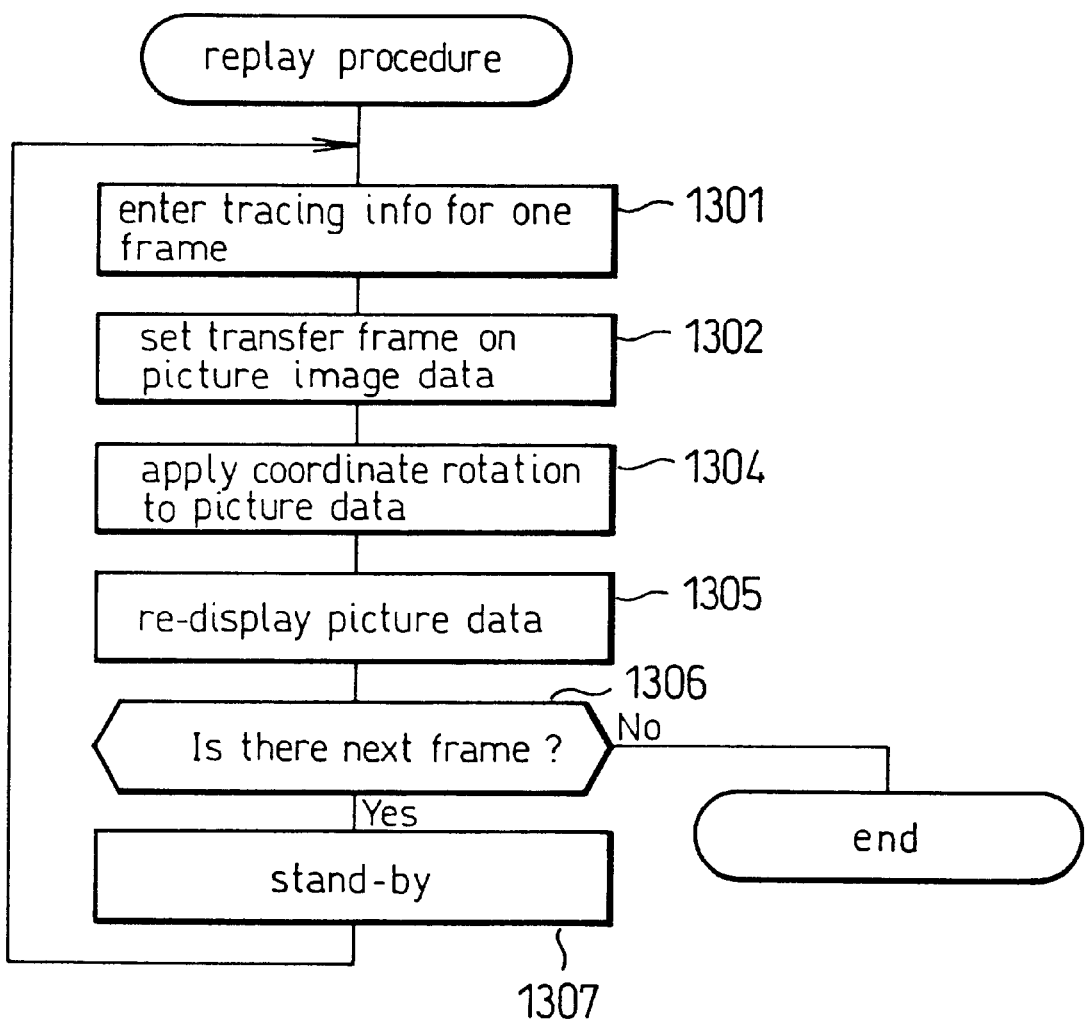
FIG. 42 is a flow-chart of picture image replay procedure.

Referring now to FIG. 42, there is shown in detail a re-display or reproduction operation, which is basically a procedure for constructing from the picture data preserved in the form of WITH file an ordered set of pictures to be displayed, based on the tracing information provided for each of the frames in the CHS file (or temporary CHS file), and for displaying the constructed picture data on a display in the form of animation.

Upon receipt of a specified CHS file or a temporary CHS file along with WITH file, the procedure proceeds with the following steps in the order described. The procedure:

Obtains tracing information for one frame from the CHS file (or temporary CHS file (step 1301);

Sets a transformation frame for tracing information, by defining the coordinates of the corners of the transformation frame for each picture image data of the WITH file (step 1302);

Performs a rotation coordinate transformation based on the coordinate information of an associated view point, in a manner similar to the post-movement operation done in step 142 (step 1304);

Constructs new picture data by: (i) calculating the coordinates on the picture image data PPa for every point of the picture data displayed on the main window; (ii) selecting from the picture data displayed on the main window MSa a portion of the picture data that is mapped within the transfer frame; (iii) copying the selected portion of the picture data to form a new picture; and (iv) re-displaying the updated picture data on the main window MSa (step 1305).

Checks if there is further tracing information for the next frame (step 1306);

Keeps idling for a predetermined period of time, awaiting information for the next frame (step 1307), and returns to step 1301 to continue further picture image processing for the next frame if information for the next frame is provided; but ends if there is no information for the next frame.

Figure 43:
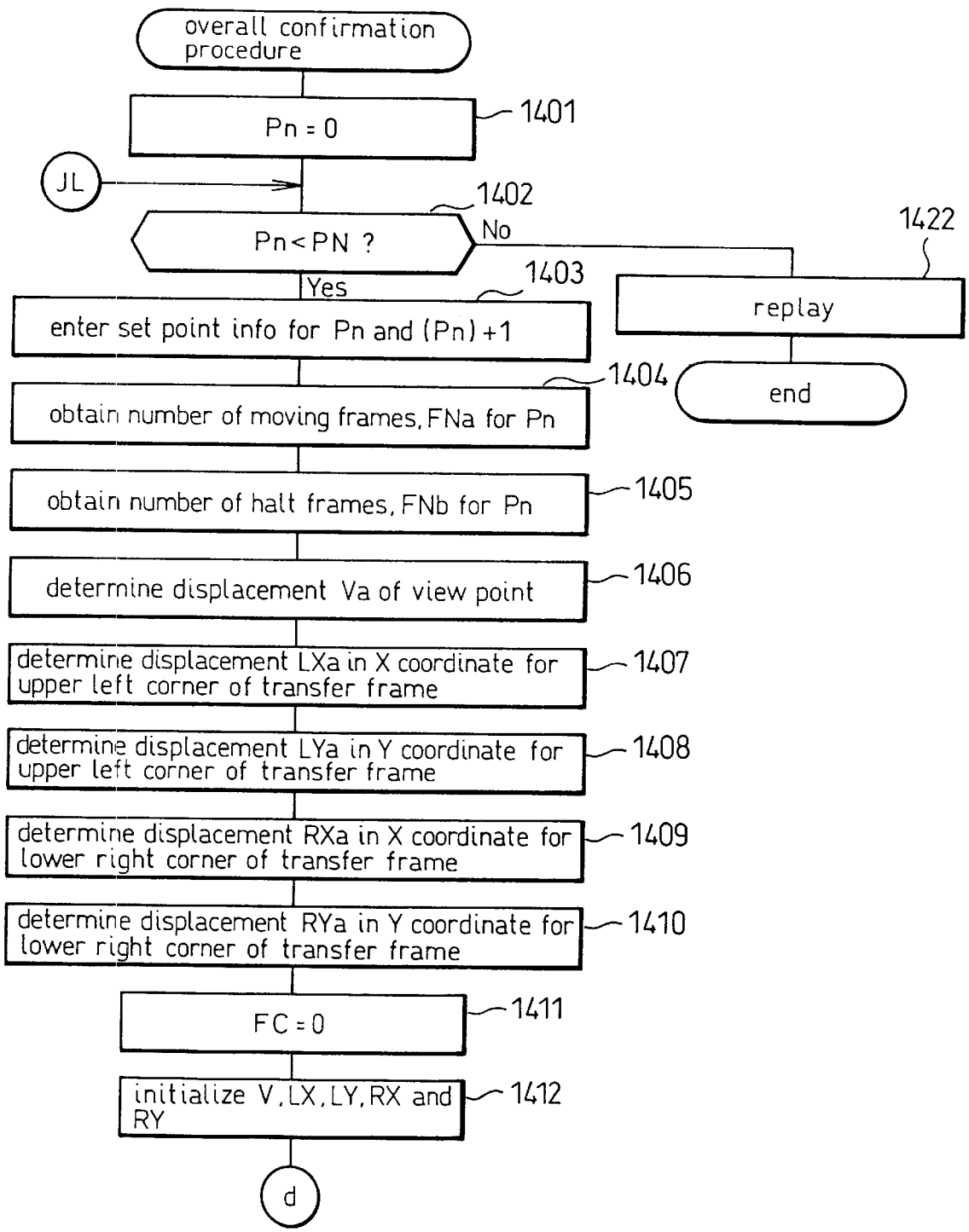
FIG. 43 is a flow-chart of and overall confirmation (Step 316)
Figure 43B:
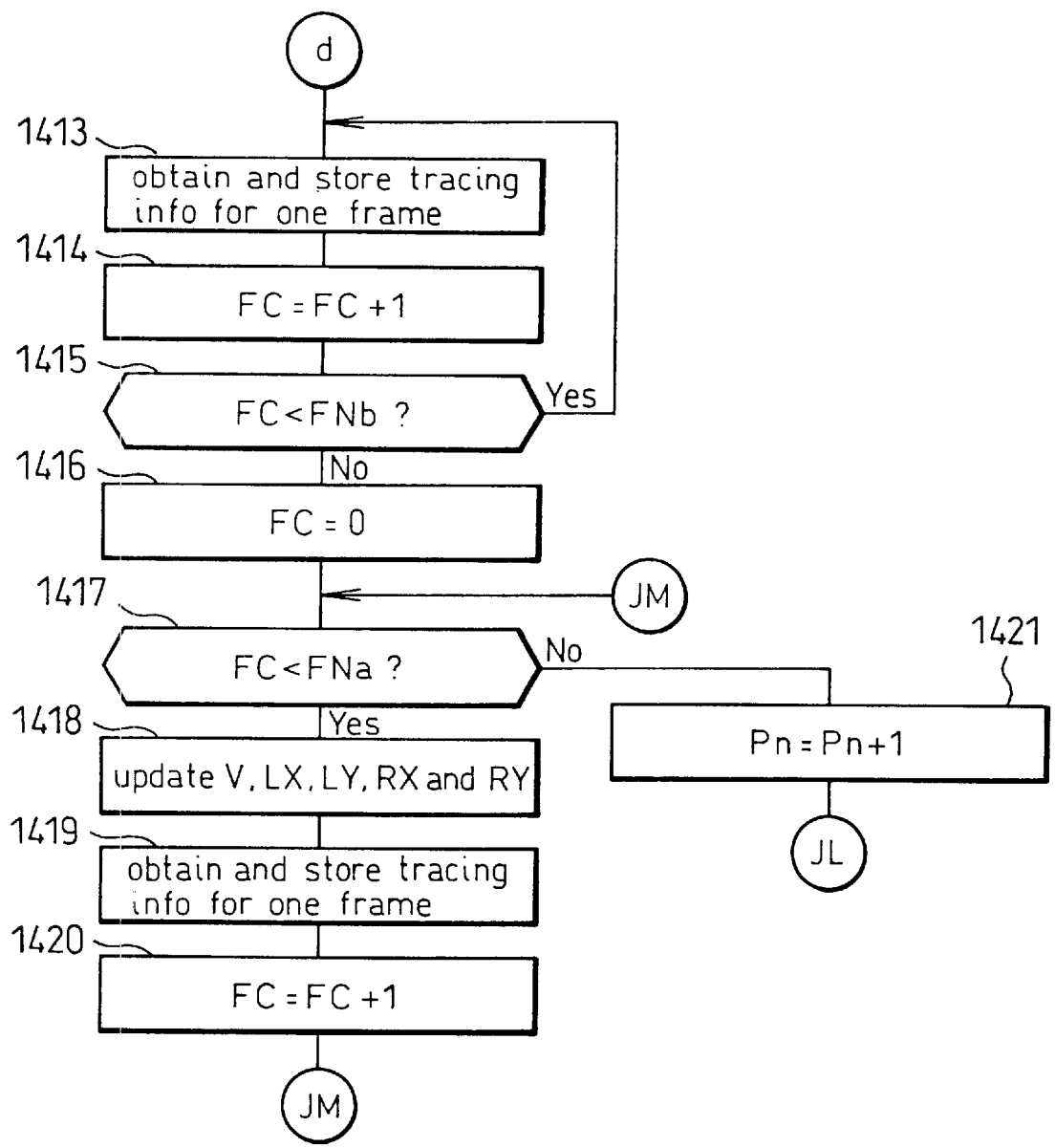

Referring now to FIG. 43, there is shown in detail the overall confirmation procedure of step 316, in which the procedure:

Initializes processing-point number Pn to 0 (step 1401);

Queries if the value of the processing point number Pn is greater than the total number PN of points to be processed (step 1402);

Enters set point information for point Pn and Pn+1 if the answer to the query in step 1402 is YES (step 1403), since then there remains at least one set point awaiting processing;

Obtains the number of moving frames FNa from set point information on processing point numbered Pn (step 1404);

Obtains the number of halt frames FNb from set point information on processing point numbered Pn (step 1405);

Determines the displacement Va per one frame by dividing by the number, FNa, of the moving frames between the two set points the relative displacement between the two set points associated with point Pn and Pn+1, based on the information preserved for the set points (which will be referred to as set point information) (step 1406);

Determines the displacement LXa per one frame by dividing by the number, FNa, the displacement in the X coordinate of the upper left corner of the transfer frame between points Pn and Pn+1 based on the information preserved for the set points (step 1407);

Determines the displacement LYa per one frame by dividing by FNa the displacement in the Y coordinate of the upper left corner of the transfer frame between points Pn and Pn+1, based on the information preserved for the set points (step 1408);

Determines the displacement RXa in the X coordinate per one frame and RYa in the Y coordinate per one frame in are calculated for the lower right corner of the transfer frame (step 1409);

Determines the displacement RYa in the Y coordinate per one frame by dividing by FNa the displacement in X coordinate of the lower right corner of the transfer frame between points Pn and Pn+1 (step 1410);

The procedure further proceeds to:

Initializes frame counter FC to 0 (step 1411);

Initializes variables V, LX, LY, RX and RY to the coordinate of the view point, X and Y coordinates of the upper left corner of the transfer frame, X and Y coordinates of the lower right corner of the transfer frame, respectively, as obtained from the set point information for point Pn (step 1412);

Creates tracing information for one frame (halt frame) based on the current values of V, LX, LY, and RY, and stores the information in the temporary CHS file (step 1413);

Increments frame counter FC by 1 (step 1414);

Determines whether the value of frame counter FC is smaller than the number of halt frames, FNb (step 1415);

Returns to step 1413, if the determination in step 1415 is YES, to create tracing information for the remaining halt frames.

But, if the determination in step 1415 is NO, indicating that creation of tracing information for halt frames is over, resets frame counter FC to 0 (step 1416).

Queries whether the counter value of the frame counter FC is smaller than the number of the moving frames, FNa (1417);

Adds to each value of variables V, LX, LY, RX, and RY, corresponding displacements Va, LXa, LYa, RXa, RYa, provided that the answer to the query in step 1417 is YES, thereby updating V, LX, LY, RX, and RY (step 1418);

Creates tracing information for one frame (moving frame) based on the current values of V, LX, LY, RX, and RY, and stores the information in temporary CHS file (step 1419);

Increments frame counter FC (step 1420) and then returns to step 1417.

Increments processing point number Pn by 1 (step 1421) provided that the answer to the query in step 1417 is YES, since then tracing information for the frames formed between the set point and the next set point has been stored in the temporary CHS file; and then Loops back to step 1402.

On the other hand, if the answer to the query made in step 1402 is NO, implying that tracing information has been stored in the temporary CHS file for all the set points, the procedure proceeds to re-display all the picture image data in the form of animation, using the temporary CHS file and the WITH file (in step 1422), and then the procedure ends.

Figure 44:
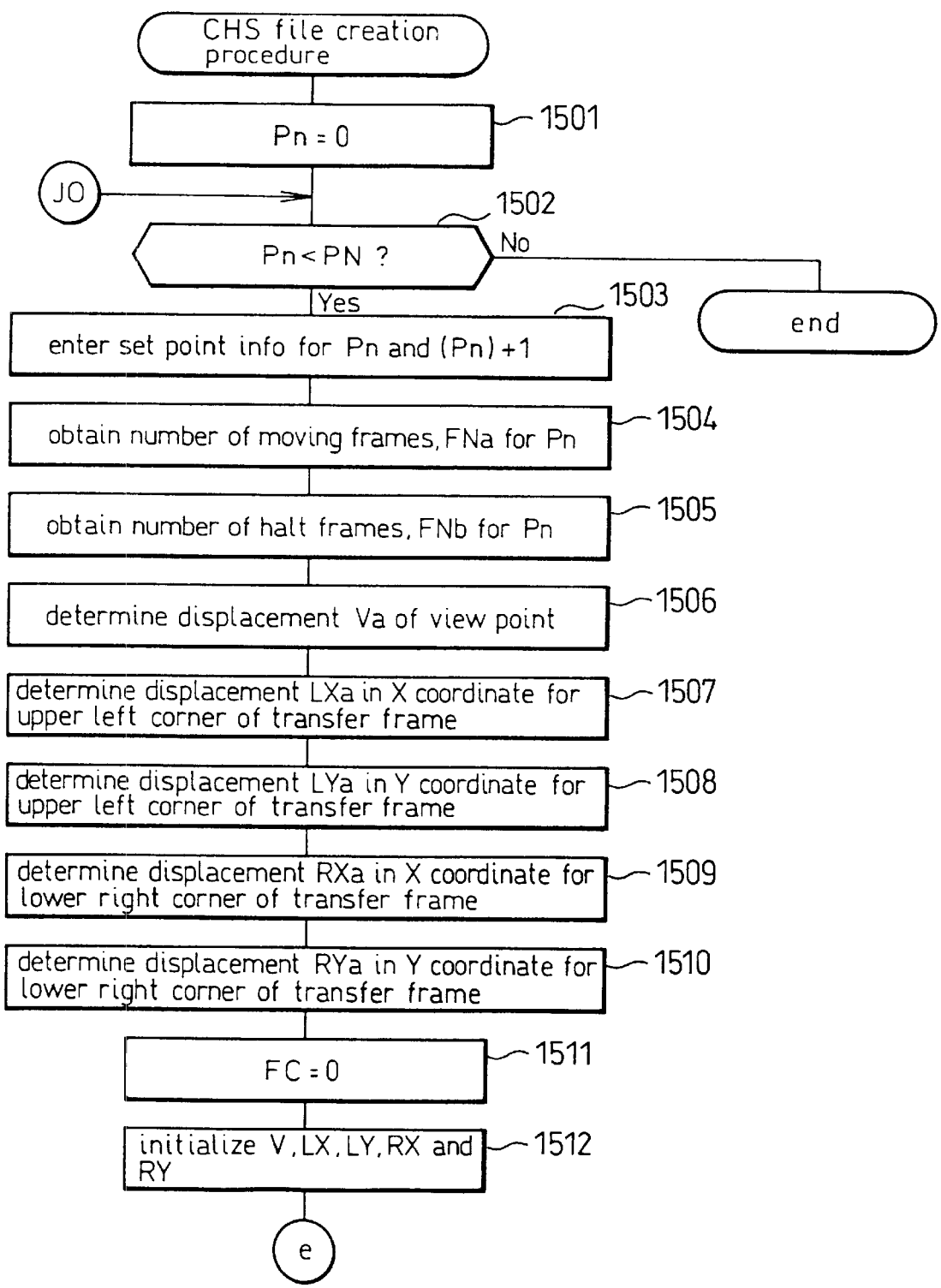
FIG. 44 is a flow-chart of CHS file creation procedure (Step 213)
Figure 44:
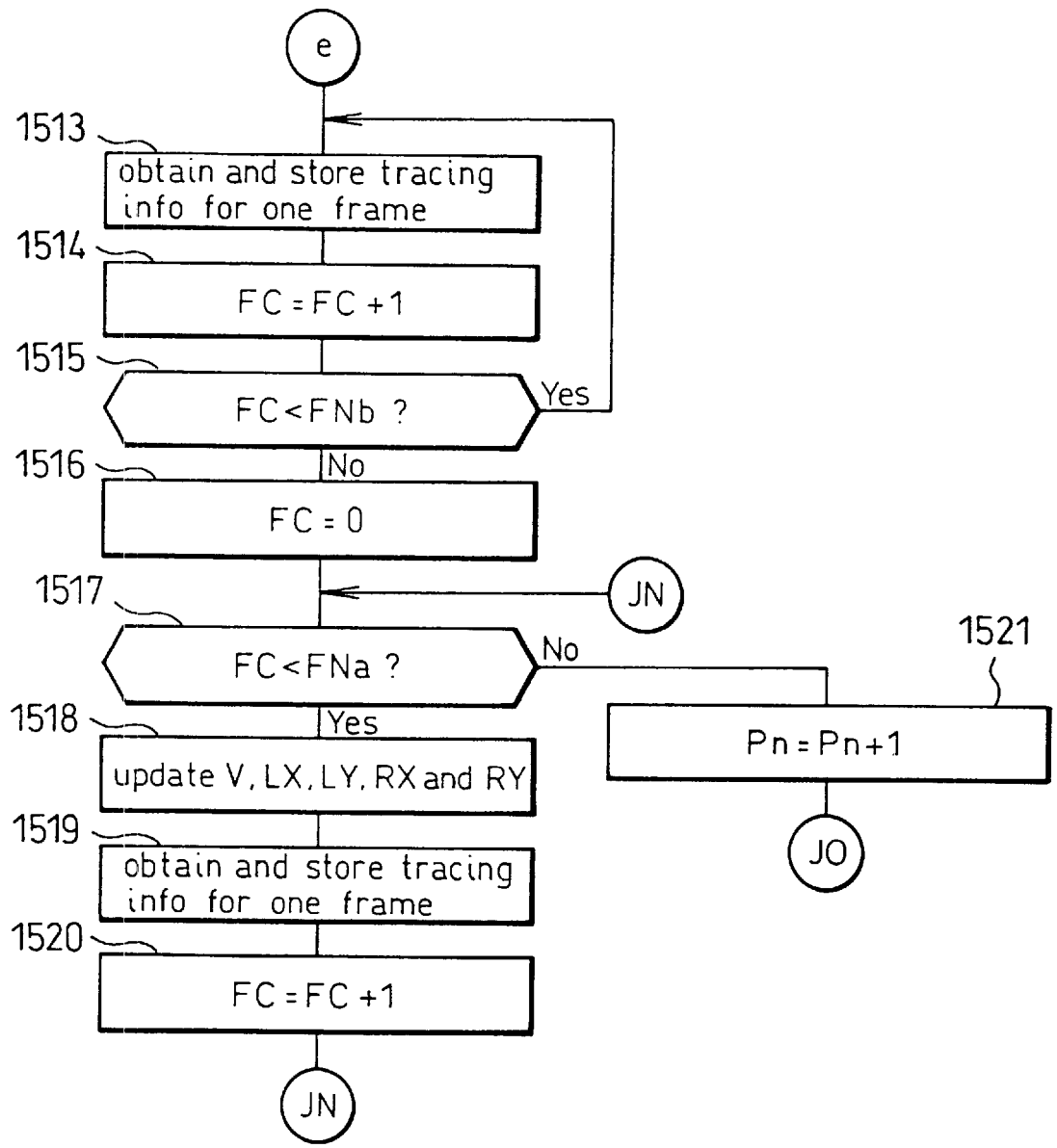
Figure 45:
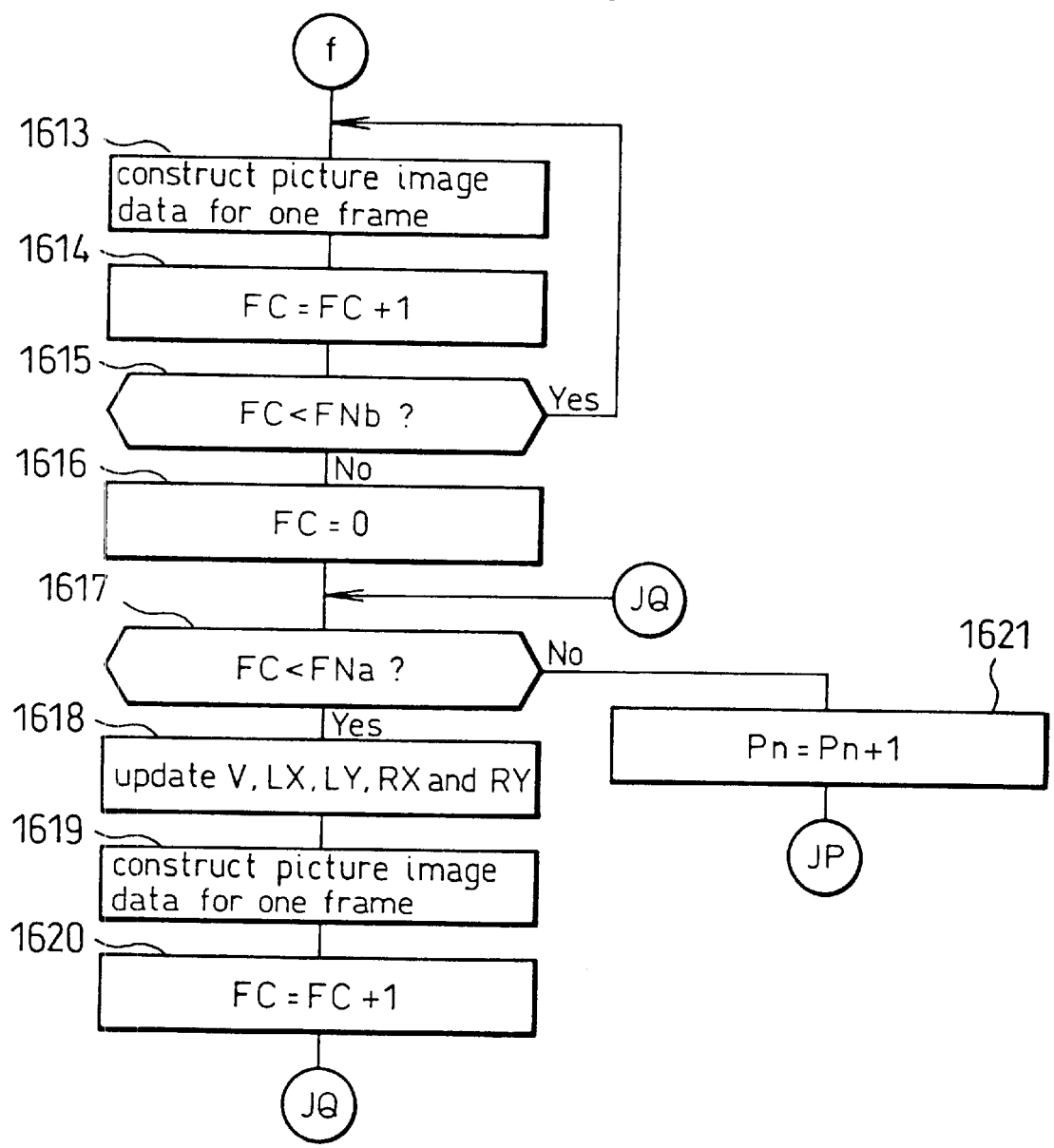
FIG. 45 is a flow-chart of AVI file creation procedure (Step 214).

Referring now to FIG. 44, there is shown in detail the CHS file creation procedure of step 213, in which the procedure:

Initializes processing-point number Pn to 0 (step 1501);

Queries if the value of the processing point number Pn is greater than the total number PN of points to be processed (step 1502);

Enters set point information for point Pn and Pn+1 if the answer to the query in step 1502 is YES (step 1503), since then there remains at least one set point awaiting processing;

Obtains the number of moving frames FNa from set point information on processing point numbered Pn (step 1504);

Obtains the number of halt frames FNb from set point information on processing point numbered Pn (step 1505);

Determines the displacement Va per one frame by dividing by the number, FNa, of the moving frames between the two set points the relative displacement between the two set points associated with point Pn and Pn+1, based on the information preserved for the set points (which will be referred to as set point information) (step 1506);

Determines the displacement LXa per one frame by dividing by the number, FNa, the displacement in the X coordinate of the upper left corner of the transfer frame between points Pn and Pn+1 based on the information preserved for the set points (step 1507);

Determines the displacement LYa per one frame by dividing by FNa the displacement in the Y coordinate of the upper left corner of the transfer frame between points Pn and Pn+1, based on the information preserved for the set points (step 1508);

Determines the displacement RXa in the X coordinate per one frame and RYa in the Y coordinate per one frame in are calculated for the lower right corner of the transfer frame (step 1509);

Determines the displacement RYa in the Y coordinate per one frame by dividing by FNa the displacement in the X coordinate of the lower right corner of the transfer frame between points Pn and Pn+1 (step 1510);

The procedure further proceeds to:

Initializing frame counter FC to 0 (step 1511);

Initialize variables V, LX, LY, RX and RY to the coordinate of the view point, X and Y coordinates of the upper left corner of the transfer frame, X and Y coordinates of the lower right corner of the transfer frame, respectively, as obtained from the set point information for point Pn (step 1512);

Creates tracing information for one frame (halt frame) based on the current values of V, LX, LY, and RY, and stores the information in the temporary CHS file (step 1513);

Increments frame counter FC by 1 (step 1514);

Determines whether the value of frame counter FC is smaller than the number of halt frames, FNb (step 1515);

Returns to step 1513, if the determination in step 1515 is YES, to set up tracing information for the remaining halt frames.

But, if the determination in step 1515 is NO, indicating that setting up of tracing information for all halt frames is over, resets frame counter FC to 0 (step 1516).

Queries whether the counter value of the frame counter FC is smaller than the number of the moving frames, FNa (step 1517);

Adds to each value of variables V, LX, LY, RX, and RY, corresponding displacements Va, LXa, LYa, RXa, RYa, provided that the answer to the query in step 1517 is YES, thereby updating V, LX, LY, RX, and RY (step 1518);

Creates tracing information for one frame (moving frame) based on the current values of V, LX, LY ,RX, and RY and stores the information in temporary CHS file (step 1519);

Increments frame counter FC (step 1520) and then returns to step 1517;

Increments processing point number Pn by 1 (step 1521) provided that the answer to the query in step 1517 is YES, since then tracing information for the frames formed between the set point and the next set point has been stored in the CHS file; and then Loops back to step 1502.

But if the answer to the query made in step 1502 is NO, implying that tracing information has been stored in the CHS file for all the set points, the procedure ends.

Referring now to FIG. 43, there is shown, in detail the overall confirmation procedure of step 316, in which the procedure:

Initializes processing-point number Pn to 0 (step 1601);

Queries if the value of the processing point number Pn is greater than the total number PN of points to be processed (step 1602);

Enters set point information for point Pn and Pn+1 if the answer to the query in step 1602 is YES (step 1603), since then there remains at least one set point awaiting processing;

Obtains the number of moving frames FNa from set point information on processing point numbered Pn (step 1604);

Obtains the number of halt frames FNb from set point information on processing point numbered Pn (step 1605);

Determines the displacement Va per one frame by dividing by the number, FNa, of the moving frames between the two set points the relative displacement between the two set points associated with point Pn and Pn+1, based on the information preserved for the set points (which will be referred to as set point information) (step 1606);

Determines the displacement LXa per one frame by dividing by the number, FNa, the displacement in the X coordinate of the upper left corner of the transfer frame between points Pn and Pn+1 based on the information preserved for the set points (step 1607);

Determines the displacement LYa per one frame by dividing by FNa the displacement in the Y coordinate of the upper left corner of the transfer frame between points Pn and Pn+1, based on the information preserved for the set points (step 1608);

Determines the displacement RXa in the X coordinate per one frame and RYa in the Y coordinate per one frame in are calculated for the lower right corner of the transfer frame (step 1609);

Determines the displacement RYa in the Y coordinate per one frame by dividing by FNa the displacement in the X coordinate of the lower right corner of the transfer frame between points Pn and Pn+1 (step 1610);

The procedure further proceeds to:

Initializes frame counter FC to 0 (step 1611);

Initialize variables V, LX, LY, RX and RY to the coordinate of the view point, X and Y coordinates of the upper left corner of the transfer frame, X and Y coordinates of the lower right corner of the transfer frame, respectively, as obtained from the set point information for point Pn, (step 1612);

Creates tracing information for one frame (halt frame) based on the current values of V, LX, LY, and RY, and stores the information in the temporary CHS file (step 1613);

Increments frame counter FC by 1 (step 1614);

Determines whether the value of frame counter FC is smaller than the number of halt frames, FNb (step 1615);

Returns to step 1613, if the determination in step 1615 is YES, to create tracing information for the remaining halt frames.

But, if the determination in step 1615 is NO, indicating that creation of tracing information for halt frames is over, resets frame counter FC to 0 (step 1616).

Queries whether the counter value of the frame counter FC is smaller than the number of the moving frames, FNa (1617);

Adds to each value of variables V, LX, LY, RX, and RY, corresponding displacements Va, LXa, LYa, RXa, RYa, provided that the answer to the query in step 1617 is YES, thereby updating V, LX, LY, RX, and RY (step 1618);

Constructs an AVI file for one frame by deforming the original picture data based on the updated V, LX, LY, RX, and RY, in the manner as described previously (step 1619);

Increments frame counter FC (step 1620) and then returns to step 1617.

Increments processing point number Pn by 1 (step 1621) provided that the answer to the query in step 1617 is YES, since then tracing information for the frames formed between the set point and the next set point has been stored in the temporary CHS file; and then Loops back to step 1602.

On the other hand, if the answer to the query made in step 1602 is NO, implying that the picture data has been created for each frame, the procedure proceeds to create an AVI file by arranging the image picture data in accordance with the order of the frames (step 1622); and then the procedure ends.

Although the present invention has been described above by way of example in which a photograph is used as a source of original picture image data, it should be understood that the invention is not limited to this example. For example, instead of a photograph, a figure made by a perspective drawing method may be used equally well.

In summary, given an original snap shot photograph of a scene, for example, and imported on a display, the present invention may provide a picture which could be obtained by a camera moved away from the original angle or site of the camera, thereby providing the viewer looking at the display with a feeling as if the viewer were actually looking at the sight through the moving camera.

The invention may also provide an animated picture having a very small data size yet having a substantially the same picture quality as a standard AVI file, so that the picture data can be stored in a small memory device and transferred through the Internet in a short period of time, which is advantageous in providing animation pictures from WEB pages.

I claim:

1. A method of displaying a two-dimensional color picture data having a predetermined bit depth, comprising the steps of:

setting up a multiplicity of ordered and arbitrarily separated virtual view points looking at the picture displayed on a display window;

entering a number of ordered moving frames and a number of ordered halt frames in association with each view point;

dividing each of the paths connecting two ordered view points by the number of said moving frames;

setting a multiplicity of temporary view points, one for each divisional point, along said path;

constructing a picture from said two-dimensional picture by magnifying portions of the picture closer to the center of the picture by a smaller magnification factor than portions farther from the center, said magnified picture forming a frame picture for that temporary view point; and displaying the frame pictures in the order of the associated view points and in the order of the associated temporary view points;

wherein each said picture associated with each said view point is repeatedly displayed at the associated view point as many times as the number of halt frames.

2. The method of displaying a two-dimensional picture according to claim 1, wherein said magnification factor at each of the view points is adapted to be arbitrarily set when said temporary view points are set, and stored in a view point information data file.

3. A method of constructing an animation picture for a given two-dimensional color picture data having a predetermined bit depth, comprising steps of creating a tracing information file which includes:

setting up a multiplicity of ordered and arbitrarily separated virtual view points looking at the picture displayed on a display window;

setting a magnification mode of magnifying said picture for each of said view points;

constructing a transfer frame for cutting out a portion of said picture displayed on said display window in accordance with said magnification mode, said transfer frame defined by the coordinates of a rectangular frame formed on said display window;

entering a number of ordered moving frames and a number of ordered halt frames in association with each view point;

dividing each of the paths connecting two ordered view points by the number of said moving frames;

setting a multiplicity of temporary view points, one for each of the divisional points along said path divided;

arranging said number of halt frames and the coordinates of said view points and said temporary view points, and the coordinates of said transfer frames in the order of said view points and temporary view points, thereby forming a time series of said pictures forming, when displayed, animation of said two-dimensional picture; and constructing an animation picture from said two-dimensional picture data and said tracing information file.

4. The method of constructing an animation picture according to claim 3, wherein:

a picture is constructed from said two-dimensional picture displayed on said picture window for each temporary view points and said view points by cutting out a section of said picture on said display window by means of said transfer frame associated with said temporary view point/view point;

said cut picture is magnified such that portions of the cut picture closer to the center thereof is magnified by a smaller magnification factor than portions farther from the center thereof, said magnified picture forming a frame picture for that temporary view point; and said picture data is displayed on a display in accordance with said tracing information at a predetermined time interval.

* * * * *